US009350156B2

(12) United States Patent
Kanzaki et al.

(10) Patent No.: US 9,350,156 B2
(45) Date of Patent: May 24, 2016

(54) POWER SUPPLY CONTROL APPARATUS OF ELECTRIC LOAD

(71) Applicant: Mitsubishi Electric Corporation, Chiyoda-ku, Tokyo (JP)

(72) Inventors: Shozo Kanzaki, Chiyoda-ku (JP); Koji Hashimoto, Chiyoda-ku (JP); Kazunari Masudome, Chiyoda-ku (JP); Tomohiro Kimura, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 116 days.

(21) Appl. No.: 14/469,136

(22) Filed: Aug. 26, 2014

(65) Prior Publication Data

US 2015/0326000 A1    Nov. 12, 2015

(30) Foreign Application Priority Data

May 9, 2014    (JP) .................................. 2014-097494

(51) Int. Cl.
*H02H 3/08*    (2006.01)
*H02H 1/00*    (2006.01)

(52) U.S. Cl.
CPC    *H02H 3/08* (2013.01); *H02H 1/003* (2013.01)

(58) Field of Classification Search
CPC ................................. H02H 1/003; H02H 3/08
USPC ........................................................ 361/101
See application file for complete search history.

(56) References Cited

U.S. PATENT DOCUMENTS

| | | | | |
|---|---|---|---|---|
| 5,315,221 A | * | 5/1994 | Corey | H01H 47/002 318/434 |
| 2004/0118384 A1 | | 6/2004 | Oyama et al. | |
| 2011/0301772 A1 | * | 12/2011 | Zuercher | H01L 31/02021 700/293 |
| 2014/0103990 A1 | * | 4/2014 | Holley | H02H 3/04 327/427 |
| 2014/0313621 A1 | * | 10/2014 | Innes | H02P 3/12 361/24 |

FOREIGN PATENT DOCUMENTS

| | | |
|---|---|---|
| JP | 2003-047148 A | 2/2003 |
| JP | 2004-124890 A | 4/2004 |

* cited by examiner

*Primary Examiner* — Scott Bauer
(74) *Attorney, Agent, or Firm* — Sughrue Mion, PLLC; Richard C. Turner

(57) ABSTRACT

Disclosed is a power supply control apparatus of an electric load that includes an upstream side switching element and a downstream side switching element and detects various abnormality states of a load wiring by a small number of detection signals. The power supply control apparatus includes a control circuit unit that gives a power supply command signal to the upstream switching element connected in series with the electric load and gives a conduction command signal to the downstream switching element, open-circuits the upstream and downstream switching elements by a synthetic overcurrent determination storage circuit that is operated in response to an overcurrent detecting circuit, monitors a value of one variable divided voltage generated by the voltage monitoring circuit for the electric load, and identifies and stores a wiring abnormality such as a negative line supply fault, a positive line ground fault, and a load short circuit abnormality.

18 Claims, 32 Drawing Sheets

FIRST LEVEL G1
(UPSTREAM CLOSE CIRCUIT AND
DOWNSTREAM CLOSE CIRCUIT)

SECOND LEVEL G2
(UPSTREAM OPEN CIRCUIT OR CLOSE
CIRCUIT, DOWNSTREAM OPEN
CIRCUIT, AND LOAD DISCONNECTION)

THIRD LEVEL G3
(UPSTREAM OPEN CIRCUIT AND
DOWNSTREAM OPEN CIRCUIT)

FOURTH LEVEL G4
(UPSTREAM CLOSE CIRCUIT AND
DOWNSTREAM OPEN CIRCUIT)

FIG. 5

<SEE FIGS. 3 AND 4>

OC1: OCM OPERATION, LAN1>LAN2=0
OC2: OCM OPERATION, LAN2>LAN1=0
OC12: OCM OPERATION, LAN1=LAN2>0

| | UPSTREAM X / FLYWHEEL Z / DOWNSTREAM Y | CLOSE CIRCUIT T1 | FLYWHEEL T2 | OPEN CIRCUIT T3 | REMARKS |
|---|---|---|---|---|---|
| COMMAND | | ON | OFF | OFF | |
| | | OFF | ON | OFF | |
| | | ON | ON | OFF | |
| OC OPERATION | POSITIVE LINE GROUND FAULT | OC1 · G1 | | | |
| | DOWNSTREAM Z SHORT CIRCUIT | OC12 · G1 | | G1 | SUBDIVISION DETERMINATION DUE TO CURRENT DETECTION. WHEN CURRENT IS NOT DETECTED |
| | NEGATIVE LINE SUPPLY FAULT | OC2 · G4 | | G1 | OCM OPERATION IN T1 PERIOD / G1 IN T3 PERIOD — LAN1>LAN2=0 IN T1 PERIOD |
| | | | | G1 | LAN1=LAN2>0 IN T1 PERIOD |
| | LOAD SHORT CIRCUIT | OC12 · G3 | | G4 | OCM OPERATION IN T1 PERIOD / G4 IN T3 PERIOD — OR LAN2>LAN1=0 IN T1 PERIOD |
| | | | | G3 | OCM OPERATION IN T1 PERIOD / G3 IN T3 PERIOD — OR LAN2=LAN1=0 IN T1 PERIOD |
| | POSITIVE LINE SUPPLY FAULT | | OC2 · G4 | G4 | OCM OPERATION IN T2 PERIOD / G4 IN T3 PERIOD — LAN2>LAN1=0 IN T2 PERIOD |
| | UPSTREAM X SHORT CIRCUIT | | OC12 · G4 | G4 | LAN1=LAN2>0 IN T2 PERIOD |
| | DOUBLE-ABNORMALITY | | | OC12 | OCM OPERATION IN T3 PERIOD — SEE FIG. 30A |
| OC NON-OPERATION | NORMAL | G1 · AN12 | ← NOTE | G3 | AN1=AN2>0 IN T1 PERIOD / G3 IN T3 PERIOD |
| | UPSTREAM X DISCONNECTION | G1 *3 | | G3 | *3: AN1=AN2=0 IN T1 PERIOD |
| | NEGATIVE LINE GROUND FAULT | G1 *1 | | G1 | *1: AN1>AN2=0 IN T1 PERIOD / G1 IN T3 PERIOD |
| | DOWNSTREAM Y SHORT CIRCUIT | G1 *2 | | G1 | *2: AN2=AN1>0 IN T1 PERIOD / G1 IN T3 PERIOD |
| | LOAD DISCONNECTION | G1 *3 | | G2 | G1 IN T1 PERIOD / G2 IN T3 PERIOD — OR G2 IN T3 PERIOD *3: AN1=AN2=0 IN T1 PERIOD |
| | DOWNSTREAM Y DISCONNECTION | G4 *3 | | G3 | G4 IN T1 PERIOD / G3 IN T3 PERIOD — OR G3 IN T3 PERIOD *3: AN1=AN2=0 IN T1 PERIOD |
| | DOWNSTREAM Z DISCONNECTION | G1 · AN12 | OVM | OVM · G3 | OVM OPERATION IN T2 AND T3 PERIODS |

[NOTE] IT IS POSSIBLE TO DETERMINE NORMAL FROM G4 AND X DISCONNECTION FROM G3, BY PERFORMING DETERMINATION BASED ON X CLOSE CIRCUIT AND Y OPEN CIRCUIT IN FOURTH PERIOD T4

702 FIRST PERIOD RATIO COMPUTING MEANS
719 CLOSE CIRCUIT ABNORMALITY DETERMINATION MANES
729 INTERMITTENCE ABNORMALITY DETERMINATION MEANS
831 THIRD PERIOD RATIO COMPUTING MEANS

FIG.12

| COMMAND | | UPSTREAM X | FLYWHEEL Z | DOWNSTREAM Y | CLOSE CIRCUIT T1 | FLYWHEEL T2 | OPEN CIRCUIT T3 | REMARKS: OVERCURRENT LATCH WHEN OC1 OR OC2 IS OPERATED, IN WHICH LAN1 OR LAN2 IS NOT NECESSARY <SEE FIGS. 3 AND 4> |
|---|---|---|---|---|---|---|---|---|
| | | | | | ON | OFF | OFF | WHEN CURRENT IS NOT DETECTED |SUBDIVISION DETERMINATION BASED ON CURRENT DETECTION|
| | | | | | OFF | ON | OFF | |CURRENT DETERMINATION IS NOT NECESSARY|
| | | | | | ON | ON | OFF | |CURRENT DETERMINATION IS NOT NECESSARY|
| OC OPERATION | POSITIVE LINE GROUND FAULT | | | | OC1 · G1 | | G1 | OC1 OPERATION IN T1 PERIOD   G1 IN T1 AND T3 PERIODS |
| | DOWNSTREAM Z SHORT CIRCUIT | | | | OC12 · G1 | | G1 | OC1 AND OC2 OPERATION IN T1 PERIOD   G1 IN T1 AND T3 PERIODS |
| | NEGATIVE LINE SUPPLY FAULT | | | | OC2 · G4 | | G4 | OC2 OPERATION IN T1 PERIOD   G4 IN T1 AND T3 PERIODS |
| | LOAD SHORT CIRCUIT | | | | OC12 · G3 | | G3 | OC1 AND OC2 OPERATION IN T1 PERIOD   G3 IN T1 AND T3 PERIODS |
| | POSITIVE LINE SUPPLY FAULT UPSTREAM X SHORT CIRCUIT | | | | | NOTE 1 | | NOTE1: IT IS NORMAL THAT Z IS OPEN-CIRCUITED IN UPSTREAM CLOSE CIRCUIT. IT IS DETERMINED THAT Z SHORT CIRCUIT ABNORMALITY IN UPSTREAM CLOSE CIRCUIT ABNORMALITY IS DOUBLE-ABNORMALITY. |
| | DOUBLE-ABNORMALITY | | | | | | OC12 | OC1 AND OC2 OPERATION IN T3 PERIOD  SEE FIG. 30A |
| OC NON-OPERATION | POSITIVE LINE SUPPLY FAULT | | | | G1 · AN2 | | G4 | G1 IN T1 PERIOD   G4 IN T3 PERIOD | AN2>AN1=0 IN T1 PERIOD |
| | UPSTREAM Y SHORT CIRCUIT | | | | G1 · AN1 | | G4 | | AN1=AN2>0 IN T1 PERIOD |
| | NORMAL | | | | G1 · AN12 | ←NOTE 2 | G3 | G1 IN T1 PERIOD   G3 IN T3 PERIOD | AN1=AN2>0 IN T1 PERIOD |
| | UPSTREAM Y DISCONNECTION | | | | G1 * 3 | | G3 | | AN1=AN2=0 IN T1 PERIOD |
| | NEGATIVE LINE GROUND FAULT | | | | G1 * 1 | | G1 | G1 IN T1 PERIOD | AN1>AN2=0 IN T1 PERIOD |
| | DOWNSTREAM Y SHORT CIRCUIT | | | | G1 * 2 | | G1 | G1 IN T1 PERIOD | AN2=AN1>0 IN T1 PERIOD |
| | LOAD DISCONNECTION | | | | G1 * 3 | | G2 | G1 IN T1 PERIOD   G2 IN T3 PERIOD |
| | DOWNSTREAM Y DISCONNECTION | | | | G4 * 3 | | G3 | G4 IN T1 PERIOD   G3 IN T3 PERIOD |
| | DOWNSTREAM Z DISCONNECTION | | | | G1 · AN12 | OVM | OVM · G3 | OVM OPERATION IN T2 AND T3 PERIODS |

[NOTE 2]  IT IS POSSIBLE TO IDENTIFY AND DETERMINE NORMAL FROM G4 AND X DISCONNECTION FROM G3, BY PERFORMING DETERMINATION BASED ON X CLOSE CIRCUIT AND Y OPEN CIRCUIT IN FOURTH PERIOD T4.

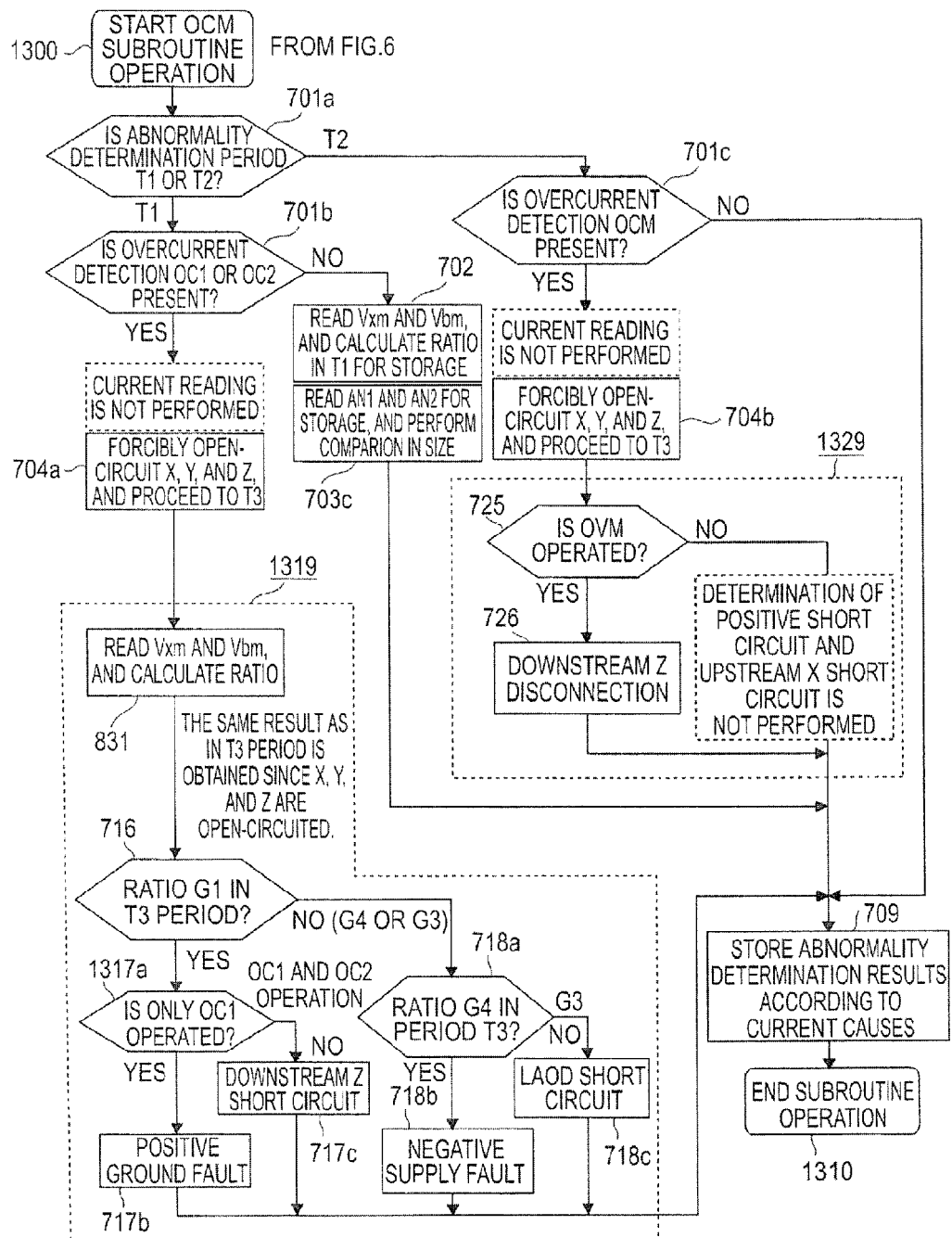

FIG.18

| COMMAND | | CLOSE CIRCUIT T1 | FLYWHEEL T2 | OPEN CIRCUIT T3 | REMARKS: OVERCURRENT LATCH WHEN OC1 OR OC2 IS OPERATED, IN WHICH LAN1 OR LAN2 ARE NOT NECESSARY <SEE FIGS. 17 AND 4> |
|---|---|---|---|---|---|
| | UPSTREAM Y | ON | ON | OFF | |
| | FLYWHEEL Z | OFF | ON | OFF | |
| | DOWNSTREAM X | ON | OFF | OFF | WHEN CURRENT IS NOT DETECTED (SUBDIVISION DETERMINATION BASED ON CURRENT DETECTION |
| OC OPERATION | POSITIVE LINE GROUND FAULT | OC1 · G1 | | G1 | OC1 OPERATION IN T1 PERIOD  G1 IN T1 AND T3 PERIODS — CURRENT DETERMINATION IS NOT NECESSARY |
| | NEGATIVE LINE SUPPLY FAULT | OC2 · G4 | | G4 | OC2 OPERATION IN T1 PERIOD  G4 IN T1 AND T3 PERIODS |
| | DOWNSTREAM SHORT CIRCUIT | OC12 · G4 | | G4 | OC1 AND OC2 OPERATION IN T1 PERIOD  G4 IN T1 AND T3 PERIODS — CURRENT DETERMINATION IS NOT NECESSARY |
| | LOAD SHORT CIRCUIT | OC12 · G3 | | G3 | OC2 OPERATION IN T1 PERIOD  G3 IN T1 AND T3 PERIODS — CURRENT DETERMINATION IS NOT NECESSARY |
| | NEGATIVE LINE GROUND FAULT DOWNSTREAM SHORT CIRCUIT DOUBLE-ABNORMALITY | | NOTE 1 | OC12 | NOTE 1: IT IS NORMAL THAT Z IS OPEN-CIRCUITED IN DOWNSTREAM CLOSE CIRCUIT. IT IS DETERMINED THAT Z SHORT CIRCUIT ABNORMALITY IN DOWNSTREAM CLOSE CIRCUIT ABNORMALITY IS DOUBLE-ABNORMALITY. |
| OC NON-OPERATION | NEGATIVE GROUND FAULT | G1 · AN1 | | G1 | OC1 AND OC2 OPERATION IN T3 PERIOD, SEE FIG. 30A |
| | DOWNSTREAM SHORT CIRCUIT | G1 · AN12 | | G1 | G1 IN T1 PERIOD / G1 IN T3 PERIOD |
| | NORMAL | G1 · AN12 | ←NOTE 2 | G3 | G1 IN T1 PERIOD / G3 IN T3 PERIOD |
| | UPSTREAM Y DISCONNECTION | G1 * 3 | | G3 | G1 IN T1 PERIOD / G3 IN T3 PERIOD / AN1>AN2=0 IN T1 PERIOD / AN2=AN1>0 IN T1 PERIOD |
| | POSITIVE LINE SUPPLY Y FAULT | G1 · AN2 | | G4 | G1 IN T1 PERIOD / G4 IN T3 PERIOD / AN1=AN2>0 IN T1 PERIOD / AN1=AN2>0 IN T1 PERIOD |
| | UPSTREAM Y SHORT CIRCUIT | G1 · AN12 | | G4 | G1 IN T1 PERIOD / G4 IN T3 PERIOD / AN2>AN1=0 IN T1 PERIOD / AN1=AN2>0 IN T1 PERIOD |
| | LOAD DISCONNECTION | G1 * 3 | | G2 | G1 IN T1 PERIOD / G2 IN T3 PERIOD / OR AN1=AN2=0 IN T1 PERIOD |
| | DOWNSTREAM X DISCONNECTION | G4 * 3 | | G3 | G4 IN T1 PERIOD / G3 IN T3 PERIOD / OR AN1=AN2=0 IN T1 PERIOD |
| | UPSTREAM Z DISCONNECTION | G1 · AN12 | OVM | OVM · G3 | OVM OPERATION IN T2 AND T3 PERIODS |
| | UPSTREAM Z AND DOWNSTREAM SHORT CIRCUIT | G1 · AN12 | | G1, AN1 OR NA2 | IN THIRD PERIOD T3 PERIOD, WHEN AN1>0 AN2>0 OR AN1=AN2>0, UPSTREAM AND DOWNSTREAM SHORT CIRCUIT, SEE FIG. 30B |

[NOTE 2] IT IS POSSIBLE TO DETERMINE NORMAL FROM G4 AND Y DISCONNECTION FROM G3, BY PERFORMING DETERMINATION BASED ON X OPEN CIRCUIT AND Y CLOSE CIRCUIT IN FOURTH PERIOD T4.

702  FIRST PERIOD RATIO COMPUTING MEANS
831  THIRD PERIOD RATIO COMPUTING MEANS
1919 CLOSE CIRCUIT ABNORMALITY DETERMINATION MEANS
1929 INTERMITTENCE ABNORMALITY DETERMINATION MEANS

FIG.22

| COMMAND | | CLOSE CIRCUIT T1 | FLYWHEEL T2 | OPEN CIRCUIT T3 | TEMPORARY T4 | REMARKS OCM=OC1+OC2 <SEE FIGS. 17 AND 4> |
|---|---|---|---|---|---|---|
| | UPSTREAM Y | ON | ON | OFF | ON | CURRENT DETECTION IS NOT PERFORMED |
| | FLYWHEEL Z | OFF | ON | OFF | OFF | TEMPORARY T4 IS EXECUTED WHEN OCM IS NOT OPERATED. |
| | DOWNSTREAM X | ON | OFF | OFF | OFF | WHEN CURRENT IS NOT DETECTED |
| OC OPERATION | POSITIVE LINE GROUND FAULT | OC1 · G1 | | G1 | — | OCM OPERATION IN T1 PERIOD   G1 IN T1/T3 PERIOD |
| | NEGATIVE LINE SUPPLY FAULT UPSTREAM Z SHORT CIRCUIT | OC2 · G4 OC12 · G4 | | G4 G4 | — | OCM OPERATION IN T1 PERIOD   G4 IN T1/T3 PERIOD |
| | LOAD SHORT CIRCUIT | OC12 · G3 | | G3 | — | OCM OPERATION IN T1 PERIOD   G3 IN T1/T3 PERIOD |
| | NEGATIVE LINE SUPPLY FAULT DOWNSTREAM Y SHORT CIRCUIT | | OC1 · G1 OC12 · G1 | G1 G1 | — | OCM OPERATION IN T2 PERIOD   G1 IN T1/T3 PERIOD |
| | DOUBLE-ABNORMALITY | | | OC12 | — | OC1 AND OC2 OPERATION IN T3 PERIOD   SEE FIG. 30A |
| OC NON-OPERATION | NORMAL | G1 G1 | | G3 G3 | G4 G3 | G1/G3/G4 IN T1/T3/T4 PERIOD G1/G3/G3 IN T1/T3/T4 PERIOD |
| | UPSTREAM Y DISCONNECTION | G1 | | G4 | G4 | G1 IN T1 PERIOD   G4 IN T3 PERIOD |
| | POSITIVE LINE SUPPLY FAULT | G1 | | G2 | G2 | G1 IN T1 PERIOD   G2 IN T3 PERIOD |
| | UPSTREAM Y SHORT CIRCUIT | | | | | |
| | LOAD DISCONNECTION | G4 | | G3 | G4 | G4 IN T1 PERIOD   G3 IN T3 PERIOD |
| | DOWNSTREAM X DISCONNECTION | G1 | OVM | OVM · G3 | G4 | OVM OPERATION IN T2 AND T3 PERIODS |
| | UPSTREAM Z DISCONNECTION | | | | | |

FIG.26A
FIRST LEVEL H1
(UPSTREAM OPEN CIRCUIT AND
DOWNSTREAM CLOSE CIRCUIT)

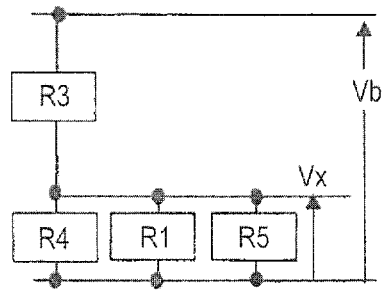

FIG.26B
SECOND LEVEL H2
(UPSTREAM CLOSE CIRCUIT,
DOWNSTREAM CLOSE CIRCUIT, AND
LOAD IS DISCONNECTED OR NORMAL)

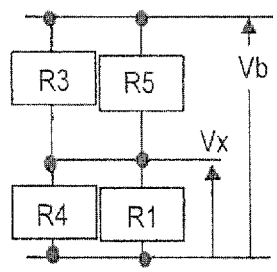

FIG.26C
THIRD LEVEL H3
(UPSTREAM OPEN CIRCUIT,
DOWNSTREAM OPEN CIRCUIT,
AND LOAD DISCONNECTION)

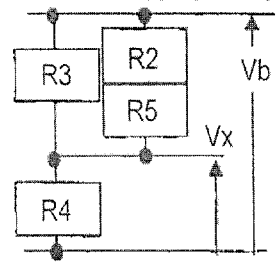

FIG.26D
FOURTH LEVEL H4
(UPSTREAM OPEN CIRCUIT AND
DOWNSTREAM OPEN CIRCUIT)

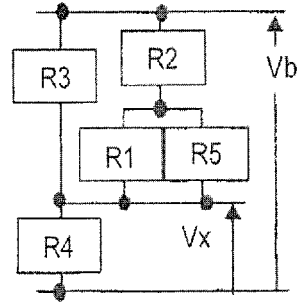

FIG.26E
FIFTH LEVEL H5
(UPSTREAM CLOSE CIRCUIT AND
DOWNSTREAM OPEN CIRCUIT)

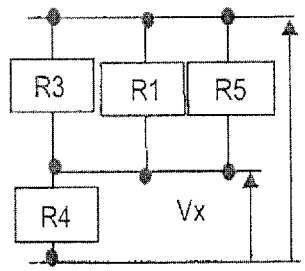

FIG.27

<SEE FIGS. 25 AND 26>

REMARKS OCM=OC1+OC2

| | | CLOSE CIRCUIT T1 | FLYWHEEL T2 | OPEN CIRCUIT T3 | REMARKS |
|---|---|---|---|---|---|
| COMMAND | UPSTREAM Y | ON | ON | OFF | INDIVIDUAL DETECTION OF OC1 AND OC2 IS NOT PERFORMED, AND CURRENT DETECTION IS NOT PERFORMED. |
| | FLYWHEEL Z | OFF | ON | OFF | |
| | DOWNSTREAM X | ON | OFF | OFF | |
| OC OPERATION | POSITIVE LINE GROUND FAULT | OC1・H1 | | H1 | WHEN CURRENT IS NOT DETECTED |
| | NEGATIVE LINE SUPPLY FAULT / UPSTREAM Z SHORT CIRCUIT | OC2・H5 / OC12・H5 | | H5 / H5 | OCM OPERATION IN T1 PERIOD  H5 IN T1 AND T3 PERIODS — DISCRIMINATION IS IMPOSSIBLE |
| | LOAD SHORT CIRCUIT | OC12・H4 | | H4 | OCM OPERATION IN T1 PERIOD  H4 IN T1 AND T3 PERIODS |
| | NEGATIVE LINE GROUND FAULT / DOWNSTREAM X SHORT CIRCUIT | | OC1・H1 / OC12・H1 | H1 | OCM OPERATION IN T2 PERIOD  H1 IN T1 AND T3 PERIODS — DISCRIMINATION IS IMPOSSIBLE |
| | DOUBLE-ABNORMALITY | | | OC12 | OC1 AND OC2 OPERATION IN T3 PERIOD  SEE FIG. 30A |
| OC NON-OPERATION | NORMAL / UPSTREAM Y DISCONNECTION | H2 / H1 | | H4 / H4 | H2 IN T1 PERIOD  H4 IN T3 PERIOD / H1 IN T1 PERIOD  H4 IN T3 PERIOD — DISCRIMINATION IS IMPOSSIBLE |
| | POSITIVE LINE SUPPLY FAULT / UPSTREAM Y SHORT CIRCUIT | H2 / H2 | | H5 / H5 | H2 IN T1 PERIOD  H5 IN T3 PERIOD |
| | LOAD DISCONNECTION | H2 | | H3 | H2 IN T1 PERIOD  H3 IN T3 PERIOD |
| | DOWNSTREAM X DISCONNECTION | H5 | | H4 | H5 IN T1 PERIOD  H4 IN T3 PERIOD |
| | UPSTREAM Z DISCONNECTION | H2 | OVM | OVM・H4 | OVM OPERATION IN T2 AND T3 PERIODS |
| | UPSTREAM AND DOWNSTREAM SHORT CIRCUIT | H2 | OC12 | H2 | UPSTREAM AND DOWNSTREAM SHORT CIRCUIT FROM VOLTAGE RATIO H2 IN THIRD PERIOD T3  SEE FIG. 30B |

FIG.30A

DOUBLE-ABNORMALITY (OPERATION OF OCM, OC1, AND OC2)

| | | SYNTHETIC OVERCURRENT DETECTION METHOD | INDIVIDUAL OVERCURRENT DETECTION METHOD | REMARKS |
|---|---|---|---|---|
| MODE 1 | SHORT CIRCUIT OF FLYWHEEL SWITCHING ELEMENT Z AND SHORT CIRCUIT OF POWER SUPPLY SWITCHING ELEMENT X | OCM OPERATION LAN1 AND LAN2 | OC1 AND OC2 OPERATION | INTERNAL ABNORMALITY |
| MODE 2 | SHORT CIRCUIT OF DOWNSTREAM FLYWHEEL SWITCHING ELEMENT Z AND POSITIVE LINE SUPPLY FAULT | OCM OPERATION LAN2 | OC2 OPERATION | INTERNAL AND EXTERNAL ABNORMALITY |
| MODE 3 | SHORT CIRCUIT OF UPSTREAM FLYWHEEL SWITCHING ELEMENT Z AND NEGATIVE GROUND FAULT | OCM OPERATION LAN1 | OC1 OPERATION | |
| MODE 4 | SHORT CIRCUIT OF UPSTREAM SWITCHING ELEMENT AND POSITIVE LINE GROUND FAULT | OCM OPERATION LAN1 | OC1 OPERATION | |
| MODE 5 | SHORT CIRCUIT OF DOWNSTREAM SWITCHING ELEMENT AND NEGATIVE LINE SUPPLY FAULT | OCM OPERATION LAN2 | OC2 OPERATION | |

FIG.30B

UPSTREAM AND DOWNSTREAM SHORT CIRCUIT ABNORMALITY (NON-OPERATION OF OCM, OC1, AND OC2)

| MODE 6 | SHORT CIRCUIT OF UPSTREAM SWITCHING ELEMENT AND DOWNSTREAM SWITCHING ELEMENT | <CURRENT DETECTION METHOD> AN1 AND AN2 ARE DETECTED IN THIRD PERIOD T3. | INTERNAL ABNORMALITY |
|---|---|---|---|
| MODE 7 | SHORT CIRCUIT OF UPSTREAM SWITCHING ELEMENT OR POSITIVE LINE SUPPLY FAULT, AND SHORT CIRCUIT OF DOWNSTREAM SWITCHING ELEMENT OR NEGATIVE LINE GROUND FAULT | <VOLTAGE RATIO DETERMINATION METHOD> VOLTAGE RATIO IS IN SECOND LEVEL H2 IN THIRD PERIOD T3. | INTERNAL AND EXTERNAL ABNORMALITY |
| MODE 8 | POSITIVE LINE SUPPLY FAULT AND NEGATIVE LINE GROUND FAULT | VOLTAGE RATIO IS IN SECOND LEVEL H2 IN THIRD PERIOD T3. | EXTERNAL ABNORMALITY |

POWER SUPPLY CONTROL APPARATUS OF ELECTRIC LOAD

BACKGROUND OF THE INVENTION

1. Field of the Invention

The present invention relates to a power supply control apparatus of an electric load in which plural switching elements are provided in a power supply circuit with respect to an electric load, and even though any switching element among the plural switching elements is short-circuited, a load current can be cut off by the other switching element, and particularly, to a power supply control apparatus of an electric load improved to be able to identify and store various abnormality states of a load wiring by a small number of abnormality monitoring signals.

2. Description of the Background Art

For example, in an on-vehicle electric load, when plural power supply switching elements are connected between a direct current power source that is an on-vehicle battery and each of plural on-vehicle electric loads, and when any power supply switching element is in a short circuit abnormality state, overall power supply is stopped by a common power source relay or a common power supply cutoff element, or the power supply is individually stopped by plural power supply cutoff elements that are serially connected to respective electric loads. For example, according to FIG. 1 in Patent Document 1, a power supply cutoff element 15 and a driver element 14a are serially connected, and even though the driver element 14a is in a short circuit abnormality state, it is possible to stop power supply to a coil load 13 by the power supply cutoff element 15, and to identify and detect an open fault or a short circuit fault of the coil load 13, an open fault or a short circuit fault of the driver element 14a using a voltage detecting circuit 14b. Further, according to Patent Document 2, switch elements 33 and 34 are connected on an upstream side of an injector 13 that is an electric load, a switch element 36 is connected on a downstream side thereof, in which a current or voltage of each switch element is monitored by a diagnosing section 42, and the diagnosis result is serially transmitted to a control unit 39.

[Patent Document 1] JP-A-2003-047148
[Patent Document 2] JP-A-2004-124890

SUMMARY OF THE INVENTION

(1) Problems of Background Art

According to the apparatus disclosed in Patent Document 1, when a so-called "positive line supply fault abnormality" occurs in which a positive wiring of the coil load 13 and a positive electrode wiring of a battery 12 are connected to each other, the power supply to the coil load 13 cannot be cut off. Further, the voltage detecting circuit 14b should include four types of voltage comparing circuits shown in FIG. 3 in Patent Document 1 with respect to one coil load 13, which increases the number of inputs of CPU 17. According to Patent Document 2, the switching elements are serially connected on the upstream side and the downstream side of the electric load, in which when the positive line supply fault abnormality occurs, the load current is cut off by the downstream side switching element. Further, when a so-called "negative line ground fault" occurs in which a negative wiring of the electric load is connected to a ground circuit, it is possible to cut off the load current by the upstream side switching element, but new abnormality generating factors such as a so-called "negative line supply abnormality" in which the negative wiring of the coil load 13 is connected to the positive electrode wiring of the battery 12 or a so-called "positive line ground fault abnormality" in which the positive wiring of the coil load 13 is connected to the ground circuit occur as different wiring abnormalities. Accordingly, the number of monitoring signals for detecting the occurrence of the various abnormalities is increased, which causes increase in a control load of a microprocessor that is control means. Thus, it is difficult to quickly open-circuit the upstream side and downstream side switching elements when an overcurrent occurs.

(2) Object of the Invention

An object of the invention is to provide a power supply control apparatus of an electric load in which switching elements are serially provided on an upstream side and a downstream side of the electric load, capable of cutting off a load current by a downstream side switching element when a positive line supply fault abnormality occurs in which a positive wiring of the electric load and a positive electrode wiring of a battery are connected to each other and cutting off the load current by an upstream side switching element when a negative line supply fault abnormality occurs in which a negative wiring of the electric load is connected to a ground circuit, to quickly open-circuit the upstream side switching element and the downstream side switching element when an overcurrent abnormality occurs, and capable of identifying and storing various abnormality states of a load wiring with a small number of monitoring signals.

According to an aspect of the invention, there is provided a power supply control apparatus of an electric load including: an upstream side switching element that is serially connected to the electric load on an upstream side of the electric load supplied with a load current by power supply from an external power source; a downstream side switching element that is serially connected to the electric load on a downstream side of the electric load; and a control circuit unit that uses a microprocessor as a main component and controls a conduction state of the upstream side switching element and the downstream side switching element. Here, when one switching element of the upstream side switching element and the downstream side switching element is abnormally short-circuited, the power supply is stopped by the other switching element; the power supply control apparatus includes an upstream overcurrent determination storage circuit that detects an upstream overcurrent as the load current flowing in the upstream side switching element exceeds a predetermined value to generate an upstream overcurrent detection signal and a downstream overcurrent determination storage circuit that detects a downstream overcurrent as the load current flowing in the downstream side switching element exceeds a predetermined value to generate a downstream overcurrent detection signal, or a synthetic overcurrent determination storage circuit that generates a synthetic overcurrent detection signal when any one of the upstream overcurrent flowing in the upstream side switching element and the downstream overcurrent flowing in the downstream side switching element, and includes a voltage monitoring circuit that generates a variable divided voltage in response to a switching state of the upstream side switching element and a switching state of the downstream side switching element; the voltage monitoring circuit includes a third resistance and a fourth resistance that divide a power source voltage of the external power source, at least one of a first resistance and a fifth resistance that is connected to a connecting portion of the third resistance and the fourth resistance at one end thereof, and a second resistance that connects the other end of the at least one of the first resistance and the fifth resistance to a positive wiring or a negative wiring of the power source voltage through the electric load; the other end of the first resistance is connected on one of the upstream side and the downstream side of the electric load; the other end of the fifth resistance is connected on the other of the upstream side and the downstream side of the electric load; the variable divided voltage is generated at both ends of the fourth resistance; the control circuit unit monitors a value of a power source voltage detection signal that is a voltage being in proportion to the power source voltage and a value of a load voltage detection signal that is a voltage being in proportion to the variable divided voltage, calculates a voltage ratio of the value of the power source voltage detection signal and the value of the load voltage detection signal, and monitors the upstream overcurrent detection signal and the downstream overcurrent detection signal, or the synthetic overcurrent detection signal; the control circuit unit further includes abnormality determination means for generating a power supply command signal for one of the upstream side switching element and the downstream side switching element and a conduction command signal for the other one thereof, and for determining an abnormality state of a load wiring for the electric load while the electric load is operated, and abnormality processing means for stopping the generation of the power supply command signal and the conduction command signal when the abnormality determination means determines the abnormality state, and for identifying and storing a plurality of types of abnormality occurrence information; the abnormality determination means determines the abnormality determination means (604a, 604c) determines the abnormality state of the load wiring based on a combination of a value of the voltage ratio corresponding to a generation state of the power supply command signal and the conduction command signal, and a generation state of the upstream overcurrent detection signal and the downstream overcurrent detection signal or the synthetic overcurrent detection signal; and the abnormality state of the load wiring includes at least one of a state where there is a doubt about a positive supply fault abnormality in which an upstream positive wiring of the electric load is connected to a positive electrode wiring of the external power source, or a positive line ground fault abnormality in which the upstream positive wiring of the electric load is connected to a negative electrode wiring of the external power source, a state where there is a doubt about a negative supply fault abnormality in which a downstream negative wiring of the electric load is connected to the positive electrode wiring of the external power source, or a negative line ground fault abnormality in which the downstream negative wiring of the electric load is connected to the negative electrode wiring of the external power source, and a state where there is a doubt about a load short circuit abnormality or a load disconnection abnormality in which the electric load is short-circuited or disconnected.

As described above, the power supply control apparatus of the electric load according to the invention includes the control circuit unit that gives the power supply command signal to one of the upstream switching element and the downstream switching element serially connected to the electric load, and gives the conduction command signal to the other thereof. The abnormality state of the load wiring is identified and determined based on the combination of the upstream and downstream overcurrent detection signals or the synthetic overcurrent detection signal generated by the upstream and downstream overcurrent determination storage circuits provided at the upstream and downstream positions or the synthetic overcurrent determination storage unit, and the value of the voltage ratio corresponding to the value obtained by dividing the value of the variable divided voltage generated by the voltage monitoring circuit for the electric load by the value of the power source voltage.

Accordingly, as described above, according to the power supply control apparatus of the electric load according to the invention, the abnormality state of the load wiring is identified and determined when the power supply control apparatus is operated, and the power supply command signal and the conduction command signal for one and the other of the upstream and downstream switching elements are stopped in response to the abnormality detection result. Thus, it is possible to prevent burning of the electric load, the load wiring and the upstream side switching element or the downstream side switching element, and to stop the occurrence of useless discharging from the external power source. Further, it is possible to correctly generate multi-stage determination signals with an inexpensive configuration with the value of the voltage ratio not being affected by the variation of the power source voltage, and to identify and determine various load wiring abnormalities by an inexpensive hardware configuration, thereby easily performing maintenance and inspection.

The foregoing and other objects, features, aspects, and advantages of the present invention will become more apparent from the following detailed description of the present invention when taken conjunction with the accompanying drawings.

BRIEF DESCRIPTION OF THE DRAWINGS

FIG. 5 is a diagram illustrating a list of identification determination corresponding to occurrence of various abnormalities in the power supply control apparatus of the electric load according to the first embodiment of the invention.

FIG. 12 is a diagram illustrating a list of identification determination corresponding to occurrence of various abnormalities in the power supply control apparatus of the electric load according to the second embodiment of the invention.

FIG. 13 is a flowchart illustrating an operation of an over-current monitoring subroutine of the power supply control apparatus of the electric load according to the second embodiment of the invention.

FIG. 18 is a diagram illustrating a list of identification determination corresponding to occurrence of various abnormalities in the power supply control apparatus of the electric load according to the third embodiment of the invention.

FIG. 22 is a diagram illustrating a list of identification determination corresponding to occurrence of various abnormalities in the power supply control apparatus of the electric load according to the fourth embodiment of the invention.

FIGS. 26A to 26E are diagrams illustrating a calculation example of a voltage ratio H of the voltage monitoring circuit shown in FIG. 25.

FIG. 27 is a diagram illustrating a list of identification determination corresponding to occurrence of various abnormalities of the voltage monitoring circuit shown in FIG. 25.

FIGS. 30A and 30B are diagrams illustrating a list of a double-abnormality common to the respective embodiments of the invention.

DETAILED DESCRIPTION OF THE INVENTION

First Embodiment (1) Detailed Description of Configuration

Figure 1:
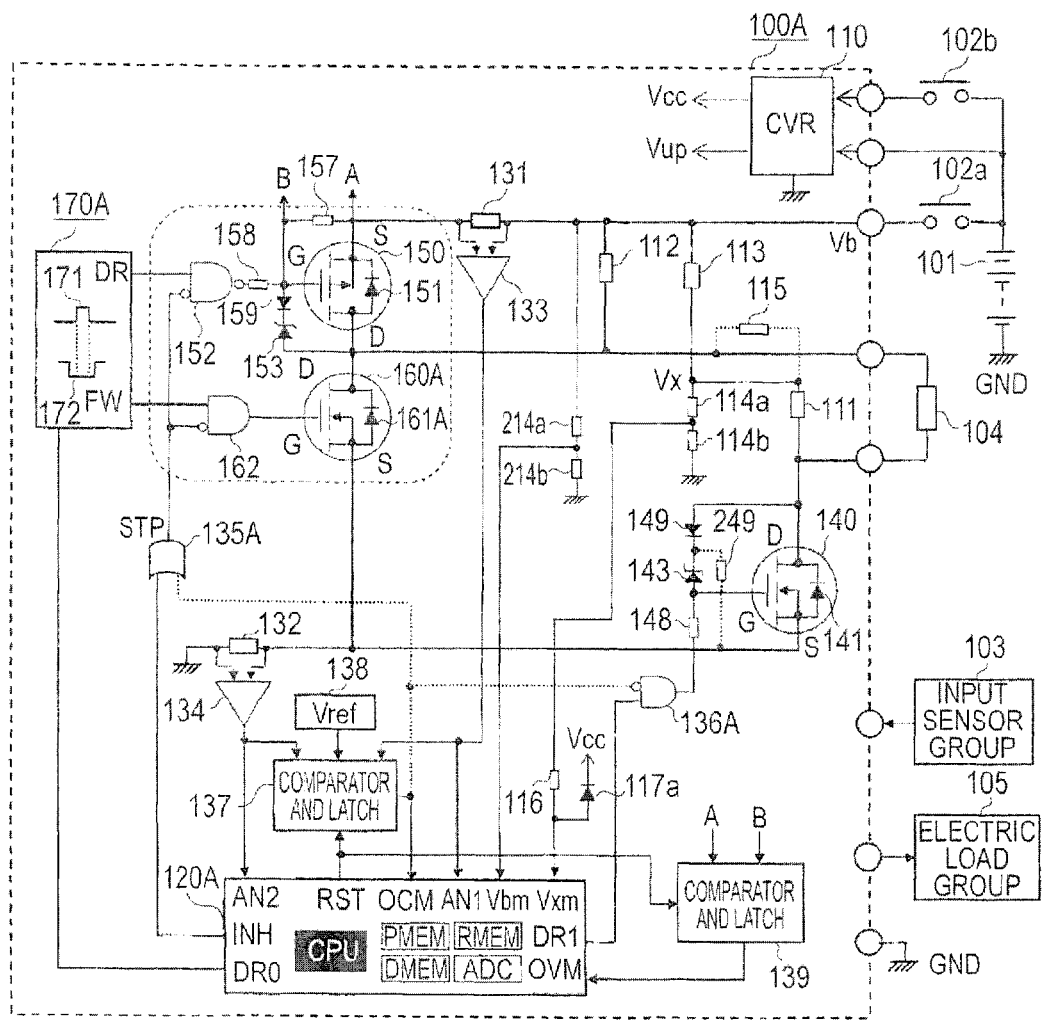
FIG. 1 is an overall circuit diagram of a power supply control apparatus of an electric load according to a first embodiment of the invention.

Hereinafter, a configuration of a power supply control apparatus of an electric load according to a first embodiment of the invention will be described in detail. FIG. 1 is an overall circuit diagram of the power supply control apparatus of the electric load according to the first embodiment of the invention. In FIG. 1, a power supply control apparatus 100A is supplied with power from an external power source 101 that is an in-vehicle battery, for example, is operated in response to an operation state of an input sensor group 103, and includes a control circuit unit 120A that drive-controls an electric load group 105 that includes an electric load 104 as a main component. In the first embodiment, the power supply control apparatus 100A includes a load control circuit unit that is supplied with a power source voltage Vb through a power source switch 102a, and a constant voltage power source 110 that is supplied with power through a power source switch 102b to generate a control voltage Vcc that is a predetermined stabilizing voltage, and is directly supplied with power from the external power source 101 to generate a backup voltage Vup that is a predetermined stabilizing voltage. The control circuit unit 120A operated by the control voltage Vcc includes a program memory PMEM that cooperates with a microprocessor CPU, a volatile RAM memory RMEM, a nonvolatile data memory DMEM, and a multi-channel AD converter ADC, in which storage content of the RAM memory RMEM is blackout-held by the backup voltage Vup even though the power source switch 102b is open-circuited.

An upstream side power supply switching element 150 that is serially connected at an upstream position of the electric load 104 is a P-channel field effect transistor, which may be referred to as an upstream side switching element 150 or a power supply switching element 150. Here, the upstream side refers to a position on a side closer to a positive electrode wiring of the external power source 101 than to the electric load 104. The power supply switching element refers to a switching element that is intermittently controlled by a power supply command signal DR0 generated by the control circuit unit 120A and can control an average power supply voltage with respect to the electric load 104. On the other hand, in FIG. 15 that illustrates a third embodiment to be described later, a downstream side power supply switching element 350 is used. Thus, the upstream side or downstream side power supply switching elements 150 and 350 may be generally referred to as a power supply switching element X.

A downstream side conduction switching element 140 that is serially connected at a downstream position of the electric load 104 is an N-channel field effect transistor, which may be referred to as a downstream side switching element 140 or a conduction switching element 140. Here, the downstream side refers to a position on a side closer to a negative electrode wiring of the external power source 101 than to the electric load 104. The conduction switching element refers to a switching element that is controlled to be opened and closed by a conduction command signal DR1 generated by the control circuit unit 120A, which is open-circuited when power supply to the electric load 104 is stopped, and is constantly closed when the power supply switching element is close-circuited and in a period when the intermittent control is performed. On the other hand, in FIG. 15 that illustrates the third embodiment to be described later, an upstream side conduction switching element 340 is used. Thus, the downstream side or upstream side conduction switching elements 140 and 340 may be generally referred to as a conduction switching element Y.

A downstream side flywheel switching element 160A that is connected in parallel to a serial circuit of the electric load 104 and the downstream side conduction switching element 140 at a downstream position of the upstream side power supply switching element 150 uses an N-channel field effect transistor having an inverted structure compared with that of the upstream side power supply switching element 150. Here, a downstream side flywheel switching element 160B in FIG. 9 to be described later uses a P-channel field effect transistor having the same structure as that of the upstream side power supply switching element 150. Further, an upstream side flywheel switching element 360C in FIG. 15 to be described later uses an N-channel field effect transistor having the same structure as that of a downstream side power supply switching element 350, but an upstream side flywheel switching element 360D in FIG. 21 to be described later uses a P-channel field effect transistor having an inverted structure compared with that of the downstream side power supply switching element 350. The downstream side or upstream side flywheel switching elements may be generally referred to as a flywheel switching element Z.

At a further upstream position of the upstream side power supply switching element 150, an upstream current detecting resistance 131 is provided. A voltage between both ends of the upstream current detecting resistance 131 is amplified by an upstream current detecting circuit 133 that is a differential amplifier circuit, and then, is input to the multi-channel AD converter ADC of the control circuit unit 120A as an upstream current detection signal AN1 and is input to a synthetic overcurrent determination storage circuit 137. A downstream current detecting resistance 132 is provided at a downstream position of a parallel connecting point of the downstream side conduction switching element 140 and the downstream flywheel switching element 160A. A voltage between both ends of the downstream current detecting resistance 132 is amplified by a downstream current detecting circuit 134 that is a differential amplifier circuit, and then, is input to the multi-channel AD converter ADC of the control circuit unit 120A as a downstream current detection signal AN2 and is input to the synthetic overcurrent determination storage circuit 137.

The synthetic overcurrent determination storage circuit 137 individually compares a value of a comparison reference voltage Vref generated by a reference voltage generation circuit 138 with a value of the upstream current detection signal AN1 or a value of the downstream current detection signal AN2. If any value of the current detection signals exceeds a predetermined threshold current, the synthetic overcurrent determination storage circuit 137 generates a synthetic overcurrent detection signal OCM and inputs the synthetic overcurrent detection signal OCM to a control circuit unit i120A. The upstream current detecting resistance 131 and the upstream current detecting circuit 133 may be provided in the upstream power supply switching element 150. Further, the downstream flywheel switching element 160A and the downstream conduction switching element 140 may be provided with the downstream current detecting resistance 132 and the downstream current detecting circuit 134 at each downstream position thereof, to individually input the value of each downstream current detecting circuit AN2 to the control circuit unit 120A or the synthetic overcurrent determination storage circuit 137.

In the downstream conduction switching element 140, when an output logic level of a gate element 136A is "H", a gate voltage is applied between a gate terminal G and a source terminal S through a driving resistance 148, and a load current flows from an upstream drain terminal D to a downstream source terminal S, in which a parasitic diode 141 is connected to the source terminal S and the drain terminal D. When the output logic level of the gate element 136A is set to "L", the conduction between the drain terminal D and the source terminal S of the downstream conduction switching element 140 is cut off. However, when the electric load 104 is an inductive load such as an electromagnetic coil having an inductance component, a serge voltage is generated according to the open circuit state of the downstream side conduction switching element 140, and a serge current flows in the driving resistance 148 through a diode 149 that is serially connected between the drain terminal D and the gate terminal G and a first constant voltage diode 143.

As a result, the downstream side conduction switching element 140 is close-circuited again, and thus, the serge voltage is decreased. Then, when the downstream side conduction switching element 140 is open-circuited again, the voltage between the drain terminal D and the source terminal S of the downstream side conduction switching element 140 is negative-feedback-controlled to become a predetermined constant voltage corresponding to the operation voltage of the first constant voltage diode 143, and then, the current flowing in the electric load 104 is rapidly attenuated to become zero. Here, an inverted auxiliary resistance 249 may be connected between a connecting point of the diode 149 and the first constant voltage diode 143 and the source terminal S. The inverted auxiliary resistance 249 causes a forward minute current to flow in the serial diode 149 from the start of generation of an inductive serge voltage, and prevents an inverted operation delay of the serial diode 149 generated when the serge voltage reaches the operation voltage of the first constant voltage diode 143 and generation of overshoot due to the inverted operation delay, to thereby prevent excessive withstanding voltage between the drain and the source of the downstream conduction switching element 140.

When an output logic level of a gate circuit 152 is "L", the upstream side power supply switching element 150 generates a gate voltage voltage-divided by the driving resistance 158 and the gate resistance 157, and applies the gate voltage between the source terminal S and the gate terminal G. Thus, a negative load current flows from an upstream source terminal S to a downstream drain terminal D. Further, a parasitic diode 151 is connected between the drain D and the source terminal S. When the output logic level of the gate circuit 152 is "H", the conduction between the source terminal S and the drain terminal D of the upstream side power supply switching element 150 is cut off. However, when the electric load 104 is an inductive load such as an electromagnetic coil having an inductance component and the downstream side flywheel switching element 160A to be described later is in a disconnection abnormality state, a serge voltage is generated according to the open circuit state of the upstream side power supply switching element 150 or the downstream side conduction switching element 140, and a serge current flows in the gate resistance 157 through a diode 159 that is serially connected between the gate terminal G and the drain terminal D of the upstream side power supply switching element 150 and a second constant voltage diode 153.

As a result, the upstream side power supply switching element 150 is close-circuited again, and thus, the serge voltage between the source terminal S and the drain terminal D of the upstream side power supply switching element 150 is decreased. Then, when the upstream side power supply switching element 150 is open-circuited again, the voltage between the source terminal S and the drain terminal D of the upstream side power supply switching element 150 is negative-feedback-controlled to become a predetermined constant voltage corresponding to the operation voltage of the second constant voltage diode 153, and then, the current flowing in the electric load 104 is rapidly attenuated to become zero. When the downstream side flywheel switching element 160A is in the disconnection abnormality state, the overvoltage determination storage circuit 139 detects for storage the serge voltage generated in the gate resistance 157, and inputs an overvoltage detection signal OVM to the control circuit unit 120A. The control circuit unit 120A stores the abnormality occurrence, stops the generation of the power supply command signal DR0 and the conduction command signal DR1, and then, resets the overvoltage determination storage circuit 139.

The downstream side flywheel switching element 160A is configured so that the load current flowing in the electric load 104 as the upstream side power supply switching element 150 and the downstream side conduction switching element 140 are close-circuited is commutated through the downstream side flywheel switching element 160A and the downstream conduction switching element 140 as the upstream side power supply switching element 150 is open-circuited. In the downstream side flywheel switching element 160A, when the output logic level of the gate circuit 162 is "H", a gate voltage is applied between a gate terminal G and a source terminal S, and thus, a commutation load current flows from the source terminal S that is on the upstream side to the drain terminal D that is on the downstream side. Further, a commutation current flows in a parasitic diode 161A connected between the source drain S and the drain terminal D until the downstream side flywheel switching element 160A is close-circuited.

A flywheel control circuit 170A generates a commutation command signal FW and a power driving signal DR at a timing when the downstream side flywheel switching element 160A and the upstream side power supply switching element 150 are not close-circuited at the same time, by setting the commutation command signal FW indicated by a waveform 172 to the logic level "L" to first open-circuit the downstream side flywheel switching element 160A and then by setting the power supply driving signal DR indicated by a waveform 171 to the logic level "H" to close-circuit the upstream side power supply switching element 150, when the control circuit unit 120A generates the power supply command signal DR0 (logic level "H"), and by setting the power supply driving signal DR to the logic level "L" to first open-circuit the upstream side power supply switching element 150 and then by setting the commutation command signal FW to the logic level "H" to close-circuit the downstream side flywheel switching element 160A, when the control circuit unit 120A stops the power supply command signal DR0 (logic level "L").

When the control circuit unit 120A generates an output inhibition signal INH (logic level "H"), or when the synthetic overcurrent determination storage circuit 137 generates a synthetic overcurrent detection signal OCM (logic level "H"), a gate element 135A that is an OR element acts on the gate circuit 152 and the gate circuit 162 to open-circuit both of the upstream side power supply switching element 150 and the downstream side flywheel switching element 160A. Further, the gate element 136A close-circuits and drives the downstream side conduction switching element 140 when the control circuit unit 120A generates the conduction command signal DR1 (logic level "H"), but sets the output logic level of the gate element 136A "L" to open-circuit the downstream side conduction switching element 140 when the synthetic overcurrent determination storage circuit 137 generates the synthetic overcurrent detection signal OCM (logic level "H"). On the other hand, the control circuit unit 120A that receives the synthetic overcurrent detection signal OCM stops the power supply command signal DR0 and the conduction command signal DR1 to reset the synthetic overcurrent determination storage circuit 137.

Instead of a hardware cutoff method of forcibly open-circuiting all the switching elements through the gate elements 135A and 136A by a signal circuit indicated by a dotted line when the synthetic overcurrent determination storage circuit 137 generates the synthetic overcurrent detection signal OCM, a software cutoff method may be used in which the control circuit unit 120A that receives the synthetic overcurrent detection signal OCM reads and stores the values of the upstream current detection signal AN1 and the downstream current detection signal AN2, stops the power supply command signal DR0 and the conduction command signal DR1, and resets the synthetic overcurrent determination storage circuit 137, with the signal circuit indicated by the dotted line being removed. Here, in the case of the software cutoff method, it is necessary to suppress the overcurrent by decreasing the wire diameter of a load wiring and to increase overcurrent yield strength of each switching element so that each switching element is not damaged by the overcurrent due to a delay time from the time when the overcurrent abnormality occurs to the time when each switching element is open-circuited.

Figure 3:
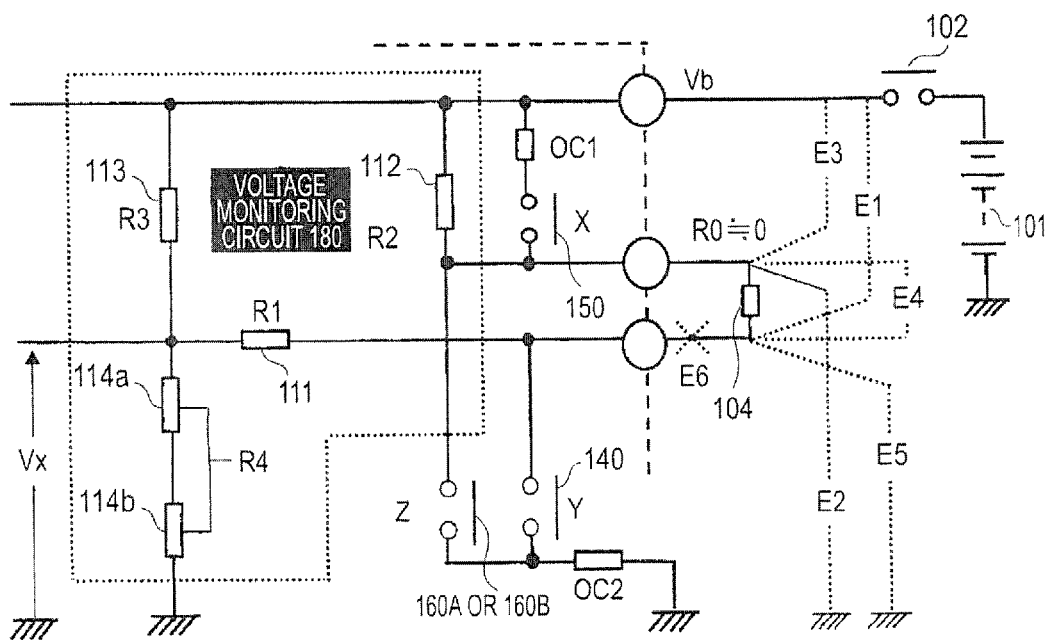
FIG. 3 is a circuit diagram illustrating details of a voltage monitoring circuit in the power supply control apparatus of the electric load according to the first embodiment of the invention.

A power source voltage Vb is applied to a third resistance 113 and fourth resistances 114a and 114b that form a voltage monitoring circuit 180 to be described later in FIG. 3 and are serially connected to each other, and a divided voltage due to a first voltage divider circuit formed by the fourth resistances 114a and 114b on the downstream side thereof is input to the multi-channel AD converter ADC in the control circuit unit 120A as a load voltage detection signal Vxm through an input resistance 116. Here, when the downstream side conduction switching element 140 is open-circuited, in order to prevent a high server voltage generated by the electric load 104 from being applied to the control circuit unit 120A, an input terminal of the load voltage detection signal Vxm is connected to an output circuit of a control voltage Vcc of the constant voltage power source 110 by a clamp diode 117a. On the other hand, the power source voltage Vb is applied to voltage-dividing resistances 214a and 214b that form a second voltage divider circuit, and a divided voltage thereof is input to the multi-channel AD converter ADC in the control circuit unit 120A as a power source voltage detection signal Vbm.

The voltage-dividing resistances are selected so that a value of a voltage division ratio "G0=resistance 114a/(resistance 114a+resistance 114b)" due to the first voltage divider circuit and a value of a voltage division ratio "G0=resistance 214a/(resistance 214a+resistance 214b)" due to the second voltage divider circuit are equal to each other. Accordingly, since the relation between a variable divided voltage Vx that is a divided voltage due to the third resistance 113 and the fourth resistances 114a and 114b and the load voltage detection signal Vxm is "Vxm=G0×Vx", and since the relation between the power source voltage Vb and the power source voltage detection signal Vbm is "Vbm=G0×Vb", the relation of a voltage ratio "G=Vx/Vb=Vxm/Vbm" is established. An end of a first resistance 111 is connected to a connecting point of the third resistance 113 and the fourth resistances 114a and 114b, and the other end thereof is connected to a connecting point of the electric load 104 and the downstream side conduction switching element 140. Further, a second resistance 112 is connected in parallel with the serial circuit of the upstream side power supply switching element 150 and the upstream current detecting resistance 131.

Accordingly, when the upstream side power supply switching element 150 and the downstream side conduction switching element 140 are open-circuited, a series circuit of the first resistance 111, the electric load 104, and the second resistance 112 is connected in parallel with the third resistance 113. Since a resistance value of the electric load 104 is an extremely small value compared with the respective resistances of the first resistance 111 to the fourth resistances 114a and 114b, the resistance value of the electric load 104 may be ignored. However, when the electric load 104 is disconnected, the parallel circuit with respect to the third resistance 113 is cut off. In a non-disconnection state of the electric load 104, if only the upstream side power supply switching element 150 is close-circuited, the second resistance 112 is short-circuited, and only the first resistance 111 is connected in parallel with the third resistance 113 through the electric load 104 with a low resistance. Then, when only the downstream side conduction switching element 140 is close-circuited, the first resistance 111 is connected in parallel with the fourth resistances 114a and 114b, and this state is not changed even though the upstream side power supply switching element 150 is close-circuited.

Accordingly, by monitoring the variable divided voltage Vx at the connecting point of the third resistance 113 and the fourth resistances 114a and 114b, it is possible to determine whether the upstream side power supply switching element 150 and the downstream side conduction switching element 140 are open-circuited or close-circuited according to the command of the control circuit unit 120A, and to identify and determine disconnection or short circuit of the switching elements, the presence or absence of disconnection of the electric load 104, or the like. When a voltage monitoring circuit 190 shown in FIG. 25 to be described later is used, a fifth resistance 115 connected between the connecting point of the third resistance 113 and the fourth resistances 114a and 114b, and an upstream terminal of the electric load 104 is further provided. The fifth resistance 115 is configured to be connected in parallel with the third resistance 113 when the upstream side power supply switching element 150 is close-circuited. Thus, according to the basic voltage monitoring circuit 180 to be described later, the voltage ratio G of four stages is detected, and according to a subdivided voltage monitoring circuit 190 to be described later, a voltage ratio H of five stages is obtained.

(2) Detailed Description of Operation

Next, an operation of the power supply control apparatus of the electric load according to the first embodiment of the invention configured as shown in FIG. 1 will be described in detail. First, in FIG. 1, if the power source switches 102a and 102b are close-circuited and the control circuit unit 120A starts the operation, the microprocessor CPU drive-controls the electric load group 105 in response to an operation state of the input sensor group 103 and the content of the program memory PMEM, and generates the power supply command signal DR0 and the conduction command signal DR1 with respect to the electric load 104 that is one of plural electric loads in the electric load group 105. Command timings and operations of the respective units are shown in a time chart of FIG. 2 for illustrating the operation.

Figure 2:
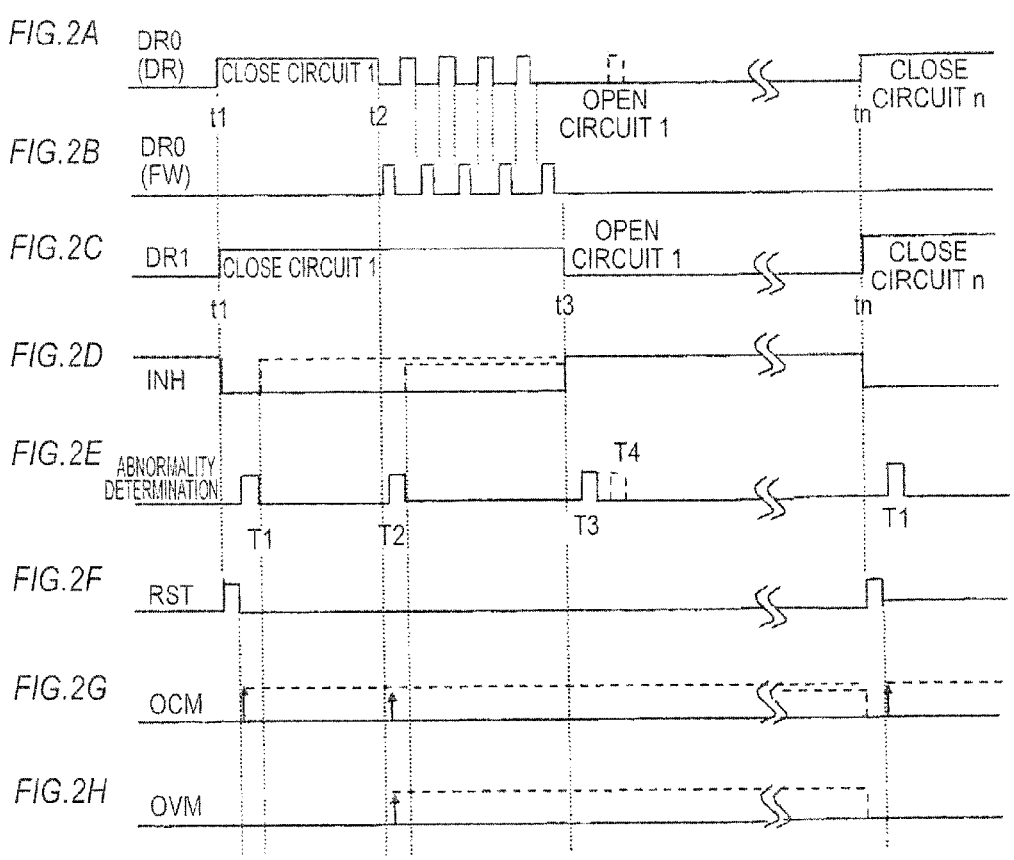
FIGS. 2A to 2H are collectively a timing chart illustrating the operation of the power supply control apparatus of the electric load according to the first embodiment of the invention.

FIG. 2 is the time chart illustrating the operation of the power supply control apparatus of the electric load according to the first embodiment of the invention. (A) of FIG. 2 shows a temporal change of the power supply command signal DR0. At time t1 determined in response to the operation state of the input sensor group 103, the power supply switching element X is close-circuited and driven at the logic level "H" (changed from valley to ridge in the waveform in the figure). At time t2, the intermittent operation is started, and then, at time t3, the power supply switching element X is de-energized and open-circuited at the logic level "L". Then, the same operation is repeated in a predetermined open circuit period determined in response to the operation state of the input sensor group 103 again, and then, at time tn, an n-th close circuit driving is started. (B) of FIG. 2 shows a temporal change of the open circuit and close circuit states of the flywheel switching element Z. The flywheel switching element Z is close-circuited at a predetermined delay time after the power supply switching element X is changed from the close circuit state to the open circuit state, in which a waveform in the figure is changed from a valley to a ridge. Further, the flywheel switching element Z is open-circuited immediately after the power supply command signal DR0 is changed to the logic level "H", and the power supply switching element X is close-circuited after the predetermined delay time.

(C) of FIG. 2 shows a temporal change of the conduction command signal DR1. At time t1, the conduction switching element Y is close-circuited and driven at the logic level "H", and then, at time t3, the conduction switching element Y is de-energized and open-circuited at the logic level "L". Then, the same operation is repeated at a predetermined open circuit period. Then, at time tn, an n-th close circuit driving is started. Accordingly, between time t1 and time t2, the power voltage Vb is continuously applied to the electric load 104, and thus, the load current rapidly increases. Then, from time t2 when the load current is estimated to reach a target current or to exceed the target current, the power supply switching element X is intermittently driven by a power supply duty (power supply time/intermittent cycle) in inverse proportion to the power source voltage Vb to maintain a predetermined average holding voltage. (D) of FIG. 2 shows a temporal change of the output inhibition signal INH with respect to the power supply switching element X and the commutation circuit element Z. In a period from time t1 to time t3 when the conduction switching element Y is close-circuited, an inhibition state is released at the logic level "L", and then, in a period when the conduction switching element Y is open-circuited, the inhibition state is maintained at the logic level "H".

(E) of FIG. 2 shows an abnormality determination situation. In a first period T1, a second period T2, and a third period T3 immediately after time t1, time t2, and time t3, the control circuit unit 120A performs abnormality determination. At the first period T1 and the third period T3 when an overcurrent abnormality does not occur, the control circuit unit 120A reads the values of the power source voltage detection signal Vbm and the load voltage detection signal Vxm to calculate the voltage ratio Vxm/Vbm. Here, in the case of a fourth embodiment to be described later, at a fourth period T4 subsequent to the third period T3, the upstream side switching element is also close-circuited, and the control circuit unit 120A reads the values of the power source voltage detection signal Vbm and the load voltage detection signal Vxm in a state where the downstream side switching element is open-circuited to calculate the voltage ratio Vxm/Vbm. (F) of FIG. 2 shows a temporal change of a reset pulse PLS. At time t1, the reset pulse PLS is generated to reset the storage contents of the synthetic overcurrent determination storage circuit 137 and the overvoltage determination storage circuit 139. (G) of FIG. 2 shows an example of a timing when the synthetic overcurrent detection signal OCM is generated. For example, the synthetic overcurrent detection signal OCM is generated immediately after time t1 or immediately after time t2. If the synthetic overcurrent detection signal OCM is generated, in the first period T1 in (E) of FIG. 2, the output inhibition signal INH in (D) of FIG. 2 is generated, or in the second period T2 in (E) of FIG. 2, the output inhibition signal INH in (D) of FIG. 2 is generated. (H) of FIG. 2 shows an example of a timing when an overvoltage detection signal VCM is generated. The overvoltage detection signal VCM is generated immediately after time t2, for example.

Next, details of the voltage monitoring circuit 180 in FIG. 1 will be described. FIG. 3 is a circuit diagram illustrating details of the voltage monitoring circuit in the power supply control apparatus of the electric load according to the first embodiment of the invention. In FIG. 3, a contact X corresponds to a schematic diagram in which the upstream side power supply switching element 150 is approximated to a contact circuit, a contact Y corresponds to a schematic diagram in which the downstream side conduction switching element 140 is approximated to a contact circuit, and a contact Z corresponds to a schematic diagram in which the downstream side flywheel switching element 160A is approximated to a contact circuit, but in the case of a second embodiment shown in FIG. 9 to be described later, the contact Z corresponds to a schematic diagram in which the downstream side flywheel switching element 160B is approximated to a contact circuit. Further, when a resistance value of the first resistance 111 described in FIG. 1 is represented as R1, a resistance value of the second resistance 112 is represented as R2, a resistance value of the third resistance 113 is represented as R3, a serial synthetic resistance value of the fourth resistances 114a and 114b is represented as R4, a resistance value R0 of the electric load 104 satisfies the relation of "R1, R2, R3, R4>>R0≅0". Furthermore, reference sign OC1 corresponds to a schematic diagram of the upstream current detecting resistance 131, and reference sign OC2 corresponds to a schematic diagram of the downstream current detecting resistance 132, in which a resistance value of each current detecting resistance is a minute resistance value of an ignorable level compared with the resistance value R0 of the electric load 104.

Reference sign E1 represents a path of a negative line supply fault where the negative wiring of the electric load 104 is connected to the positive electrode wiring of the external power source 101, and reference sign E2 represents a path of a positive line ground fault where the positive wiring of the electric load 104 is connected to the negative electrode wiring of the external power source 101. Reference sign E3 represents a path of a positive line supply fault where the positive wiring of the electric load 104 is connected to the positive electrode wiring of the external power source 101, and reference sign E4 represents a path of a load short circuit that indicates short circuits of the positive wiring and the negative wiring of the electric load 104, or collectively indicates internal short circuits of the electric load. Reference sign E5 represents a path of a negative ground short circuit where the negative wiring of the electric load 104 is connected to the negative electrode wiring of the external power source 101, and reference sign E6 represents an example of a portion of load disconnection that indicates disconnection of the positive wiring or negative wiring of the electric load 104, or collectively indicates internal disconnection of the electric load 104. Here, an outline of roles of the upstream current detecting resistance 131 and the downstream current detecting resistance 132 will be described as follows. For example, as an upstream abnormality, when the upstream contact X shows the short circuit abnormality and when the positive line supply fault E3 occurs, only the second resistance 112 is short-circuited, and thus, supply fault the variable divided voltage Vx is not changed, which cannot be identified as it is.

However, in the case of the short circuit abnormality of the upstream contact X, the measurement of the load current using the upstream current detecting resistance 131 can be performed, and the value matches with the measured value of the load current using the downstream current detecting resistance 132, whereas in the case of the positive line supply fault E3, the measurement of the load current using the upstream current detecting resistance 131 is not performed, and the value is smaller than the measured value of the load current using the downstream current detecting resistance 132. Thus, the short circuit abnormality of the upstream contact X and the positive line supply fault E3 can be differently identified. Further, as a downstream abnormality, the relation of the short circuit abnormality of the stream contact Y and the negative line ground fault E5 is similar to the upstream abnormality, in which the identification can be performed by the magnitude relation of the measured values of the load currents on the upstream side and the downstream side. Further, in the case of the negative short circuit E4, it is determined that the measured values of the load currents on the upstream side and the downstream side are excessively large.

Figure 4A:
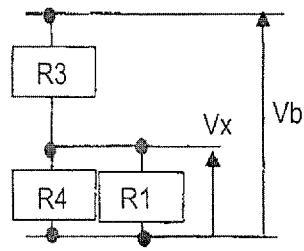
FIGS. 4A to 4D are diagrams illustrating a calculation example of a voltage ratio G of the voltage monitoring circuit in the power supply control apparatus of the electric load according to the first embodiment of the invention.
Figure 4B:
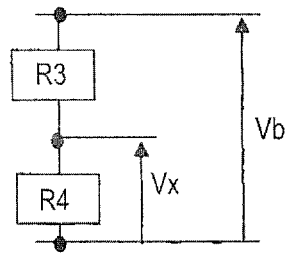
Figure 4C:
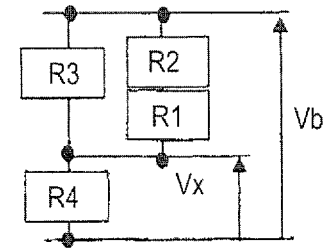
Figure 4D:
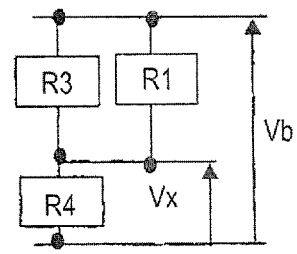

Next, FIG. 4 that is a calculation example of the voltage ratio G in FIG. 3 will be described. FIG. 4 is a diagram illustrating the calculation example of the voltage ratio G of the voltage monitoring circuit in the power supply control apparatus of the electric load according to the first embodiment of the invention. In FIG. 4, when the resistance value of the first resistance 111 is set to "R1=4.7 kΩ", the resistance value R of the second resistance 112 is set to "R2=47 kΩ", and the resistance value of the third resistance 113 is set to "R3=120 kΩ", and the serial synthetic resistance of the fourth resistances 114a and 114b is set to "R4=47 kΩ", the value of the voltage ratio "G=Vx/Vb" is calculated as follows. FIG. 4A shows a case of a first level where the upstream contact and the downstream contact are all close-circuited, in which a voltage ratio of "G1=0.034" is obtained regardless of the presence or absence of the load disconnection. FIG. 4B shows a case of a second level where the upstream contact may be open-circuited or close-circuited, the down-downstream contact is open-circuited, and the load disconnection is present, in which a voltage ratio of "G2=0.28" is obtained. FIG. 4C shows a case of a third level where the upstream contact and the downstream contact are all open-circuited and the load disconnection is not present, in which a voltage ratio of "G3=0.57" is obtained. FIG. 4D shows a case of a fourth level where the upstream contact is close-circuited, the downstream contact is open-circuited, and the load disconnection is not present, in which a voltage ratio of "G4=0.91" is obtained.

Next, a list of identification determination corresponding to occurrence of various abnormalities in the power supply control apparatus of the electric load according to the first embodiment of the invention shown in FIG. 1 will be described. FIG. 5 is a diagram illustrating a list of identification determination corresponding to occurrence of various abnormalities in the power supply control apparatus of the electric load according to the first embodiment of the invention. In FIG. 5, a left half of upper four rows represents command states with respect to the power supply switching element X, the flywheel switching element Z, and the conduction switching element Y. In the first period T1 in FIG. 2, the power supply switching element X is given a close circuit command, the flywheel switching element Z is given an open circuit command, and the conduction switching element Y is given a close circuit command. Further, in the second period T2 in FIG. 2, the power supply switching element X is given an open circuit command, the flywheel switching element Z is given a close circuit command, and the conduction switching element Y is given a close circuit command. Further, in the third period T3 in FIG. 2, all of the power supply switching element X, the flywheel switching element Z, and the conduction switching element Y are given an open circuit command.

LAN1 and LAN2 shown in a note section of a right half of the upper four rows represent an upstream current storage value and a downstream current storage value when the overcurrent abnormality occurs. If "LAN1>LAN2=0", this means that the overcurrent flows only on the side of the upstream current detecting resistance 131 and does not flow on the side of the downstream current detecting resistance 132. This state is indicated as OC1 under the note section in the table. Further, if "LAN2>LAN1=0", this means that the overcurrent flows only on the side of the downstream current detecting resistance 132, and does not flow on the side of the upstream current detecting resistance 131. This state is indicated as OC2 under the note section in the table. Further, if "LAN1=LAN2>0", this means that the overcurrent flows on both sides of the upstream current detecting resistance 131 and the downstream current detecting resistance 132. This state is indicated as OC12 under the note section in the table.

Whether the current detecting function is given to the control circuit unit 120A depends on the degree that the abnormality determination is subdivided in detail. A left side of a right half in FIG. 5 represents abnormality determination when the current detection function is not provided, and a right side of the right half in FIG. 5 represents abnormality determination when the current detection function is provided. In a middle part in FIG. 5, there are provided five main divisions of positive line ground fault/downstream Z supply fault, negative line supply fault, load short circuit, positive line supply fault/upstream X short circuit, and double faults that are generation factors of overcurrent abnormalities, or seven detailed divisions in which the positive line ground fault and the downstream Z short circuit are divided and the positive line supply fault and the upstream X short circuit are divided. Here, a method is shown in which the identification determination of the abnormality occurrence content is performed based on the combination of the values of the synthetic overcurrent detection signal OCM and the voltage ratio G, with respect to these divisions.

In a lower part in FIG. 5, there is provided five main divisions of normal/upstream X disconnection, load ground fault/downstream Y short circuit, load disconnection, downstream Y disconnection, and downstream Z disconnection, or seven detailed divisions in which the normal and the upstream X disconnection are divided and the load ground fault and the downstream Y short circuit are divided, which are normality/abnormality determination divisions when the overcurrent abnormality does not occur. Here, a method is shown in which the identification determination of the abnormality occurrence content is performed based on only the value of the voltage ratio G, with respect to these divisions. The specific methods relating to the identification determination of the abnormality occurrence content that is list-displayed in FIG. 5 will be described by flowcharts of FIGS. 6 to 8, but in any case, a multiple-abnormality generated when plural types of abnormalities occur at the same time are not described.

However, a double-abnormality in which the overcurrent abnormality occurs in the third period T3 when the upstream and downstream switching elements are given the open circuit command, or an upstream and downstream short circuit abnormality in which the overcurrent does not flow but a predetermined load current continuously flows will be described later with reference to FIG. 30. Further, when a different multiple-abnormality occurs that does not correspond to the double-abnormality in which the overcurrent flows or the upstream and downstream short circuit abnormality in which the predetermined current flows, the generation factors cannot be specified, but the abnormality detection is performed to be represented by any one of the various abnormality factors handled herein. For example, in FIG. 3, in a state where the load disconnection abnormality E6 does not occur, since a short circuit abnormality of a downstream side switching element 140Y and the negative line ground fault abnormality E5 are in parallel with each other, influences on the voltage monitoring circuit 180 are the same. Thus, in order to identify the influences, it is necessary to determine the presence or absence of the downstream current detection signal AN2.

However, even though it is determined that the negative line ground fault abnormality E5 occurs from the downstream current detection signal AN2 of zero, the short circuit abnormality of the downstream side switching element 140Y and the negative line ground fault abnormality E5 may occur at the same time. The expression that the negative line ground fault abnormality E5 may occur means that the abnormality is the negative line ground fault abnormality E5, the short circuit abnormality of the downstream side switching element 140Y, or the simultaneous occurrence of the short circuit abnormality of the downstream side switching element 140Y and the negative line ground fault abnormality E5. Similarly, the relation of a short circuit abnormality of an upstream side switching element 150X and the positive line supply fault E3 and the relation of the short circuit abnormality of the flywheel switching element 160A and the positive line ground fault abnormality E2 are a parallel relation, and thus, there remains an indeterminable doubt.

Figure 6:
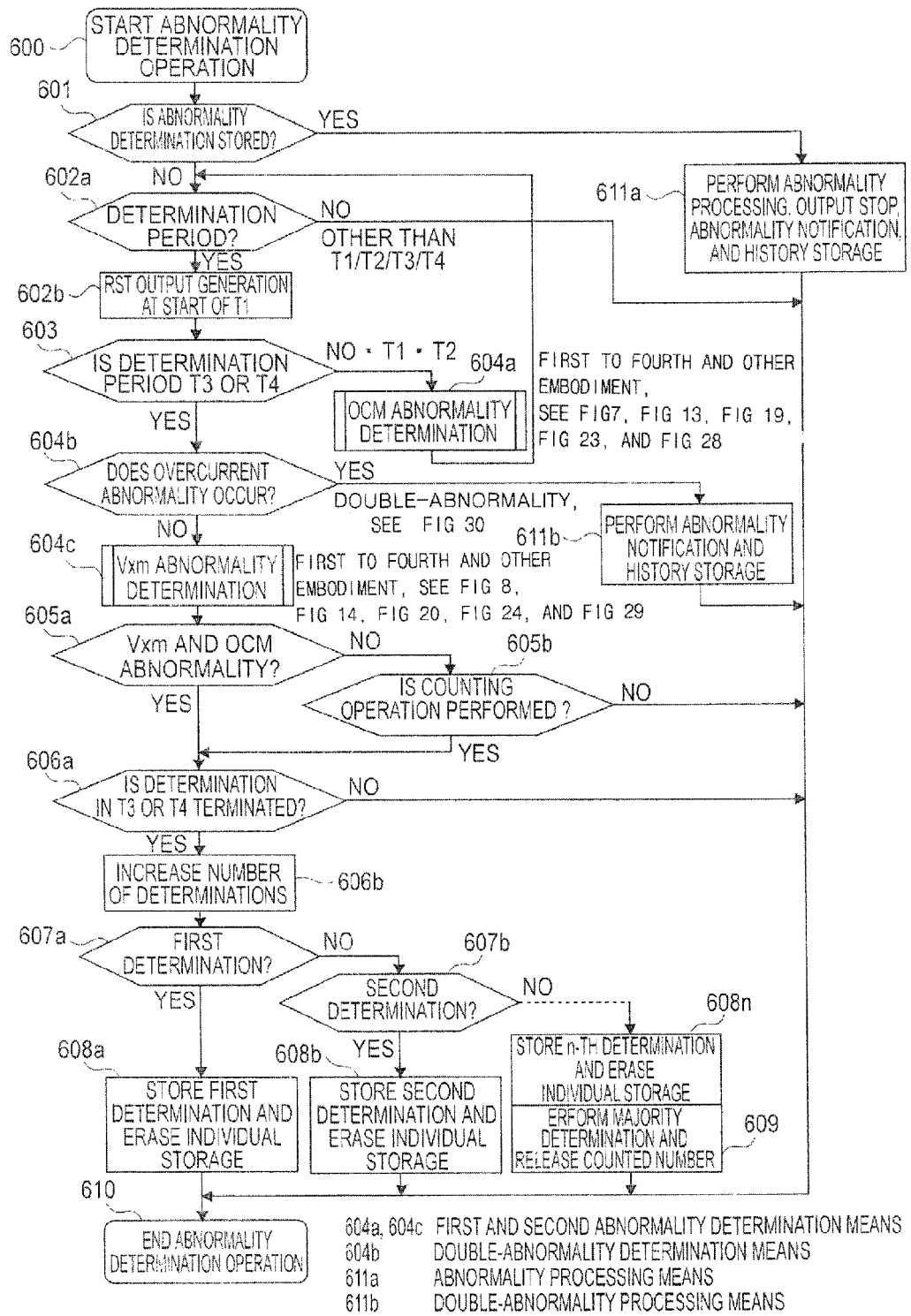
FIG. 6 is a flowchart illustrating an abnormality determination operation of the voltage monitoring circuit in the power supply control apparatus of the electric load according to the first embodiment of the invention.
Figure 7:
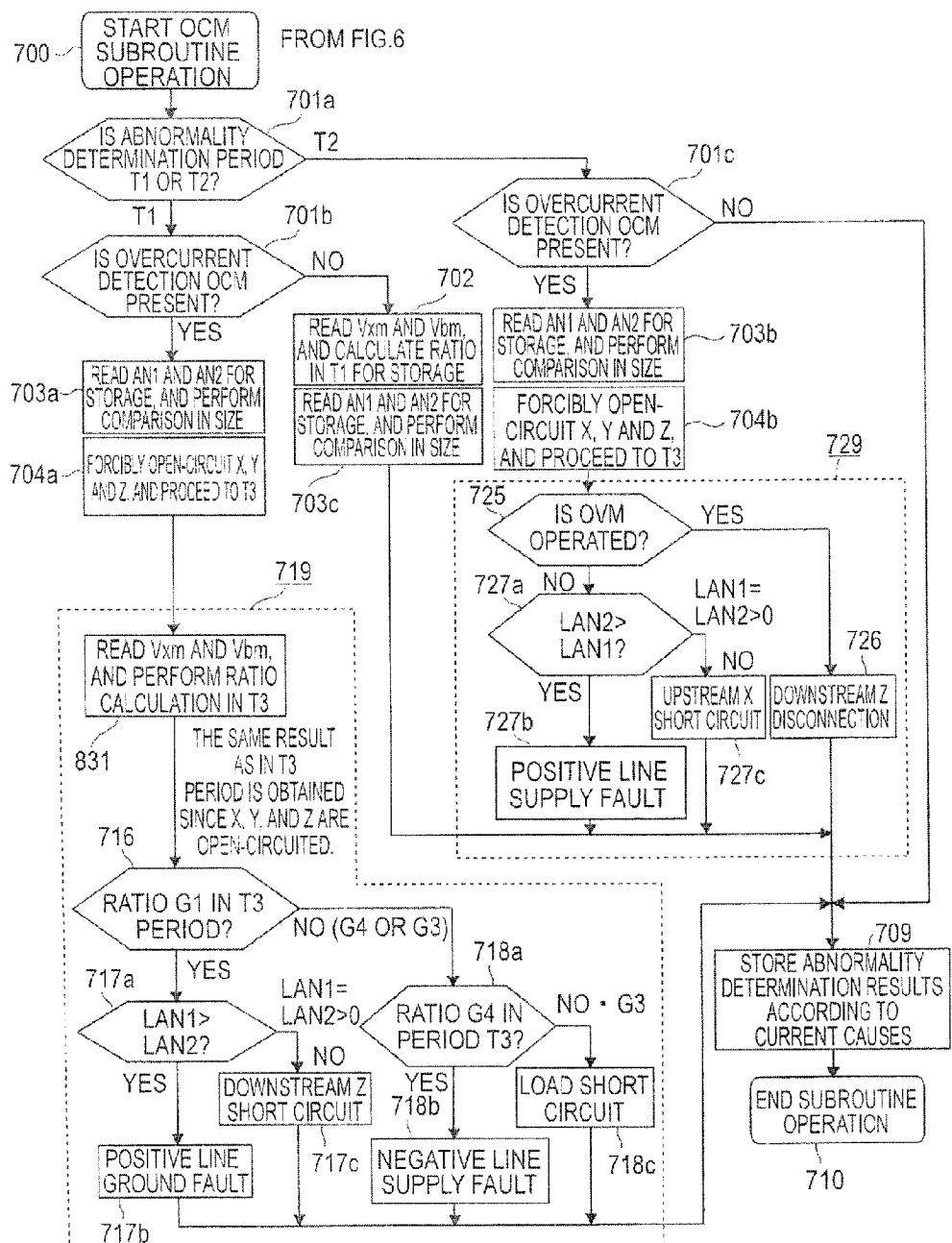
FIG. 7 is a flowchart illustrating an operation of an overcurrent monitoring subroutine in FIG. 6.
Figure 8:
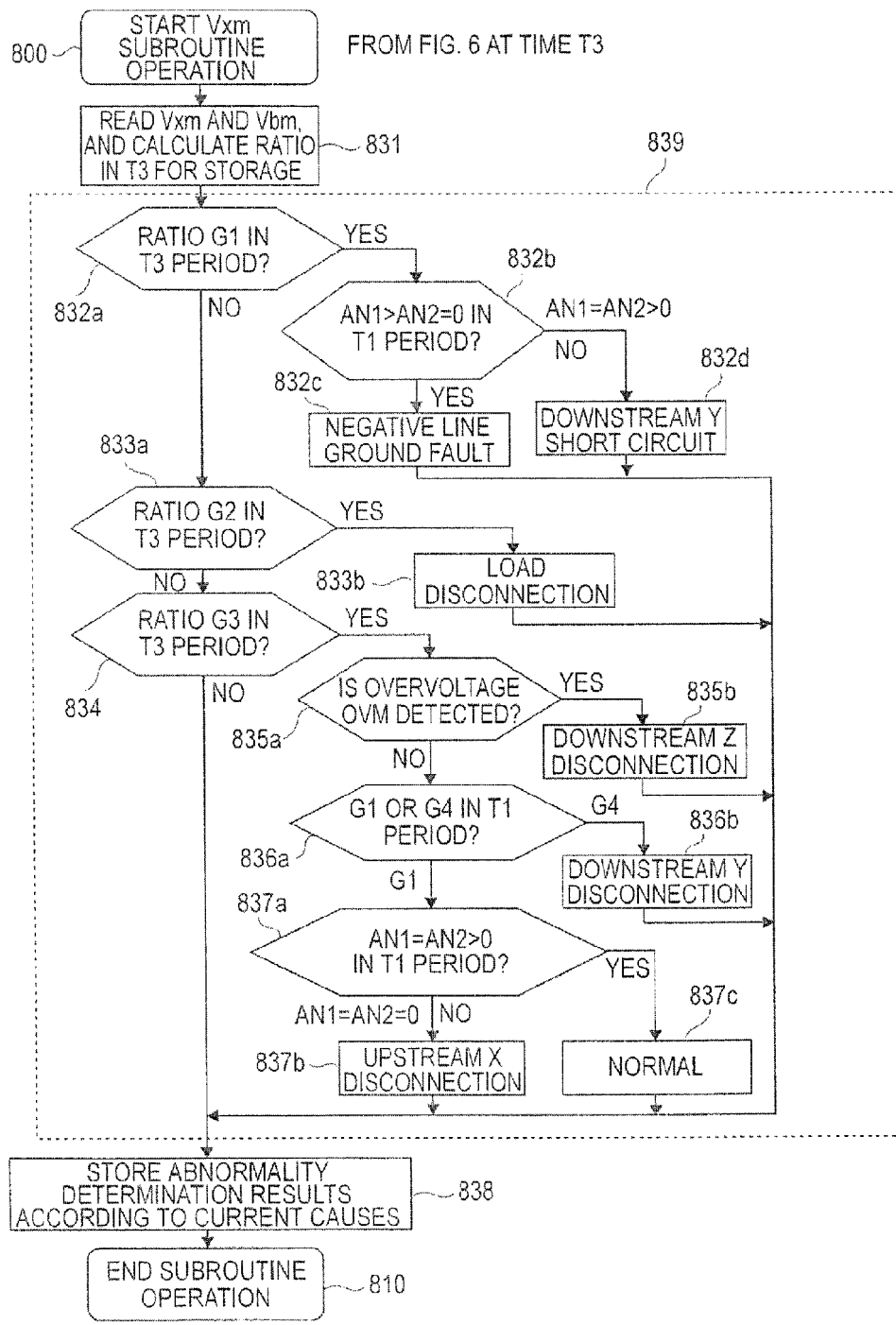
FIG. 8 is a flowchart illustrating an operation of a voltage monitoring subroutine in FIG. 6.

Next, an abnormality determination operation of the power supply control apparatus of the electric load according to the first embodiment of the invention shown in FIG. 1 will be described. FIG. 6 is a flowchart illustrating an abnormality determination operation of a voltage monitoring circuit in the power supply control apparatus of the electric load according to the first embodiment of the invention. FIG. 7 is a flowchart illustrating an operation of an overcurrent monitoring subroutine in FIG. 6, and FIG. 8 is a flowchart illustrating an operation of a voltage monitoring subroutine in FIG. 6. Here, FIG. 6 shows a basic flow applied to all the embodiments. In FIG. 6, in step 600, the microprocessor CPU in the control circuit unit starts the abnormality determination operation, and in step 610, the operation is terminated. Here, the control flow from step 600 to step 610 is repeatedly executed at a cycle of 10 msec or less, for example. In step 601 subsequent to the operation starting step 600, it is determined whether the abnormality occurrence is determined for storage by a majority determination as a result of plural abnormality determinations in step 609 to be described later. If the abnormality occurrence is determined for storage (YES in step 601), the procedure proceeds to step 611*a*, and if the abnormality occurrence is not determined for storage (NO in step 601), the procedure proceeds to step 602*a*.

In step 602*a*, it is determined whether a current time corresponds to any one of the first period T1, the second period T2, the third period T3, and the fourth period T4. If the current time does not correspond to the periods (NO in step 602*a*), the procedure proceeds to the operation terminating step 610, and if the current time corresponds to any one of the periods (YES in step 602*a*), the procedure proceeds step 602*b*. In step 602*b*, a reset pulse RST is generated at the start of the first period T1, the storage content of the synthetic overcurrent determination storage circuit 137 (upstream and downstream overcurrent determination storage circuits in the second and third embodiments) and the synthetic overcurrent determination storage circuit 139 are reset, and then, the procedure proceeds to step 603. In step 603, it is determined which period among the first period T1 to the fourth period T4 the abnormality determination period is. If the abnormality determination period is the third period T3 or the fourth period T4 (YES in step 603), the procedure proceeds step 604*b*, and if the abnormality determination period is the first period T1 or the second period T2 (NO in step 603), the procedure proceeds to step block 604*a*. The fourth period T4 is applied only to the fourth embodiment. Step block 604*a* corresponds to first abnormality determination means, which is a subroutine program that determines whether the overcurrent abnormality occurs, calculates the voltage ratio G in the first period if the overcurrent abnormality does not occur, and then returns to step 602*a*. The detailed content is shown in FIG. 7 in the first embodiment, in FIG. 13 in the second embodiment, in FIG. 19 in the third embodiment, and in FIGS. 23 and 28 in the fourth embodiment.

In step 604*b*, it is determined whether the overcurrent abnormality occurs in the third period T3 and the synthetic overcurrent detection signal OCM (upstream and downstream overcurrent detection signals OC1 and OC2 in the second and third embodiments) is generated. If the overcurrent abnormality occurs (YES in step 604*b*), the procedure proceeds to step 611*b*, and if the overcurrent abnormality does not occur (NO in step 604*b*), the procedure proceeds to step block 604*c*. This determination corresponds to double-abnormality determination means. Step block 604*c* corresponds to second abnormality determination means, which is a subroutine program that calculates the voltage ratio G in the third period T3 and the fourth period T4, reflects, if the voltage ratio G at the first period T1 is calculated in step block 604*a*, the value of the voltage ratio G at the first period T1 to generally determine the abnormality generation factors, and then proceeds to step 605*a*. The detailed description is shown in FIG. 8 in the first embodiment, in FIG. 14 in the second embodiment, in FIG. 20 in the third embodiment, and in FIGS. 24 and 29 in the fourth embodiment. In step 605*a*, it is determined whether any abnormality occurs in step block 604*a* or step block 604*c*. If the abnormality occurs (YES in step 605*a*), the procedure proceeds to step 606*a*, and if the abnormality does not occur (NO in step 605*a*), the procedure proceeds to step 605*b*. In step 605*b*, if it is determined that the number of abnormality determinations counted by step 606*b* to be described later is "1" or more and less than a predetermined number n (YES in step 605*b*), the procedure proceeds to step 606*a*, and if it is determined that the number of abnormality determinations is "0" (NO in step 605*b*), the procedure proceeds to the operation terminating step 610.

Accordingly, when a normal state where any abnormality cannot be detected in step block 604*a* and step block 604*c* is continued, the procedure proceeds to the operation terminating step 610 from the operation starting step 600 through step 601, step 602*a*, step 602*b*, step 603, step block 604*a*, step 602*a*, step 602*b*, step 603, step block 604*a*, step 602*a*, step 602*b*, step 603, step 604*b*, step block 604*c*, step 605*a*, and step 605*b*, and proceeds to the operation starting step 600 again to repeat the same control operation. In step 606*a*, it is determined whether the current determination in the third period T3 is terminated (in the case of the fourth period T4, whether the determination in the fourth period T4 subsequent to the third period T3 is terminated). If the determination is terminated (YES in step 606*a*), the procedure proceeds to step 606*b*, and if the determination is not terminated (NO in step 606*a*), the procedure proceeds to the operation terminating step 610. In step 606*b*, "1" is added to a counter that counts the number of determinations, and then, the procedure proceeds to step 607*a*.

In step 607*a*, if it is determined that the number of determinations counted in step 606*b* is "1" (YES in step 607*a*), the procedure proceeds to step 608*a*, and if it is determined that the number of determinations is "2" or more" (NO in step 607*a*), the procedure proceeds to step 607*b*. In step 608*a*, a determination result stored in step 709 in FIG. 7 to be described later and a determination result stored in step 838 in FIG. 8 are collectively stored as a first total determination result, and the storage contents in step 709 and step 838 are erased. Then, the procedure proceeds to step 610. In step 607*b*, if it is determined that the number of determinations counted in step 606*b* is "2" (YES in step 607*b*), the procedure proceeds to step 608*b*, and if it is determined that the number of determinations is "3" or more (NO in step 607*b*), the procedure proceeds to the next number determination step. In step 608*b*, similar to the first step 608*a*, a second general determination result is stored, and the storage contents in step 709 and step 838 are erased. Then, the procedure proceeds to the operation terminating step 610. In step 608*n*, similar to the first step 608*a*, an n-th total determination result is stored, and the storage contents in step 709 and step 838 are erased. Then, the procedure proceeds to step 609.

In step 609, the majority determination of the abnormality determination contents stored in step 608*a* to step 608*n* is performed. If the number of abnormality occurrences exceeds a normal number, the abnormality determination contents are determined and stored. If the normal number is large, a normal result is stored. Then, the number of determinations counted in step 606*b* is reset, and then, the procedure proceeds to the operation terminating step 610. The determination storage content in step 608*a* should store any abnormality determination result. However, in step 608*b* to step 608*n*, since a case where the determination result of step 605*a* is NO is included, if there is an abnormality that accidentally occurs due to a noise malfunction or the like, the abnormality is ignored by the majority determination.

When the abnormality occurrence is determined in step 609 based on the abnormality determination results in step block 604*a* that corresponds to the first abnormality determination means and step block 604*c* that corresponds to the second abnormality determination means, step 611*a* executed through step 601 corresponds to abnormality processing means for stopping the power supply command signal DR0 or the conduction command signal DR1, performing an output stop process of generating the output inhibition signal INH, performing abnormality notification, and storing abnormality occurrence information. Step 611*b* is executed when the determination in step 604*b* that corresponds to the double-abnormality determination means is YES, which still serves as the double-abnormality processing means corresponding to the state of the overcurrent abnormality occurrence even though an open circuit command is given to the upstream and downstream switching elements. Here, if the load circuit of the power supply control apparatus 100A is supplied with power through the power source switch 102a that is an output contact of a power source relay, for example, a command signal for stopping energization of the power source relay is transmitted, information on the double-abnormality occurrence is stored.

FIG. 7 illustrates details of step block 604a in FIG. 6. In FIG. 7, step 700 corresponds to a start step of a subroutine program that starts the operation when the determination in step 603 in FIG. 6 is NO. In step 701a, it is determined whether the abnormality determination period is the first period T1 or the second period T2. If the abnormality determination period is the first period T1, the procedure proceeds to step 701b, and if the abnormality determination period is the second period T2, the procedure proceeds to step 701c. In step 701b, it is determined whether the synthetic overcurrent detection signal OCM is generated. If the synthetic overcurrent detection signal OCM is generated (YES in step 701b), the procedure proceeds to step 703a. If the synthetic overcurrent detection signal OCM is not generated (NO in step 701b), the procedure proceeds to step 702. Step 702 corresponds to first period ratio computing means for reading the values of the power source voltage detection signal Vbm and the load voltage detection signal Vxm, calculating and storing the voltage ratio "G=Vxm/Vbm" in the first period T1, and then proceeding to step 703c. In step 703c, the values of the upstream current detection signal AN1 and the downstream current detection signal AN2 that are under the normal operation are read immediately before the first period T1 is ended, and are compared with each other to be stored. Then, the procedure proceeds to step 709.

Step 703a is effective in the software cutoff method where the dotted line circuit in FIG. 1 is removed. In step 703a, the value of the upstream current detection signal AN1 and the value of the downstream current detection signal AN2 at the time point when the synthetic overcurrent detection signal OCM is generated are stored as the upstream current detection storage signal LAN1 and the downstream current detection storage signal LAN2, and are compared with each other. Then, the procedure proceeds to step 704a. In step 704a, the power supply command signal DR0 and the conduction command signal DR1 are stopped, the output inhibition signal INH is generated to forcibly open-circuit all the upstream, downstream, and flywheel switching elements, and then, the procedure proceeds to step 831. In step 831, the values of the power source voltage detection signal Vbm and the load voltage detection signal Vxm are read, the voltage ratio "G=Vxm/Vbm" is calculated for storage, and then, the procedure proceeds to step 716. Here, since the abnormality determination period already interlace-proceeds to the third period T3 by step 704a, step 831 corresponds to third period ratio computing means in reality.

In step 716, it is determined whether the voltage ratio G calculated in step 831 is the first level G1. If the voltage ratio G is the first level G1 (YES in step 716), the procedure proceeds to step 717a, and if the voltage ratio G is the third level G3 or the fourth level G4 (NO in step 716), the procedure proceeds to step 718a. Step 717a is applied to a case where the size determination of the upstream current detection storage signal LAN1 and the downstream current detection storage signal LAN2 is performed in step 703a. In step 717a, if "LAN1>LAN2" (YES in step 717a), the procedure proceeds to step 717b, and if "LAN1=LAN2>0" (NO in step 717a), the procedure proceeds to step 717c. The positive line ground fault abnormality is stored in step 717b, and the short circuit abnormality of the downstream side flywheel switching element 160A is stored in step 717c. Then the procedure proceeds to step 709. However, when the size determination of the upstream current detection storage signal LAN1 and the downstream current detection storage signal LAN2 is not performed in step 703a, if the determination of step 716 is YES, the abnormality is stored as any one of the positive line ground fault abnormality and the short circuit abnormality of the downstream side flywheel switching element 160A.

In step 718a, it is determined whether the voltage ratio G calculated in step 831 is the third level G3 or the fourth level G4. If the voltage ratio G is the fourth level G4 (YES in step 718a), the procedure proceeds to step 718b, and if the voltage ratio G is the third level G3" (NO in step 718a), the procedure proceeds to step 718c. The negative line supply fault abnormality is stored in step 718b, and the load short circuit abnormality is stored in step 718c, and then, the procedure proceeds to step 709. Step block 719 including the series of steps from step 831 to step 718c corresponds to close circuit abnormality determination means, in which in the first period T1 when both of the power supply command signal DR0 and the conduction command signal DR1 are close-circuited and driven, when the overcurrent abnormality occurs, the generation factor of the overcurrent abnormality is determined in a state where the power supply command signal DR0 and the conduction command signal DR1 are stopped and the abnormality determination period interlace-proceeds to the third period T3.

In step 701c, it is determined whether the synthetic overcurrent detection signal OCM is generated in the second period T2. If the synthetic overcurrent detection signal OCM is generated (YES in step 701c), the procedure proceeds to step 703b, and if the synthetic overcurrent detection signal OCM is not generated (NO in step 701c), the procedure proceeds to step 709. Step 703b is effective in the software cutoff method where the dotted line circuit in FIG. 1 is removed. In step 703b, the value of the upstream current detection signal AN1 and the value of the downstream current detection signal AN2 at the time point when the synthetic overcurrent detection signal OCM is generated are stored as the upstream current detection storage signal LAN1 and the downstream current detection storage signal LAN2, and are compared with each other. Then, the procedure proceeds to step 704b. In step 704b, the power supply command signal DR0 and the conduction command signal DR1 are stopped, the output inhibition signal INH is generated to forcibly open-circuit all the upstream, downstream, and flywheel switching elements, and then, the procedure proceeds to step 725.

In step 725, it is determined whether the overcurrent determination storage circuit 139 generates the overcurrent detection signal OVM. If the overcurrent is generated (YES in step 725), the procedure proceeds to step 726, and if the overcurrent is not generated (NO in step 725), the procedure proceeds to step 727a. In step 726, the disconnection abnormality occurrence of the downstream side flywheel switching element 160A is stored, and then, the procedure proceeds to step 709. Step 727a is applied to a case where the size determination of the upstream current detection storage signal LAN1 and the downstream current detection storage signal LAN2 is performed in step 703b. If "LAN1<LAN2" (YES in step 727a), the procedure proceeds to step 727b, and if "LAN1=LAN2>0" (NO in step 727a), the procedure proceeds to step 727c.

The positive line supply fault abnormality is stored in step 727b, the short circuit abnormality of the upstream side power supply switching element 150 is stored in step 727c, and then, the procedure proceeds to step 709. When the size determination of the upstream current detection storage signal LAN1 and the downstream current detection storage signal LAN2 is not performed in step 703b, if the determination in step 725 is NO, the abnormality is stored as the positive line supply fault abnormality or the short circuit abnormality of the upstream side power supply switching element 150. Step block 729 including the series of steps from step 725 to step 727c corresponds to close circuit abnormality determination means, in which when the overcurrent abnormality occurs in the second period T2 when the power supply command signal DR0 is the open circuit command, the conduction command signal DR1 is the close circuit command, and the close circuit command is given to the flywheel switching element Z, the power supply command signal DR0 and the conduction command signal DR1 are stopped, and then, the abnormality determination period proceeds to the third period T3. Then, the generation factor of the overcurrent abnormality is determined. In step 709, the determination results according to the abnormality factors stored in step 717b, step 717c, step 718b, step 718c, step 727b, step 727c, and step 726 are collectively stored, and then, the procedure proceeds to the subroutine terminating step 710. Then, the procedure proceeds to step 602a in FIG. 6, subsequent to the subroutine terminating step 710.

FIG. 8 illustrates details of step block 604c in FIG. 6. In FIG. 8, step 800 corresponds to a start step of a subroutine program that starts the operation when the determination in step 604b in FIG. 6 is NO. Subsequent step 831 corresponds to third period ratio computing means for reading the values of the power source voltage detection signal Vbm and the load voltage detection signal Vxm, calculating and storing the voltage ratio "G=Vxm/Vbm" in the third period T3, and then proceeding to step 832a. Here, when the voltage ratio G is already calculated in the above-described step block 719, the calculation result is read. When the overcurrent abnormality does not occur in the first period T1 and the abnormality determination period reaches the third period T3 through the second period T2, the voltage ratio is first calculated in the third period T3. In step 832a, it is determined whether the voltage ratio G calculated in step 831 is the first level G1. If it is determined that the voltage ratio G is the first level G1 (YES in step 832a), the procedure proceeds to step 832b, and if it is determined that the voltage ratio G is not the first level G1 (NO in step 832a), the procedure proceeds to step 833a. Step 832b is applied to a case where the size determination of the value of the upstream current detection signal AN1 and the value of the downstream current detection signal AN2 is performed in step 703c in FIG. 7. In step 832b, if "AN1>AN2=0" (YES in step 832b), the procedure proceeds to step 832c, and if "AN1=AN2>0" (NO in step 832b), the procedure proceeds to step 832d.

The negative line ground fault abnormality is stored in step 832c, the short circuit abnormality of the downstream side conduction switching element 140 is stored in step 832d, and then, the procedure proceeds to step 838. If the size determination of the upstream current detection signal AN1 and the downstream current detection signal AN2 is not performed in step 703c in FIG. 7, the determination in step 832a is YES, and thus, the negative line ground fault abnormality or the short circuit abnormality of the downstream side conduction switching element 140 is stored, and then, the procedure proceeds to step 838. In step 833a, it is determined whether the voltage ratio G calculated in step 831 is the second level G2. If it is determined that the voltage ratio G is the second level G2 (YES in step 833a), the procedure proceeds to step 833b, and if it is determined that the voltage ratio G is not the second level G2 (NO in step 833a), the procedure proceeds to step 834. The determination result of the load disconnection abnormality is stored in step 833b, and then, the procedure proceeds to step 838. In step 834, it is determined whether the voltage ratio G calculated in step 831 is the third level G3. If the voltage ratio G is the third level G3 (YES in step 834), the procedure proceeds to step 835a, and if the voltage ratio G is not the third level G3 (NO in step 834), the procedure proceeds to step 838.

In step 835a, it is determined whether the overvoltage determination storage circuit 139 generates the overvoltage detection signal OVM. If it is determined that the overvoltage detection signal OVM is generated (YES in step 835a), the procedure proceeds to step 835b, and if it is determined that the overvoltage detection signal OVM is not generated (NO in step 835a), the procedure proceeds to step 836a. In step 835b, the disconnection abnormality occurrence of the downstream side flywheel switching element 160A is stored, and then, the procedure proceeds to step 838. In step 836a, it is determined whether the voltage ratio G in the first period T1 calculated in step 702 in FIG. 7 is the first level G1 or the first level G4. If the voltage ratio G is the first level G1, the procedure proceeds to step 837a, and if the voltage ratio G is the fourth level G4, the procedure proceeds to step 836b. In step 836b, the disconnection abnormality occurrence of the downstream side conduction switching element 140 is stored, and then, the procedure proceeds to step 838.

Step 837a is applied to a case where the size determination of the upstream current detection signal AN1 and the downstream current detection signal AN2 is performed in step 703c in FIG. 7. In step 837a, if it is determined whether "AN1=AN2>0" (YES in step 837a), the procedure proceeds to step 837c, and if "AN1=AN2=0" (NO in step 837a), the procedure proceeds to step 837b. The disconnection abnormality occurrence of the upstream side power supply switching element 150 is stored in step 837b, the fact that any abnormality is not detected is stored in step 837c, and then, the procedure proceeds to step 838. When the size determination of the upstream current detection signal AN1 and the downstream current detection signal AN2 is not performed in step 703c in FIG. 7, it is not possible to determine the normal state, and thus, in the first embodiment, it is necessary to monitor at least one of the upstream current detection signal AN1 and the downstream current detection signal AN2 to confirm that the normal load current flows in the first period T1.

If the load current detection signal is input to the control circuit unit 120A, the signal can be effectively used for accurate control of the load current. Here, in the fourth period T4 to be described later, the voltage ratio G is measured in a state where the upstream side switching element is close-circuited and the downstream side switching element is open-circuited, or instead, even though the measurement in the fourth period T4 is not performed, when the voltage monitoring circuit 190 to be described later is used, it is possible to perform the normal determination without using the current detection signal. In step 838, the determination results according to the abnormality factors stored in step 832c, step 832d, step 833b, step 835b, step 836b, step 837b, and step 837c are collectively stored, and then, the procedure proceeds to the subroutine terminating step 810. Subsequent to the subroutine terminating step 810, the procedure proceeds to step 605a in FIG. 6.

As is obvious from the list in FIG. 5, in the third period T3 after the overcurrent abnormality occurs, the second level G2 is not generated as the voltage ratio G, and in the third period T3 when the overcurrent abnormality does not occur, the fourth level G4 is not generated as the voltage ratio G. Further, assuming that an incomplete short circuit abnormality occurs or an incomplete disconnection abnormality occurs, a voltage ratio of a level that does not match with the levels G1, G2, G3, and G4 may be calculated as the voltage ratio G. Accordingly, in the determination flow of FIGS. 7 and 8, when the second level G2 or the fourth level G4 that should not be generated is generated, or when any level of determination is not performed, it is preferable that a determination division be added as a different abnormality.

(3) Main Point and Characteristic of the First Embodiment

As is obvious from the above description, in relation to the invention disclosed in claim 1 of the present application, there is provided the power supply control apparatus 100A of the electric load according to the first embodiment of the invention in which the upstream side switching element 150 and the downstream side switching element 140 are serially connected at the upstream position and the downstream position of the electric load 104 supplied with the load current from the external power source 101, and the conduction state of the upstream side switching element 150 and the downstream side switching element 140 is controlled by the control circuit unit 120A using the microprocessor as a main component, and even though one switching element of the upstream side switching element and the downstream side switching element is abnormally short-circuited, the power supply is stopped by the other switching element. Here, the power supply control apparatus 100A includes the synthetic overcurrent determination storage circuit 137 that generates the synthetic overcurrent detection signal OCM when any one of the upstream overcurrent with respect to the upstream side switching element 150 and the downstream overcurrent with respect to the downstream switching element 140 is generated. The power supply control apparatus 100A further includes the voltage monitoring circuit 180 that includes the third resistance 113 and the fourth resistances 114a and 114b that divide the power source voltage Vb of the external power source 101, the first resistance 111 that is connected to the connecting portion of the third resistance and the fourth resistance at one end thereof, and the second resistance 112 that connects the other end of the first resistance 111 to the positive wiring of the power source voltage Vb through the electric load 104, in which the other end of the first resistance 111 is connected to the downstream side of the electric load 104. The voltage monitoring circuit 180 generates the variable divided voltage Vx at both ends of the fourth resistances 114a and 114b in response to the open or close circuit state of the upstream side switching element 150 and the open or close circuit state of the downstream side switching element 140.

The control circuit unit 120A measures and monitors a value of a power source voltage detection signal Vbm that is a voltage being in proportion to the power source voltage Vb and a load voltage detection signal Vxm that is a voltage being in proportion to the variable divided voltage Vx, calculates values of voltage ratios G and H "G, H=Vxm/Vbm", and reads and monitors the synthetic overcurrent detection signal OCM.

The control circuit unit 120A further includes abnormality determination means 604a and 604c for generating a power supply command signal DR0 for one of the upstream side switching element 150 and the downstream side switching element 140 and a conduction command signal DR1 for the other one thereof, and for detecting the abnormality state of the load wiring for the electric load 104 while the electric load 104 is operated, based on the combination of the value of the voltage ratio G corresponding to the generation state of the power supply command signal DR0 and the conduction command signal DR1, and the generation state of the synthetic overcurrent detection signal OCM, and abnormality processing means 611a for stopping the generation of the power supply command signal DR0 and the conduction command signal DR1 when the abnormality determination means determines the abnormality state, and for identifying and storing plural types of abnormality occurrence information. The abnormality state of the load wiring includes plural abnormality states of a state where there is a doubt about the positive line supply fault abnormality in which the upstream positive wiring of the electric load 104 is connected to the positive electrode wiring of the external power source 101, or the positive line ground fault abnormality in which the upstream positive wiring of the electric load 104 is connected to the negative electrode wiring of the external power source 101, a state where there is a doubt about the negative line supply fault abnormality in which the downstream negative wiring of the electric load 104 is connected to the positive electrode wiring of the external power source, or the negative line ground fault abnormality in which the downstream negative wiring of the electric load 104 is connected to the negative electrode wiring of the external power source, and a state where there is a doubt about the load short circuit abnormality or the load disconnection abnormality in which the electric load 104 is short-circuited or disconnected.

Next, in relation to the invention disclosed in claim 2 of the present application, the upstream side switching element 150 is the power supply element X in which the power supply duty that is the ratio of the on time and the on-off cycle is controlled by the power supply command signal DR0, and the other downstream side switching element 140 that forms the pair with the upstream side switching element 150 is the conduction switching element Y that is continuously conducted or continuously cut off by the conduction command signal DR1. The first constant voltage diode 143 that forms a cutoff voltage limit circuit is connected to the conduction switching element Y, and the downstream side flywheel switching element 160A that is the flywheel switching element Z is connected in parallel with the series circuit of the electric load 104 and the conduction switching element Y. Further, the flywheel switching element Z is open-circuited when the power supply switching element X is close-circuited, and is close-circuited when the power supply switching element X is open-circuited.

As described above, in relation to the invention disclosed in claim 2 of the present application, one of the upstream switching element and the downstream switching elements is the power supply switching element X in which the power supply duty is controlled, and the other switching element thereof is the conduction switching element Y in which the continuous conduction or continuous cutoff is performed. When the electric load is an inductive load, the cutoff voltage limit circuit is provided in the conduction switching element Y, and the flywheel switching element Z is connected in parallel with the series circuit of the electric load and the conduction switching element Y. Accordingly, when the positive line supply fault abnormality or the short circuit abnormality of the upstream side switching element occurs, without depending on an external cutoff function such as a collective power source relay, it is possible to perform self cutoff of the load current by the downstream side switching element, and when the negative line ground fault abnormality or the short circuit abnormality of the downstream side switching element occurs, it is possible to perform self cutoff of the load current by the upstream side switching element. Further, in the normal operation, it is possible to divide the functions so that the power supply state is controlled by one switching element and the response delay of the current cutoff due to the inductance component included in the electric load is suppressed by the other switching element. Further, the flywheel switching element can suppress a voltage drop of the commutation circuit compared with a commutation diode, and can suppress power consumption generated in the commutation circuit and heat generation of the circuit element.

Further, in relation to the invention disclosed in claim 3 of the present application, the pair of the upstream side switching element 150 and the downstream side switching element 140 is the P-channel field effect transistor and the N-channel field effect transistor, and the flywheel switching element 160A is the N-channel field effect transistor that is the reverse type to the power supply switching element 150 that is the upstream side switching element. The power supply switching element 150 and the flywheel switching element 160A are switch-controlled through the flywheel control circuit 170A that provides a delay close circuit for inhibiting a simultaneous close circuit. The flywheel control circuit 170A is operated in response to the power supply command signal DR0 generated by the control circuit unit 120A, in which the flywheel control circuit 170A first open-circuits the flywheel switching element 160A, and then, close-circuits the power supply switching element 150 after a predetermined open circuit response time, if the power supply command signal DR0 is generated by the control circuit unit 120A, and first open-circuits the power supply switching element 150, and then, close-circuits the flywheel switching element 160A after a predetermined open circuit response time, if the power supply command signal DR0 is released. The flywheel switching element 160A is conducted and driven in the same direction as the conduction direction of the parasitic diode 161A provided between the drain terminal D and the source terminal S, and the control circuit unit 120A generates an output inhibition signal INH to forcibly open-circuit at least the flywheel switching element 160D when the generation of the power supply command signal DR0 and the conduction command signal DR1 is stopped by the abnormality processing means 611a.

As described above, in relation to the invention disclosed in claim 3 of the present application, the power supply switching element X and the flywheel switching element Z are controlled so as not to be close-circuited at the same time by the flywheel control circuit, and is configured so that the flywheel switching element Z is close-circuited when the power supply switching element X is open-circuited. However, even when the power supply switching element X is open-circuited, if the control circuit unit generates the output inhibition signal, the flywheel switching element Z can be forcibly open-circuited. Accordingly, in the case of the embodiment in which the power supply switching element X is the upstream side switching element, when the positive line supply fault abnormality of the electric load occurs in a period when the flywheel switching element Z is close-circuited and the power supply switching element X is open-circuited, the power supply short circuit state can be released by the output inhibition signal. Further, compared with a case where a general diode or a general parasitic diode is used as a commutation diode, the voltage drop of the flywheel switching element in the commutation period is remarkably reduced, and thus, it is possible to remarkably reduce a temperature increase due to heat generation of the flywheel switching element, and to provide a small and cheap power supply control apparatus.

Further, in relation to the invention disclosed in claim 5 of the present application, the N-channel field effect transistor that forms the downstream side switching element 140 is close-circuited and driven by the driving voltage applied between the gate terminal G and the source terminal S when the conduction command signal DR1 is given, in which the first constant voltage diode 143 is connected between the drain terminal D and the gate terminal G. When the conduction command signal DR1 is released, a serge current flows in the first constant voltage diode 143 by an inductive serge voltage due to the inductance component of the electric load 104 so that the field effect transistor is conducted and driven, to thus suppress the value of the inductive serge voltage to a predetermined voltage corresponding to an operating voltage of the first constant voltage diode 143. The diode 149 that is conducted in a direction where the serge current flows in is serially connected to the first constant voltage diode 143, and the inverted auxiliary resistance 249 is connected between a serial connecting point of the first constant voltage diode 143 and the diode 149, and the source terminal S.

As described above, in relation to the invention disclosed in claim 5 of the present application, when the conduction switching element that is the field effect transistor is open-circuited, the first constant voltage diode is connected between the drain terminal and the gate terminal to suppress the inductive serge voltage generated by the electric load, and a bias resistance is connected to the diode that is serially connected to the first constant voltage diode. This is similarly applied to the second embodiment to the fourth embodiment to be described later. Accordingly, it is possible to absorb electromagnetic energy accumulated in the electric load by the conduction switching element, to suppress power consumption of the first constant voltage diode, and to use a small and low power consumption constant voltage diode. Further, the inverted auxiliary resistance causes a forward minute current to flow in the serial diode from the start of generation of the inductive serge voltage, to prevent an inverted operation delay of the serial diode generated when the serge voltage reaches the operating voltage of the first constant voltage diode, and generation of overshoot due to the inverted operation delay, to thereby prevent excessive withstanding voltage between the drain and the source of the conduction switching element.

Further, in relation to the invention disclosed in claim 6 of the present application, the P-channel field effect transistor that forms the upstream side switching element 150 is close-circuited and driven by the driving voltage applied between the source terminal S and the gate terminal G when the power supply command signal DR0 is given, in which the second constant voltage diode 153 is connected between the drain terminal D and the gate terminal G. When the power supply command signal DR0 is released, and when the flywheel switching element 160A is disconnected, a second serge current flows in the second constant voltage diode 153 by the inductive serge voltage due to the inductance component of the electric load 104 so that the field effect transistor is conducted and driven. Thus, the value of the inductive serge voltage is divided between the power supply switching element 150 and the conduction switching element 140, so that the value of the inductive serge voltage divided by the upstream side switching element 150 is suppressed to a predetermined voltage corresponding to an operating voltage of the second constant voltage diode 153, and the operating voltage of the second constant voltage diode 153 is set to a value that is larger than a maximum voltage Vbmax of the external power source 101, and is set to a value that is smaller than the operating voltage of the first constant voltage diode 143. Further, the flow of the second serge current in the second constant voltage diode 153 is detected and stored by the overvoltage determination storage circuit 139. The overvoltage determination storage circuit 139 generates the overvoltage detection signal OVM, and inputs the overvoltage detection signal OVM to the control circuit unit 120A.

As described above, in relation to the invention disclosed in claim 6 of the present application, the voltage between both ends of the power supply switching element X is detected and stored by the overvoltage determination storage circuit, and is input to the control circuit unit as the overvoltage detection signal OVM. This is similarly applied to the second embodiment to the fourth embodiment to be described later. Accordingly, when the disconnection abnormality occurs in the flywheel switching element Z, by stopping the switching operation of the power supply switching element X, it is possible to prevent the power supply switching element X from being damaged by the cutoff serge voltage generated by the electric load. Further, the power supply switching element and the conduction switching element are open-circuited in response to the overvoltage detection signal OVM, the electromagnetic energy accumulated in the electric load is absorbed by the power supply switching element and the conduction switching element, and thus, it is possible to suppress the burden of consumed energy in the power supply switching element.

Further, in relation to the invention disclosed in claim 7 of the present application, the control circuit unit 120A is operated by the control voltage Vcc that is the stabilizing voltage generated by the constant voltage power source 110, and includes the multi-channel AD converter ADC. The power source voltage detection signal Vbm input to the multi-channel AD converter ADC is a voltage obtained by voltage-dividing the power source voltage Vb by second voltage-dividing resistances 214a and 214b. When a resistance value of an upstream side voltage-dividing resistance 214a is represented as R214a, a resistance value of a downstream side voltage-dividing resistance 214b is represented as R214b, and a voltage ratio G0 is represented as "G0=R214a/(R214a+R214b)", Vbm is represented as "Vbm=G0×Vb". The third resistance 113 that forms the voltage monitoring circuit 180 is connected to an upstream side of the fourth resistances 114a and 114b, and the fourth resistances are first voltage-dividing resistances 114a and 114b that include an upstream resistance 114a and a downstream resistance 114b. The load voltage detection signal Vxm input to the multi-channel AD converter ADC is a voltage obtained by voltage-dividing the variable divided voltage Vx by the first voltage-dividing resistances 114a and 114b that are the fourth resistances, and a voltage division ratio thereof is set to be equal to the voltage ratio G0, which is "Vxm=G0×Vx", in which the voltage ratio G0 is "G0≤Vcc/Vbmax" that is equal to or less than the ratio of the maximum value Vbmax of the power source voltage Vb of the external power source 101 and the control voltage Vcc.

As described above, according to claim 7 of the application, the power source voltage detection signal Vbm input to the control circuit is a voltage obtained by voltage-dividing the power source voltage Vb by the second voltage-dividing resistances of the voltage ratio G0, and the load voltage detection signal Vxm is a voltage obtained by voltage-dividing the variable divided voltage Vx by the first voltage-dividing resistances of the voltage division ration G0. This is similarly applied to the second embodiment to the fourth embodiment to be described later. Accordingly, the values of the voltage ratios G and H are represented as "G, H=Vxm/Vbm=(G0×Vx)/(G0×Vb)=Vx/Vb". The control circuit unit can equivalently calculate the value of a necessary voltage ratio "Vx/Vb" by computing the value of "Vxm/Vbm". Thus, even though there is a variation of the power source voltage Vb, it is possible to calculate the voltage ratios G and H according to the power supply state for the electric load. The divided voltage due to the first voltage-dividing resistances 114a and 114b is input as the load voltage detection signal Vxm for the control circuit units 120A, 120B, 320C and 320D through the input resistance 116, and the input signal is connected to the output circuit of the constant voltage power source 110 through the clamp diode 117a, or is connected to the clamp circuit through a constant voltage diode 117b. Thus, the high voltage generated when the conduction switching element Y is open-circuited flows in the voltage monitoring circuits 180, 190 and 200 through the first resistance 111, thereby making it possible to suppress the overvoltage from being input to the control circuit unit.

Further, in relation to the invention disclosed in claim 8 of the present application, the first resistance 111 is connected in parallel with the fourth resistances 114a and 114b when the downstream side switching element 140 is close-circuited, and is serially connected to the second resistance 112 through the electric load 104 when the downstream side switching element 140 is open-circuited, in which the serially connected series circuit is connected in parallel with the third resistance 113, and the second resistance 112 is connected in parallel with the upstream side switching element 150.

As described above, in relation to the invention disclosed in claim 8 of the present application, the first resistance in the voltage monitoring circuit is connected in parallel with the fourth resistances when the downstream side switching element is close-circuited, the second resistance connected in parallel with the upstream side switching element is serially connected to the first resistance through the electric load, and the series circuit is connected in parallel with the third resistance when the downstream side switching element is open-circuited. This is similarly applied to the second embodiment to the fourth embodiment. Accordingly, the second resistance is not connected in parallel with the third resistance under the disconnection state of electric load, and it is possible to detect the disconnection state of the electric load by monitoring the variable divided voltage Vx.

Next, in relation to the invention disclosed in claim 10 of the present application, the abnormality determination means includes the first abnormality determination means 604a and the second abnormality determination means 604c. The first abnormality determination means 604a includes the close circuit abnormality determination means 719 or the first period ratio computing means 702 in the first period T1 when the power supply command signal DR0 is given to at least one of the upstream side switching element 150 and the downstream side switching element 140, the conduction command signal DR1 is given to the other thereof, and both of the upstream side switching element 150 and the downstream side switching element 140 are close-circuited and driven, and additionally includes the intermittence abnormality determination means 729 in the second period T2 when the power supply switching element X to which the power supply command signal DR0 is given intermittently drives the electric load 104, when there is provided the flywheel switching element 160A that is connected in parallel with the electric load 104. In the first period T1, the power supply command signal DR0 and the conduction command signal DR1 continue a close circuit command at least until the abnormality determination using the close circuit determination means 719 is completed. Here, if the synthetic overcurrent detection signal OCM is detected, both of the power supply command signal DR0 and the conduction command signal DR1 are changed to an open circuit command, and the period directly proceeds to the third period T3. Further, in the first period T1, if the synthetic overcurrent detection signal OCM is not detected, the voltage ratio G in the first period T1 is calculated for storage by the first period ratio computing means 702.

The second abnormality determination means 604c includes the third period ratio computing means 831 in the third period T3 when both of the power supply command signal DR0 and the conduction command signal DR1 are stopped and both of the upstream side switching element and the downstream side switching element are given an open circuit command, and the close circuit abnormality determination means 839. In the third period, the power supply command signal DR0 and the conduction command signal DR1 continue the open circuit command at least until the abnormality determination using the open circuit abnormality determination means 839 is completed, and the voltage ratio G in the third period T3 is calculated for storage by the third period ratio computing means 831. The close circuit abnormality determination means 719 determines a generating factor of the overcurrent abnormality in which the synthetic overcurrent detection signal OCM is detected, by the value of the voltage ratio G calculated by the third period ratio computing means 831. The open circuit abnormality determination means 839 subdivides, for determination, the generating factors of abnormalities other than the overcurrent abnormality that includes the short circuit abnormality of the upstream side switching element 150, the downstream side switching element 140 or the flywheel switching element 160A based on the combination of the value of the voltage ratio G calculated by the first period ratio computing means 702 and the value of the voltage ratio G calculated by the third period ratio computing means 831.

As described above, in relation to the invention disclosed in claim 10 of the present application, if the overcurrent abnormality occurs in the first period when the power supply switching element and the conduction switching element are close-circuited and driven, the period directly proceeds to the third period when the power supply switching element and the conduction switching element are open-circuited, the voltage ratio is calculated by the third period ratio computing means, and the voltage ratios in the first period and the third period are calculated by the first period ratio computing means and the third period computing means with respect to abnormalities other than the overcurrent abnormality. Accordingly, the generating factor of the overcurrent abnormality is subdivided for determination by the voltage ratio using the third period ratio computing means, and the generating factors of the abnormalities other than the overcurrent abnormality are subdivided for determination based on the combination of the voltage ratio using the first period ratio computing means and the voltage ratio using the third period ratio computing means.

Further, in relation to the invention disclosed in claim of the present application, when the load current is excessively large, the synthetic overcurrent determination storage circuit 137 generates the synthetic overcurrent detection signal OCM, interrupt-inputs the generated the synthetic overcurrent detection signal OCM to the control circuit unit 120A, and cuts off the power supply command signal DR0 and the conduction command signal DR1 through gate elements 135A and 136A. The control circuit unit 120A recognizes the synthetic overcurrent detection signal OCM to stop the generation of the power supply command signal DR0 and the conduction command signal DR1, or the synthetic overcurrent determination storage circuit 137 does not perform the cutoff of the power supply command signal DR0 and the conduction command signal DR1 using the gate elements 135A and 136A, and the control circuit unit 120A recognizes the synthetic overcurrent detection signal OCM to detect and store the value of the load current flowing in the upstream side switching element 150 or the downstream side switching element 140 as the upstream overcurrent detection signal LAN1 or the downstream overcurrent detection signal LAN2 and stops the generation of the power supply command signal DR0 or the conduction command signal DR1. Further, the control circuit unit 120A identifies and stores the overcurrent abnormality generating factor that is at least one of the positive line ground fault or the negative line supply fault of the load wiring, and the load short circuit with reference to the voltage ratio G in the third period T3, identifies and stores the presence or absence of the short circuit abnormality of the power supply switching element 150 when the upstream overcurrent detection signal LAN1 and the downstream overcurrent detection signal LAN2 are input, and identifies and stores the presence or absence of the short circuit abnormality of the flywheel switching element 160 when the flywheel switching element 160A is provided.

As described above, in relation to the invention disclosed in claim 11 of the present application, in the first period when the power supply switching element and the conduction switching element are close-circuited and driven or in the second period when the power supply switching element is open-circuited but the conduction switching element and the flywheel switching element are close-circuited and driven, when the overcurrent flows in at least one of the upstream side switching element and the downstream side switching element, the synthetic overcurrent detection signal OCM is generated to cut off or stop the generation of the power supply command signal DR0 and the conduction command signal DR1, and then, the period proceeds to the third period. The control circuit unit identifies and stores the overcurrent abnormality generating factor with reference to the voltage ratio G in the third period T3. Accordingly, even though the load current is cut off according to the detection of the overcurrent, the control circuit unit recognizes the cutoff of the load current, to continue the synthetic overcurrent detection signal OCM as long as the synthetic overcurrent determination storage circuit is not reset, and to reliably cut off the overcurrent by a small number of interrupt-input signals, thereby making it possible to identify and store the abnormality generating factor of a minimum degree. Further, when the overcurrent detection signal is stored, the overcurrent generating factor can be further subdivided for storage according to whether the upstream overcurrent detection signal LAN1 and the downstream overcurrent detection signal LAN2 are equal to each other, or any one thereof is larger. Further, the current detection signal can be effectively used in the open circuit abnormality determination means in the third period. Preferably, the RAM memory in the control circuit unit is backed up by a power source of a different system that is constantly supplied with power, and when the overcurrent detection signal is stored, a load power source system and a power source system for the control circuit unit in the power supply control apparatus are separated from each other. Thus, even though the power source short circuit in the load circuit temporarily occurs, an abnormal voltage drop to the power supply control apparatus is prevented.

Further, in relation to the invention disclosed in claim 13 of the present application, the control circuit unit 120A receives the inputs of the upstream current detection signal AN1 corresponding to the load current flowing in the upstream side switching element 150 and the downstream current detection signal AN2 corresponding to the load current flowing in the downstream side switching element 140. In the close circuit abnormality determination means 719 in the first period T1 and the open circuit abnormality determination means 839 in the third period T3, the control circuit unit 120A calculates whether the values of both of the upstream current detection signal AN1 and the downstream current detection signal AN2 are equal to each other, or any one thereof is larger, with reference to the value of the upstream current detection signal AN1 and the value of the downstream current detection signal AN2. Further, the control circuit unit 120A identifies and stores the abnormality generating factor that is any one of the positive line ground fault abnormality or the negative line supply fault abnormality of the load wiring, and the load short circuit abnormality, and identifies and stores, when the power supply switching element X, the conduction switching element Y, and the flywheel switching element Z are provided, the presence or absence of the short circuit abnormality or the disconnection abnormality thereof, and identifies and stores the presence or absence of the disconnection abnormality of the load wiring, based on the combination of the calculation result and the values of the voltage ratios G in the first period T1 and the third period T3.

As described above, in relation to the invention disclosed in claim 13 of the present application, the control circuit unit receives the inputs of the upstream current detection signal AN1 and the downstream current detection signal AN2. The control circuit unit identifies and stores the abnormality generating factors based on the combination of the values of the voltage ratios G in the first period T1 and the third period T3. Accordingly, it is possible to distinguish between the supply fault abnormality of the positive wiring and the short circuit abnormality of the upstream side switching element, or between the ground fault abnormality of the negative wiring and the short circuit abnormality of the downstream side switching element, according to the presence or absence of the current detection signals, to thereby identify and store the abnormality generating factors in detail. If the control circuit unit receives at least one input of the upstream and downstream current detection signals, the control circuit unit monitors the load current to perform a negative feedback control, or calculates the load resistance at the current temperature from the values of the power source voltage and the load current to control the average driving voltage to obtain a target load current.

Further, in relation to the invention disclosed in claim 14 of the present application, if the overcurrent abnormality does not occur in the first period T1 and the period proceeds to the second period T2, the intermittence abnormality determination means 729 for the case where the flywheel switching element 160A connected in parallel with the electric load 104 is provided is operated, and the control circuit unit 120A monitors an operation state of the upstream overcurrent determination storage circuit 137, in a state where the power supply command signal DR0 is stopped and the conduction command signal DR1 is generated, and releases the power supply command signal DR0 and the conduction command signal DR1 if the upstream overcurrent detection signal OCM is recognized, and then, the period directly proceeds to the third period T3.

As described above, in relation to the invention disclosed in claim 14 of the present application, the control circuit unit monitors the occurrence of the overcurrent abnormality even in the second period when the power supply switching element performs the intermittent operation, and releases the power supply command signal DR0 and the conduction command signal DR1 according to the occurrence of the overcurrent abnormality, and then, the period directly proceeds to the third period T3. Accordingly, if the overcurrent abnormality is not detected in the first period and is detected in the second period, the short circuit abnormality of the flywheel switching element or the short circuit abnormality of the power supply switching element is specified, and thus, it is possible to perform further determination with reference to the voltage ratio G in the third period.

Further, in relation to the invention disclosed in claim 17 of the present application, the control circuit unit 120A includes the double-abnormality determination means 604b for detecting, when an internal double-abnormality in which both of the power supply switching element X and the flywheel switching element Z have the short circuit abnormality occurs, or when an internal and external double-abnormality of a mixture of the positive line ground fault abnormality of the load wiring and the short circuit abnormality of the upstream side switching element 150, a mixture of the negative line supply fault abnormality of the load wiring and the short circuit abnormality of the downstream side switching element 140, a mixture of the short circuit abnormality of the downstream side communication switching element 160A and the positive line supply fault of the load wiring occurs, the double-abnormality. The double-abnormality determination means 604b determines that the double-abnormality occurs as the synthetic overcurrent detection signal OCM is input in the third period T3 when both of the power supply command signal DR0 and conduction command signal DR1 are not operated. When the power source relay for cutting off the load current, if the double-abnormality is detected, is provided outside, the abnormality processing means 611a transmits a command signal for de-generating the power source relay, and performs at least storage of abnormality information or abnormality notification.

As described above, in relation to the invention disclosed in claim 17 of the present application, the control circuit unit includes the double-abnormality determination means, which detects a state where the overcurrent flows due to the double-abnormality to which at least the power supply control apparatus is related to. Accordingly, when a power source cutoff function is provided at an upper stage of the power supply control apparatus, if the double-abnormality occurs, the double-abnormality determination means can immediately notify the result to cut off the power source. Thus, it is possible to prevent the occurrence of overheating and burning of the electric load or abnormal discharging of the external power source. Further, when the power source cutoff function is not provided and only a fuse is provided, it is possible to separate the load power source system from the power source system for the control circuit unit in the power supply control apparatus so that power is supplied through a different fuse, and thus, it is possible to enhance the work efficiency of maintenance and inspection based on the abnormality generation storage information according to the factors.

Second Embodiment (1) Detailed Description of Configuration

Figure 9:
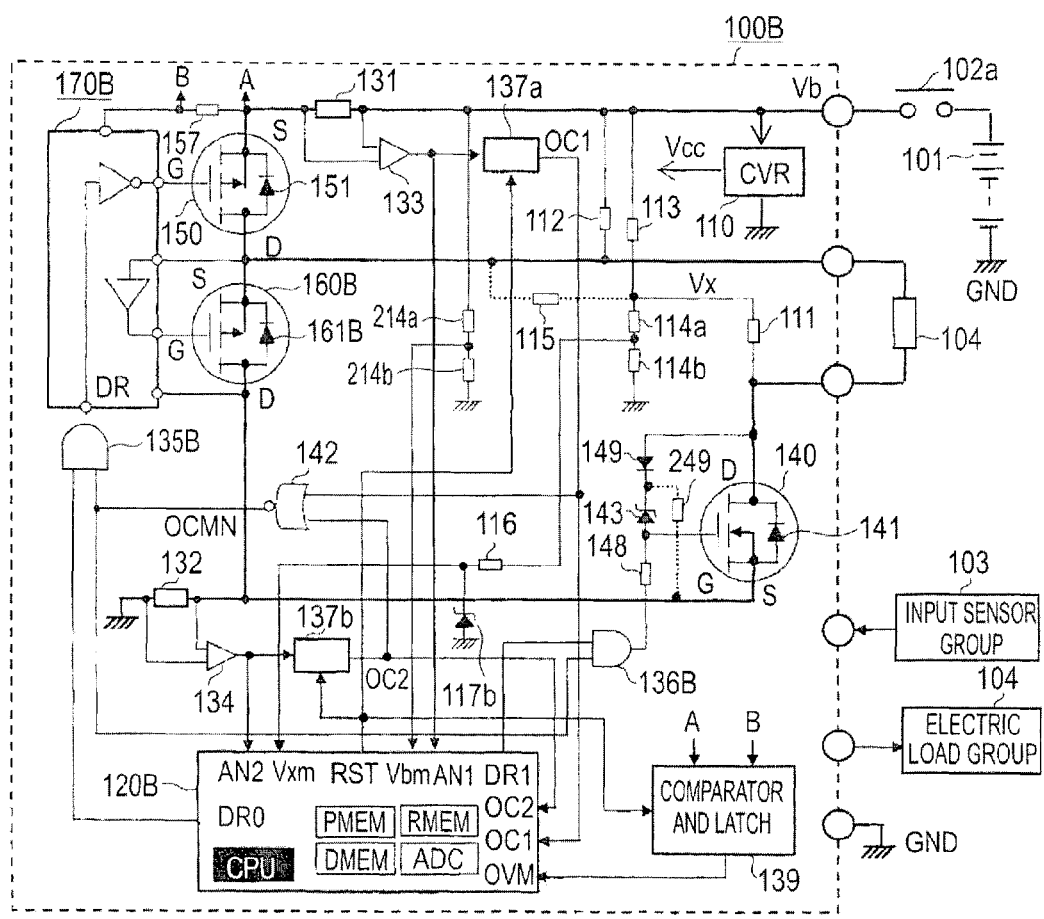
FIG. 9 is an overall circuit diagram of a power supply control apparatus of an electric load according to a second embodiment of the invention.

FIG. 9 is an overall circuit diagram of a power supply control apparatus of an electric load according to a second embodiment of the invention. Hereinafter, different points of the configuration of the power supply control apparatus of the electric load according to the second embodiment shown in FIG. 9 compared with the configuration of the power supply control apparatus of the electric load according to the first embodiment shown in FIG. 1 will be described in detail. In the respective figures, the same reference signs represent the same or equivalent portions. A first main different point compared with the case of the first embodiment shown in FIG. 1 is in that a downstream side flywheel switching element 160B that is a P-channel field effect transistor is used, instead of the downstream side flywheel switching element 160A that is the N-channel field effect transistor in FIG. 1. A second main different point is in that an upstream overcurrent determination storage circuit 137a and a downstream overcurrent determination storage circuit 137b are used, instead of the synthetic overcurrent determination storage circuit 137 in FIG. 1.

In FIG. 9, a power supply control apparatus 100B is supplied with a power source voltage Vb from an external power source 101 through a power source switch 102a, is operated in response to an operation state of an input sensor group 103, and includes a control circuit unit 120B that drive-controls an electric load group 105 that includes an electric load 104 as a main component. In the second embodiment, the power supply control apparatus 100B includes a load control circuit unit that is supplied with the power source voltage Vb through the power source switch 102a, and a constant voltage power source 110 that is supplied with power through the same power source switch 102a to generate a control voltage Vcc that is a predetermined stabilizing voltage, and is directly supplied with power from the external power source 101 to generate a backup voltage Vup (not shown) that is a predetermined stabilizing voltage. The control circuit unit 120B operated by the control voltage Vcc includes a program memory PMEM that cooperates with a microprocessor CPU, a volatile RAM memory RMEM, a nonvolatile data memory DMEM, and a multi-channel AD converter ADC, in which storage content of the RAM memory RMEM is blackout-held by the backup voltage Vup (not shown) even though the power source switch 102a is open-circuited.

A downstream side flywheel switching element 160B that is connected in parallel to a series circuit of the electric load 104 and the downstream side conduction switching element 140 at a downstream position of the upstream side power supply switching element 150 uses a P-channel field effect transistor having the same structure as that of the upstream side power supply switching element 150. Here, a flywheel control circuit 170B performs a conduction switching control of the upstream side power supply switching element 150 and the downstream side flywheel switching element 160B, which will be described in detail later in FIG. 10. At a further upstream position of the upstream side power supply switching element 150, an upstream current detecting resistance 131 is provided. A voltage between both ends of the upstream current detecting resistance 131 is amplified by an upstream current detecting circuit 133 that is a differential amplifier circuit, and then, is input to the multi-channel AD converter ADC of the control circuit unit 120B as an upstream current detection signal AN1 and is input to the upstream overcurrent determination storage circuit 137a. A downstream current detecting resistance 132 is provided at a downstream position of a parallel connecting point of the downstream side conduction switching element 140 and the downstream flywheel switching element 160B. A voltage between both ends of the downstream current detecting resistance 132 is amplified by a downstream current detecting circuit 134 that is a differential amplifier circuit, and then, is input to the multi-channel AD converter ADC of the control circuit unit 120B as a downstream current detection signal AN2 and is input to the downstream overcurrent determination storage circuit 137b.

The upstream overcurrent determination storage circuit 137a and the downstream overcurrent determination storage circuit 137b individually compare a value of a comparison reference voltage generated by a reference voltage generation circuit (not shown) with a value of the upstream current detection signal AN1 or a value of the downstream current detection signal AN2. If the value of the current detection signal exceeds a predetermined threshold current, the upstream overcurrent determination storage circuit 137a and the downstream overcurrent determination storage circuit 137b generate an upstream overcurrent detection signal OC1 or a downstream overcurrent detection signal OC2 and inputs the upstream overcurrent detection signal OC1 or the downstream overcurrent detection signal OC2 to a control circuit unit 120B. The upstream current detecting resistance 131 and the upstream current detecting circuit 133 may be provided in the upstream power supply switching element 150. Further, the downstream flywheel switching element 160B and the downstream conduction switching element 140 may be provided therein with the downstream current detecting resistance 132 and the downstream current detecting circuit 134 at each downstream position thereof, to individually input the value of each downstream current detecting circuit AN2 to the control circuit unit 120B or the individual overcurrent determination storage circuit. A gate circuit 142 is configured by a NOR output circuit that generates an inverse logic output OCMN with respect to an OR output of the upstream overcurrent detection signal OC1 and the downstream overcurrent detection signal OC2. The control circuit unit 120B stores the occurrence of the overcurrent abnormality due to the upstream overcurrent detection signal OC1 and the downstream overcurrent detection signal OC2, stops the generation of a power supply command signal DR0 and a conduction command signal DR1, and generates a reset pulse RST to reset the upstream overcurrent determination storage circuit 137a and the downstream overcurrent determination storage circuit 137b.

A gate circuit 136B conducts and drives the downstream side conduction switching element 140 through a driving resistance 148 when an AND output of the conduction command signal DR1 generated by the control circuit unit 120B and the inverse logic output OCMN is a logic level "H". When an AND output of the power supply command signal DR0 generated by the control circuit unit 120B and the inverse logic output OCMN is in a logic level "H", a gate element 135B generates a power supply driving signal DR to conduct and drive the upstream side power supply switching element 150 through the flywheel control circuit 170B shown in FIG. 10, and to open-circuit the downstream side flywheel switching element 160B. The overvoltage determination storage circuit 139 and the voltage monitoring circuit 180 have the same configurations as in the case of the first embodiment, but the load voltage monitoring signal Vxm input to the multi-channel AD converter ADC in the control circuit unit 120B through the input resistance 116 from first voltage-dividing resistances 114a and 114b is voltage-limited by a constant voltage diode 117b, instead of the clamp diode 117a in FIG. 1. Further, the overvoltage determination storage circuit 139 detects for storage an abnormality voltage generated between both ends A and B of the gate resistance 157 connected between the source terminal S of the upstream side power supply switching element 150 and the flywheel control circuit 170B, and the control circuit unit 120B stores the occurrence of the overvoltage abnormality, stops the generation of the power supply command signal DR0 and the conduction command signal DR1, and then, generates the reset pulse RST to reset the overvoltage determination storage circuit 139.

Figure 10:
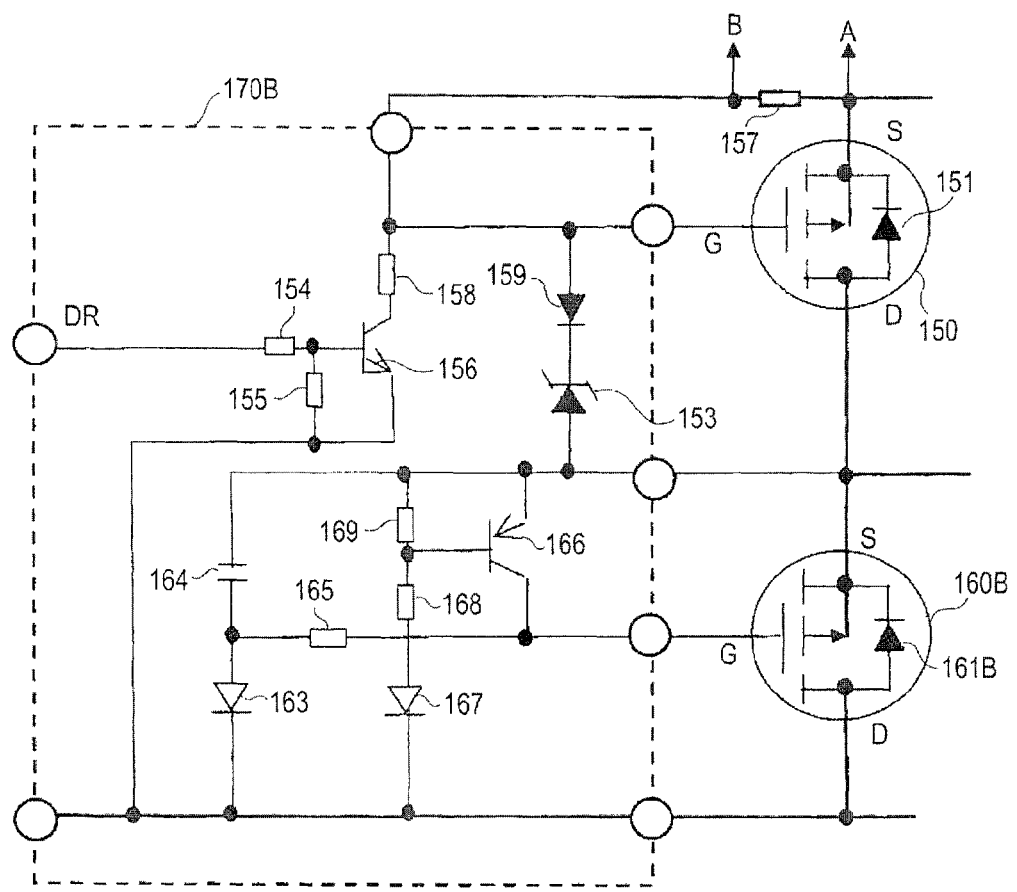
FIG. 10 is a circuit diagram illustrating details of a part of the supply control apparatus of the electric load according to the second embodiment of the invention.

FIG. 10 is a circuit diagram illustrating details of a part of the supply control apparatus of the electric load according to the second embodiment of the invention. In FIG. 10, the upstream side power supply switching element 150 is a P-channel field effect transistor that is serially connected to an upstream side of the electric load 104. Here, a signal voltage due to the power supply driving signal DR conducts and drives a driving transistor 156 through a base resistance 154, and consequently, a divided voltage due to a driving resistance 158 and a gate resistance 157 is applied between the source terminal S and the gate terminal G of the upstream side power supply switching element 150 so that forward conduction is formed between the source terminal S and the drain terminal D of the upstream side power supply switching element 150 to supply power to the electric load 104. A series circuit of a diode 159 and a second constant voltage diode 153, connected between the gate terminal G and the drain terminal D of the upstream side power supply switching element 150 is provided to prevent an overvoltage from being applied between the source terminal S and the gate terminal G of the upstream side power supply switching element 150. Further, an open circuit stabilizing resistance 155 is connected between a base terminal and an emitter terminal of the driving transistor 156, and stably open-circuits the driving transistor 156 when the logic level of the power supply driving signal DR is "L". Consequently, the conduction between the source terminal S and the drain terminal D of the upstream side power supply switching element 150 is cut off, and the load current flowing in the electric load 104 is commutated to the downstream side flywheel switching element 160B.

The downstream side flywheel switching element 160B is a P-channel field effect transistor that is connected in parallel with a series circuit of the electric load 104 and the downstream side conduction switching element 140. The downstream side flywheel switching element 160B is configured so that the load current can be commutated through a parasitic diode 161B when the upstream side power supply switching element 150 is open-circuited, but in reality, since the downstream side flywheel switching element 160B is reversely conducted from the drain terminal D toward the source terminal S and a voltage drop due to the reverse conduction is small, the commutated current is not continued in the parasitic diode 161B. A charging diode 163 that forms a gate driving circuit for the downstream side flywheel switching element 160B charges a capacitor 164 by the power source voltage Vb during the period when the upstream side power supply switching element 150 is close-circuited. A cut-off transistor 166 connected between the source terminal S and the gate terminal G of the downstream side flywheel switching element 160B is conducted and driven through a cut-off diode 167 and a base resistance 168, and consequently, the downstream side flywheel switching element 160B is not conducted forward (in a direction opposite to the conduction direction of the parasitic diode 161B). An open circuit stabilizing resistance 169 is connected between the source terminal and the emitter terminal of the cut-off transistor 166 that is a PNP junction transistor. Further, the cut-off diode 167 is provided to prevent a reverse voltage from being applied between the emitter and source of the cut-off transistor 166 when the upstream side power supply switching element 150 is open-circuited.

If the upstream side power supply switching element 150 is open-circuited, an emitter potential of the cut-off transistor 166 is decreased to a negative terminal potential or less of the external power source 101, and thus, the cut-off transistor 166 is not conducted, and the charging voltage of the capacitor 164 is applied between the source terminal S and the gate terminal G of the downstream side flywheel switching element 160B through the driving resistance 165. Thus, the downstream side flywheel switching element 160B is reversely conducted from the drain terminal D toward the source terminal S. If the open circuit state of the upstream side power supply switching element 150 is continued, the charged electric charges of the capacitor 164 are eliminated, but since it is sufficient if the capacitor 164 can maintain the gate voltage for the downstream side flywheel switching element 160B during the period until the load current of the electric load 104 is commutated to be attenuated and eliminated, a circuit configuration capable of using a capacitor of a small capacity is obtained. Accordingly, if the upstream side power supply switching element 150 is close-circuited, the cut-off transistor 166 is conducted to open-circuit the downstream side flywheel switching element 160B, and if the upstream side power supply switching element 150 is open-circuited, the cut-off transistor 166 is not conducted to close-circuit the downstream side flywheel switching element 160B by the capacitor 164. Thus, during the period when the downstream side flywheel switching element 160B is close-circuited, when the positive line supply fault abnormality occurs, the cut-off transistor 166 is conducted to open-circuit the downstream side flywheel switching element 160B, so that the power source short circuit state is not continued.

(2) Detailed Description of Operation

Next, an operation of the power supply control apparatus of the electric load according to the second embodiment of the invention will be described in detail with reference to different points from the case of the first embodiment in FIG. 1. First, in FIGS. 9 and 10, if the power source switch 102a is close-circuited and the control circuit unit 120B starts the operation, the microprocessor CPU drive-controls the electric load group 105 in response to the operation state of the input sensor group 103 and the content of the program memory PMEM, and generates the power supply command signal DR0 and the conduction command signal DR1 with respect to the electric load 104 that is one of plural electric loads in the electric load group 105. Command timings and operations of the respective units are shown in a time chart of FIG. 11 for illustrating the operation.

Figure 11:
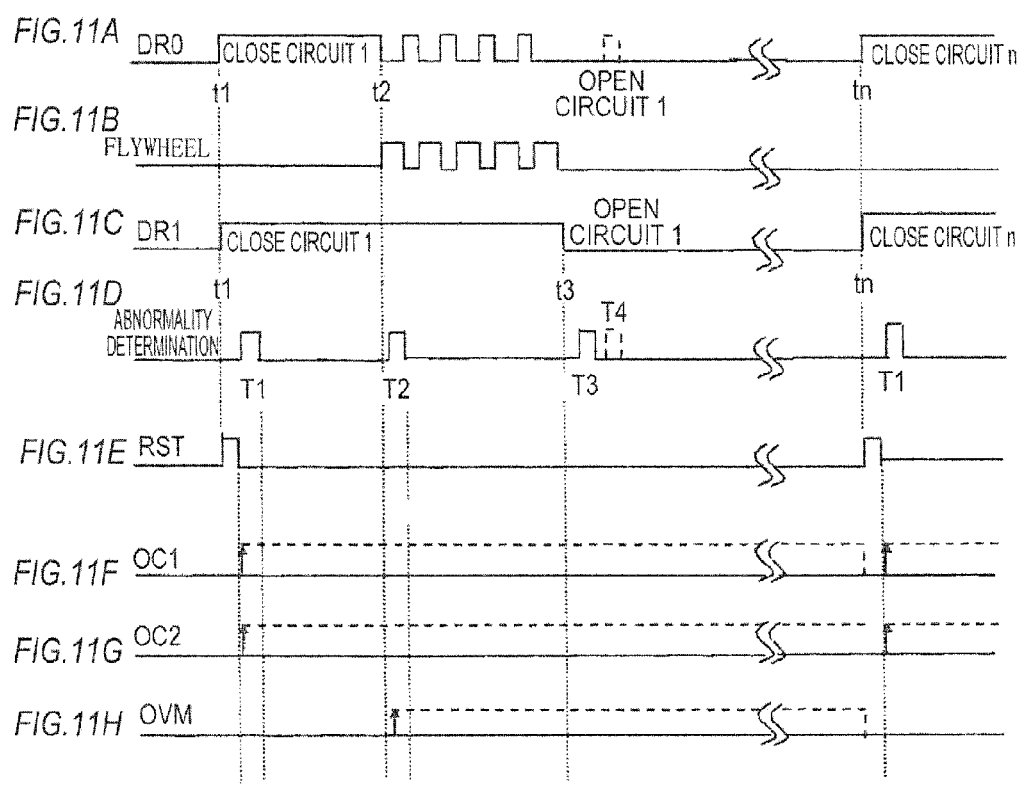
FIGS. 11A to 11H are collectively a timing chart illustrating the operation of the power supply control apparatus of the electric load according to the second embodiment of the invention.

Namely, FIG. 11 is the time chart illustrating the operation of the power supply control apparatus of the electric load according to the second embodiment of the invention. (A) of FIG. 11 shows a temporal change of the power supply command signal DR0. At time t1 determined in response to the operation state of the input sensor group 103, the power supply switching element X is close-circuited and driven at the logic level "H" (changed from valley to ridge in the waveform in the figure). At time t2, the intermittent operation is started, and then, at time t3, the power supply switching element X is open-circuited and driven at the logic level "L". Then, the same operation is repeated in a predetermined open circuit period determined in response to the operation state of the input sensor group 103 again, and then, at time tn, an n-th close circuit driving is started. (B) of FIG. 11 shows the open circuit and close circuit states of the flywheel switching element Z. The flywheel switching element Z is close-circuited as the power supply switching element X is open-circuited, in which a waveform in the figure is changed from a valley to a ridge. Further, the flywheel switching element Z is open-circuited immediately after the power supply command signal DR0 is changed to the logic level "L", and thus, the power supply switching element X is close-circuited.

(C) of FIG. 11 shows that at time t1, the conduction command signal DR1 is the logic level "H" and the conduction switching element Y is close-circuited and driven, and then, at time t3, the conduction command signal DR1 is the logic level "L" and the conduction switching element Y is de-energized and open-circuited. Then, the same operation is repeated at a predetermined open circuit period. Then, at time tn, an n-th close circuit driving is started. Accordingly, between time t1 and time t2, the power voltage Vb is continuously applied to the electric load 104, and thus, the load current rapidly increases. Then, from time t2 when the load current is estimated to reach a target current or to exceed the target current, the power supply switching element X is intermittently driven by a power supply duty (power supply time/intermittent cycle) in inverse proportion to the power source voltage Vb to maintain a predetermined average holding voltage. (D) of FIG. 11 shows a timing when in a first period T1, a second period T2 and a third period T3 immediately after time t1, time t2 and time t3, the control circuit unit 120B performs abnormality determination. In the first period T1 and the third period T3 when an overcurrent abnormality does not occur, the control circuit unit 120B reads the values of the power source voltage detection signal Vbm and the load voltage detection signal Vxm to calculate the voltage ratio Vxm/Vbm. Here, in the case of the fourth embodiment to be described later, in a fourth period T4 subsequent to the third period T3, the upstream side switching element is also open-circuited, and the control circuit unit 120B reads the values of the power source voltage detection signal Vbm and the load voltage detection signal Vxm in a state where the downstream side switching element is close-circuited to calculate the voltage ratio Vxm/Vbm.

(E) of FIG. 11 shows a timing when at time t1, the reset pulse PLS is generated to reset the storage contents of the upstream and downstream overcurrent determination storage circuits 137a and 137b, and the overvoltage determination storage circuit 139. (F) of FIG. 11 shows an example of a timing when an upstream overcurrent detection signal OC1 is generated. For example, the upstream overcurrent detection signal OC1 is generated immediately after time t1. (G) of FIG. 11 shows an example of a timing when a downstream overcurrent detection signal OC2 is generated. For example, the downstream overcurrent detection signal OC2 is generated immediately after time t2. (H) of FIG. 11 shows an example of a timing when an overvoltage detection signal VCM is generated. The overvoltage detection signal VCM is generated immediately after time t2, for example.

Next, identification determination corresponding to occurrence of various abnormalities in the power supply control apparatus of the electric load according to the second embodiment of the invention shown in FIGS. 9 and 10 will be described. FIG. 12 is a diagram illustrating a list of identification determination corresponding to occurrence of various abnormalities in the power supply control apparatus of the electric load according to the second embodiment of the invention. Hereinafter, different points from the above-described case of FIG. 5 will be described based on FIG. 12. A detailed circuit diagram of the voltage monitoring circuit 180 shown in FIG. 3 and the calculation example of the voltage ratio G shown in FIG. 4 may be applied to the second embodiment as such. A first difference between FIG. 5 and FIG. 12 is in that in the case of FIG. 5, the upstream overcurrent detection signal LAN1 and the downstream overcurrent detection signal LAN2 are used for identifying which side of the upstream or downstream the overcurrent is generated on, when the synthetic overcurrent detection signal OCM is generated, but in the case of FIG. 12, since the upstream overcurrent detection signal OC1 and the downstream overcurrent detection signal OC2 are separately input to the control circuit unit 120B, it is not necessary to read and store the generated overcurrent, and thus, it is possible to forcibly cut off the power supply command signal DR0 and the conduction command signal DR1 using hardware through the gate elements 135B and 136B immediately after the overcurrent is generated. Accordingly, in the comparison of FIGS. 5 and 12, the generation of the upstream overcurrent detection signal LAN1 or the downstream overcurrent detection signal LAN2 may be replaced by the upstream overcurrent detection signal OC1 or the downstream overcurrent detection signal OC2.

A second difference between FIG. 5 and FIG. 12 is in that in the case of FIG. 5, the presence or absence of positive line supply fault or the short circuit of the upstream power supply switching element X being in parallel relation therewith is determined in the second period T2, but in the case of FIG. 12, the determination is performed in the first period T1. The reason is as follows. In the case of the first embodiment, in the second period T2 when the downstream side flywheel switching element 160A is normally close-circuited, if it is detected that the overcurrent abnormality occurs as the short circuit abnormality or the positive line supply fault occurs in the upstream switching element that should be open-circuited, by forcibly open-circuiting the downstream side flywheel switching element 160A, the overcurrent abnormality can be released. On the other hand, in the case of the second embodiment, when the short circuit abnormality or the positive line supply fault occurs in the upstream switching element, the downstream side flywheel switching element 160B is automatically open-circuited, and thus, the overcurrent abnormality does not occur. Here, if the short circuit abnormality occurs in the downstream side flywheel switching element 160B, the overcurrent abnormality occurs, which causes a double-abnormality mode of the short circuit abnormality or the positive line supply fault of the upstream switching element and the short circuit abnormality of the downstream switching element. Such short circuit abnormalities cannot be released by any switching element in any case of the first embodiment and the second embodiment.

Figure 14:
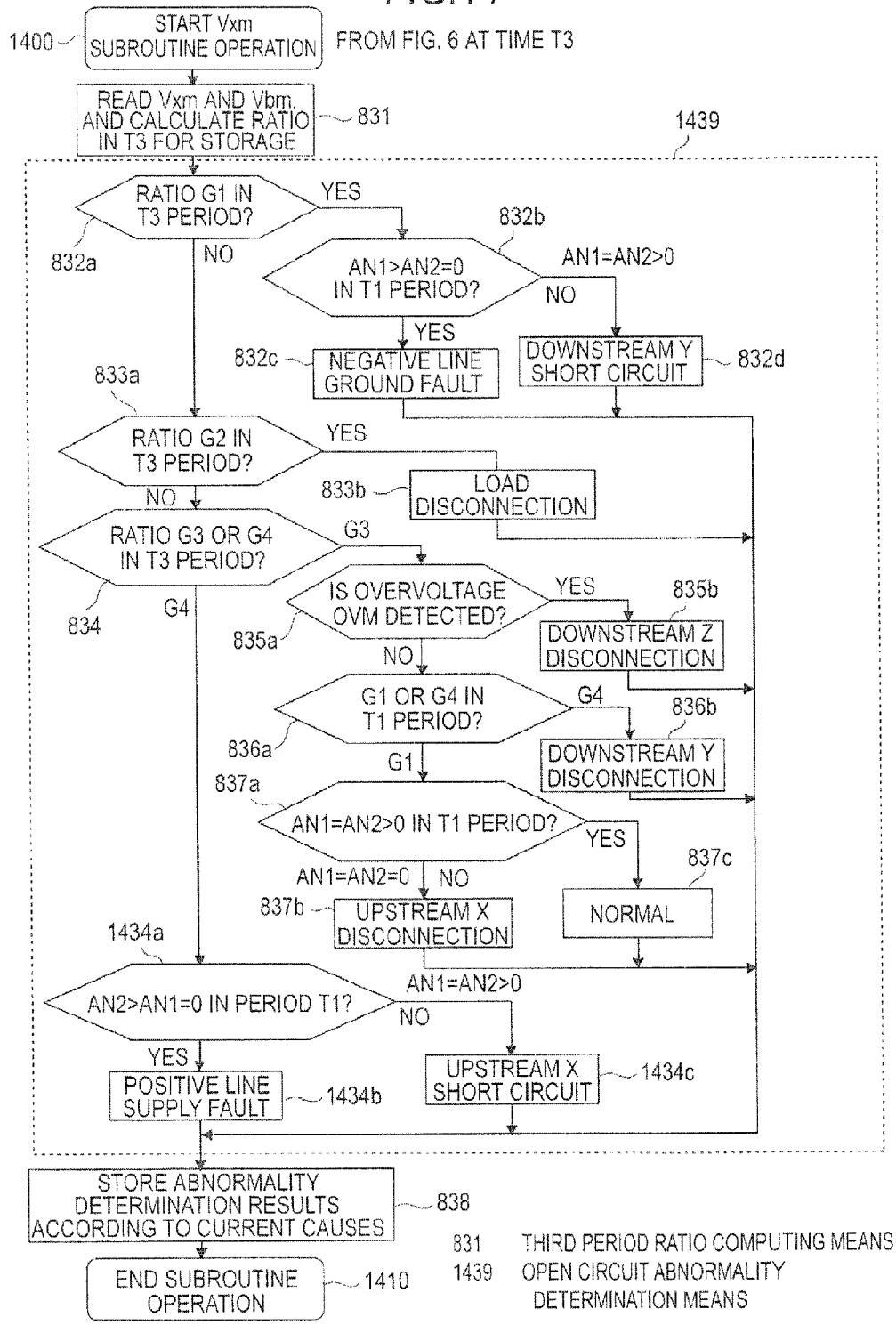
FIG. 14 is a flowchart illustrating an operation of a voltage monitoring subroutine of the power supply control apparatus of the electric load according to the second embodiment of the invention.

Next, a case of FIG. 13 illustrating details of step block 604a in FIG. 6 and FIG. 14 illustrating details of step block 604c will be mainly described with reference to different points from the case of FIGS. 7 and 8. Namely, FIG. 13 is a flowchart illustrating an operation of an overcurrent monitoring subroutine of the power supply control apparatus of the electric load according to the second embodiment of the invention. FIG. 14 is a flowchart illustrating an operation of a voltage monitoring subroutine of the power supply control apparatus of the electric load according to the second embodiment of the invention. The same reference signs in FIGS. 7 and 8 and FIGS. 13 and 14 represent the same or equivalent portions, and the description of the same or equivalent portions will not be repeated. Further, steps 703a and 703b, and steps 727a, 727b and 727c in FIG. 7 are deleted in FIG. 13, and steps 1434a, 1434b, and 1434c are added in FIG. 14, compared with FIG. 8. In FIG. 13, step 1300 corresponds to a start step of a subroutine program that starts the operation when the determination in step 603 in FIG. 6 is NO. Corresponding to the close circuit abnormality determination means 719 in FIG. 7, in close circuit abnormality determination means 1319 shown in FIG. 13, step 1317a instead of step 717a is applied. This is because the upstream overcurrent detection signal OC1 or the downstream overcurrent detection signal OC2 is applied, instead of the upstream overcurrent detection signal LAN1 or the downstream overcurrent detection signal LAN2.

Corresponding to the disconnection abnormality determination means 729 in FIG. 7, in intermittence abnormality determination means 1329 shown in FIG. 13, steps 727a, 727b, and 727c in FIG. 7 are excluded, and instead, steps 1434a, 1434b, and 1434c in FIG. 14 to be described later are provided. Subsequent to a subroutine operation terminating step 1310, the procedure returns to step 602a in FIG. 6. In FIG. 14, step 1400 is a start step of a subroutine program that starts the operation when the determination in step 604b in FIG. 6 is NO. Corresponding to the open circuit abnormality determination means 839 in FIG. 8, in open circuit abnormality determination means 1439 in FIG. 14, step 1434a is applied to a case where the size determination of the upstream current detection storage signal AN1 and the downstream current detection storage signal AN2 is performed in step 703c in FIG. 13. In step 1434a, if it is determined that "AN2>AN1=0" in the first period T1 (YES in step 1434a), the procedure proceeds to step 1434b, and if it is determined that "AN1=AN2>0" (NO in step 1434a), the procedure proceeds to step 1434c.

The positive line supply fault abnormality is stored in step 1434b, the short circuit abnormality of the upstream side power supply switching element 150 is stored in step 1434c, and then, the procedure proceeds to step 838. When the size determination of the upstream current detection storage signal AN1 and the downstream current detection storage signal AN2 is not performed in step 703c in FIG. 13, the determination of G4 is performed in step 834, and then, the positive line supply fault abnormality, or the short circuit abnormality of the upstream side power supply switching element 150 is stored. Then, the procedure proceeds to step 838. Subsequent to the subroutine operation terminating step 1410, the procedure returns to step 605a in FIG. 6.

(3) Main Point and Characteristic of the Second Embodiment

As described above, in relation to the invention disclosed in claim 1, there is provided the power supply control apparatus 100B of the electric load according to the second embodiment of the invention in which the upstream side switching element 150 and the downstream side switching element 140 are serially connected at the upstream position and the downstream position of the electric load 104 supplied with the load current from the external power source 101, and the conduction state of the upstream side switching element 150 and the downstream side switching element 140 is controlled by the control circuit unit 120B using the microprocessor as a main component, and even though one switching element of the upstream side switching element and the downstream side switching element is abnormally short-circuited, the power supply is stopped by the other switching element. Here, the power supply control apparatus 100B includes the upstream overcurrent determination storage circuit 137a that generates the upstream overcurrent detection signal OC1 as the load current flowing in the upstream side switching element 150 exceeds the predetermined value, and the downstream overcurrent determination storage circuit 137b that generates the downstream overcurrent detection signal OC2 as the load current flowing in the downstream side switching element 140 exceeds the predetermined value. The power supply control apparatus 100B further includes the voltage monitoring circuit 180 that includes the third resistance 113 and the fourth resistances 114a and 114b that divide the power source voltage Vb of the external power source 101, the first resistance 111 that is connected to the connecting portion of the third resistance and the fourth resistances at one end thereof, and the second resistance 112 that connects the other end of the first resistance 111 to the positive wiring of the power source voltage Vb through the electric load 104, in which the other end of the first resistance 111 includes a voltage monitoring circuit 180 which is connected to the downstream side of the electric load 104. The voltage monitoring circuit 180 generates the variable divided voltage Vx at both ends of the fourth resistances 114a and 114b in response to the open or close circuit state of the upstream side switching element 150 and the open or close circuit state of the downstream side switching element 140.

The control circuit unit 120B measures and monitors the value of the power source voltage detection signal Vbm that is the voltage being in proportion to the power source voltage Vb and the load voltage detection signal Vxm that is the voltage being in proportion to the variable divided voltage Vx to calculate the values of voltage ratios G and H "G, H=Vxm/Vbm", and reads and monitors the upstream and downstream overcurrent detection signals OC1 and OC2. The control circuit unit 120B further includes the abnormality determination means 604a and 604c for generating the power supply command signal DR0 for one of the upstream side switching element 150 and the downstream side switching element 140 and the conduction command signal DR1 for the other one thereof, and for detecting the abnormality state of the load wiring for the electric load 104 during operation, based on the combination of the value of the voltage ratio G corresponding to the generation state of the power supply command signal DR0 and the conduction command signal DR1, and the generation state of the upstream and downstream overcurrent detection signals OC1 and OC2, and the abnormality processing means 611a for stopping the generation of the power supply command signal DR0 and the conduction command signal DR1 when the abnormality determination means determines the abnormality state, and for identifying and storing the plural types of abnormality occurrence information. The abnormality state of the load wiring includes plural abnormality states of a state where there is a doubt about the positive line supply fault abnormality in which the upstream positive wiring of the electric load 104 is connected to the positive electrode wiring of the external power source 101, or the positive line ground fault abnormality in which the upstream positive wiring of the electric load 104 is connected to the negative electrode wiring of the external power source 101, a state where there is a doubt about the negative line supply fault abnormality in which the downstream negative wiring of the electric load 104 is connected to the positive electrode wiring of the external power source, or the negative line ground fault abnormality in which the downstream negative wiring of the electric load 104 is connected to the negative electrode wiring of the external power source, and a state where there is a doubt about the load short circuit abnormality or the load disconnection abnormality in which the electric load 104 is short-circuited or disconnected.

In relation to the invention disclosed in claim 2, the upstream side switching element 150 is the power supply element X in which the power supply duty that is the ratio of the on time and the on-off cycle is controlled by the power supply command signal DR0, and the other downstream side switching element 140 that forms the pair with the upstream side switching element 150 is the conduction switching element Y that is continuously conducted or continuously cut off by the conduction command signal DR1. The first constant voltage diode 143 that forms the cutoff voltage limit circuit is connected to the conduction switching element Y, and the downstream side flywheel switching element 160B that is the flywheel switching element Z is connected in parallel with the series circuit of the electric load 104 and the conduction switching element Y. Further, the flywheel switching element Z is open-circuited when the power supply switching element X is close-circuited, and is close-circuited when the power supply switching element X is open-circuited.

As described above, in relation to the invention disclosed in claim 2, one of the upstream switching element and the downstream switching elements is the power supply switching element X in which the power supply duty is controlled, and the other switching element thereof is the conduction switching element Y in which the continuous conduction or continuous cutoff is performed. When the electric load is an inductive load, the cutoff voltage limit circuit is provided in the conduction switching element Y, and the flywheel switching element Z is connected in parallel with the series circuit of the electric load and the conduction switching element Y. Accordingly, similar to the case of the first embodiment, when the positive line supply fault abnormality or the short circuit abnormality of the upstream side switching element occurs, without depending on an external cutoff function such as a collective power source relay, it is possible to perform self cutoff of the load current by the downstream side switching element, and when the negative line ground fault abnormality or the short circuit abnormality of the downstream side switching element occurs, it is possible to perform self cutoff of the load current by the upstream side switching element. Further, in the normal operation, it is possible to divide the functions so that the power supply state is controlled by one switching element and the response delay of the current cutoff due to the inductance component included in the electric load is suppressed by the other switching element. Further, the flywheel switching element can suppress a voltage drop of the commutation circuit compared with a commutation diode, and can suppress power consumption generated in the commutation circuit and heat generation of the circuit element.

In relation to the invention disclosed in claim 4, the pair of the upstream side switching element 150 and the downstream side switching element 140 is the P-channel field effect transistor and the N-channel field effect transistor, and the flywheel switching element 160B is the P-channel field effect transistor that is the same type as that of the power supply switching element 150. The power supply switching element 150 and the flywheel switching element 160B are switch-controlled through the flywheel control circuit 170B that includes an interlock circuit for inhibiting a simultaneous close circuit. The flywheel control circuit 170B includes the cutoff transistor 166 that causes the short circuit between the gate terminal G and the source terminal S of the flywheel switching element 160B when the power supply switching element 150 is close-circuited to set the flywheel switching element 160B to a non-conduction state, the capacitor 164 that is charged through the charging diode 163, and the driving resistance 165 that open-circuits the cutoff transistor 166 when the power supply switching element 150 is open-circuited and applies the charged voltage of the capacitor 164 between the gate terminal G and the source terminal S of the flywheel switching element 160B, in which when the power supply switching element 150 is open-circuited, the flywheel switching element 160B is conducted and driven in the same direction as the conduction direction of the parasitic diode 161B generated between the source terminal S and the drain terminal D.

As described above, in relation to the invention disclosed in claim 4, the power supply switching element X and the flywheel switching element Z are controlled by the flywheel control circuit. When the power supply switching element is close-circuited, the flywheel switching element is open-circuited to charge the capacitor, and when the power supply switching element is open-circuited, the flywheel switching element is close-circuited by the charged electric charges of the capacitor. Further, the flywheel switching element is connected to have the polarity so that the open circuit conduction direction of the flywheel switching element is the same direction as the conduction direction of the parasitic diode in the flywheel switching element. Accordingly, in the case of the embodiment in which the power supply switching element X is the upstream side switching element, when the flywheel switching element Z is close-circuited and the positive line supply fault abnormality occurs in the period when the power supply switching element X is open-circuited, the commutation circuit element is open-circuited by the cutoff transistor that is the interlock circuit, and the flywheel switching element is not conducted in the reverse direction to the conduction direction of the parasitic diode provided therein, and thus, it is possible to prevent the power source short circuit state from occurring due to the simultaneous occurrence of the short circuit of the power supply switching element or the short circuit of the external wiring instead thereof, and the conduction of the flywheel switching element.

Further, the power source for close-circuiting and driving the flywheel switching element in the commutation period uses the capacitor charged when the power supply switching element is open-circuited. The capacitor is used in a light load only for applying the gate voltage to the field effect transistor in the short period when the current of the inductive load is attenuated, and thus, it is possible to form a small and cheap flywheel control circuit using a capacitor of a small capacity. Further, compared with a case where a general diode or a general parasitic diode is used as the commutation diode, the voltage drop of the flywheel switching element in the commutation period is remarkably reduced, and thus, it is possible to remarkably reduce a temperature increase due to heat generation of the flywheel switching element, and to provide a small and cheap power supply control apparatus.

Next, in relation to the invention disclosed in claim 10, the abnormality determination means includes the first abnormality determination means 604a and the second abnormality determination means 604c. The first abnormality determination means 604a includes the close circuit abnormality determination means 1319 or the first period ratio computing means 702 in the first period T1 when the power supply command signal DR0 is given to at least one of the upstream side switching element 150 and the downstream side switching element 140, the conduction command signal DR1 is given to the other thereof, and both of the upstream side switching element 150 and the downstream side switching element 140 are close-circuited and driven, and additionally includes the intermittence abnormality determination means 1329 in the second period T2 when the power supply switching element X to which the power supply command signal DR0 is given intermittently drives the electric load 104, when there is provided the flywheel switching element 160B that is connected in parallel with the electric load 104. In the first period T1, the power supply command signal DR0 and the conduction command signal DR1 continue a close circuit command at least until the abnormality determination using the close circuit determination means 1319 is completed. Here, if the upstream or the downstream overcurrent detection signal OC1 or OC2 is detected, both of the power supply command signal DR0 and the conduction command signal DR1 are changed to an open circuit command, and the period directly proceeds to the third period T3. Further, in the first period T1, if the upstream or downstream overcurrent detection signal OC1 or OC2 is not detected, the voltage ratio G in the first period T1 is calculated for storage by the first period ratio computing means 702.

The second abnormality determination means 604c includes the third period ratio computing means 831 in the third period T3 when both of the power supply command signal DR0 and the conduction command signal DR1 are stopped and both of the upstream side switching element and the downstream side switching element are given an open circuit command, and the close circuit abnormality determination means 1439. In the third period T3, the power supply command signal DR0 and the conduction command signal DR1 continue the open circuit command at least until the abnormality determination using the open circuit abnormality determination means 1439 is completed, and the voltage ratio G in the third period T3 is calculated for storage by the third period ratio computing means 831. The close circuit abnormality determination means 1319 determines the generating factor of the overcurrent abnormality in which the upstream or downstream overcurrent detection signal OC1 or OC2 is detected, by the value of the voltage ratio G calculated by the third period ratio computing means 831. The open circuit abnormality determination means 1439 subdivides, for determination, the generating factors of abnormalities other than the overcurrent abnormality that includes the short circuit abnormality of the upstream side switching element 150, the downstream side switching element 140 or the downstream side flywheel switching element 160B based on the combination of the value of the voltage ratio G calculated by the first period ratio computing means 702 and the value of the voltage ratio G calculated by the third period ratio computing means 831.

As described above, in relation to the invention disclosed in claim 10, if the overcurrent abnormality occurs in the first period when both of the power supply switching element and the conduction switching element are close-circuited and driven, the period directly proceeds to the third period when both of the power supply switching element and the conduction switching element are open-circuited, the voltage ratio is calculated by the third period ratio computing means, and the voltage ratios in the first period and the third period are calculated by the first period ratio computing means and the third period computing means with respect to abnormalities other than the overcurrent abnormality. Accordingly, similar to the first embodiment, the generating factor of the overcurrent abnormality is subdivided for determination by the voltage ratio using the third period ratio computing means, and the generating factors of the abnormalities other than the overcurrent abnormality are subdivided for determination based on the combination of the voltage ration using the first period ratio computing means and the voltage ratio using the third period ratio computing means.

Further, in relation to the invention disclosed in claim 12, the upstream overcurrent determination storage circuit 137a and the downstream overcurrent determination storage circuit 137b generate the upstream overcurrent detection signal OC1 and the downstream overcurrent detection signal OC2 when the load current is excessively large, interrupt-input the generated upstream overcurrent detection signal OC1 and downstream overcurrent detection signal OC2 to the control circuit unit 120B, cut off the power supply command signal DR0 and the conduction command signal DR1 through the gate elements 135B and 136B, and forcibly open-circuit at least the power supply switching element 150 and the conduction switching element 140. The control circuit unit 120B recognizes the upstream overcurrent detection signal OC1 and the downstream overcurrent detection signal OC2 to stop the power supply command signal DR0 and the conduction command signal DR1, and identifies whether both of the upstream overcurrent detection signal OC1 and the downstream overcurrent detection signal OC2 are generated, or any one thereof is generated. The control circuit unit 120B identifies and stores the overcurrent abnormality generating factor that is at least one of the positive line ground fault abnormality or the negative line supply fault abnormality of the load wiring, and the load short circuit with reference to the voltage ratio G in the third period T3, identifies and stores the presence or absence of the short circuit abnormality of the power supply switching element X, and identifies and stores the presence or absence of the short circuit abnormality of the flywheel switching element Z when the flywheel switching element Z is provided.

As described above, in relation to the invention disclosed in claim 12, in the first period when both of the power supply switching element and the conduction switching element are close-circuited and driven or in the second period when the power supply switching element is close-circuited and the conduction switching element and the flywheel switching element are close-circuited and driven, when the overcurrent flows in at least one of the upstream side switching element and the downstream side switching element, the upstream overcurrent detection signal OC1 or the downstream overcurrent detection signal OC2 is generated to cut off or stop the generation of the power supply command signal DR0 and the conduction command signal DR1, and then, the period proceeds to the third period. The control circuit unit identifies and stores the overcurrent abnormality generating factor with reference to the voltage ratio G in the third period T3. Accordingly, even though the load current is cut off according to the detection of the overcurrent, the control circuit unit recognizes the cutoff, to continue the upstream overcurrent detection signal OC1 and the downstream overcurrent detection signal OC2 as long as the overcurrent determination storage circuit is not reset, and to reliably cut off the overcurrent by the plural interrupt-input signals, thereby making it possible to identify and store the detailed abnormality generating factor. Further, since the upstream side switching element and the downstream side switching element are directly cut off according to the occurrence of the overcurrent abnormality, heat generation of the switching element is suppressed. Further, even though the power source short circuit state temporarily occurs, it is possible to continue the control operation of the control circuit unit by the power source capacitor provided in the output circuit of the constant voltage power source. Further, by connecting a back discharge prevention diode to the charging circuit of the power source capacitor, it is possible to achieve a design in which the constant voltage power source and the load driving power source are provided as the same system power source.

Further, in relation to the invention disclosed in claim 13, the control circuit unit 120B receives the inputs of the upstream current detection signal AN1 corresponding to the load current flowing in the upstream side switching element 150 and the downstream current detection signal AN2 corresponding to the load current flowing in the downstream side switching element 140. The control circuit unit 120B calculates whether the values of both of the upstream current detection signal AN1 and the downstream current detection signal AN2 are equal to each other, or any one thereof is larger, with reference to the value of the upstream current detection signal AN1 and the value of the downstream current detection signal AN2, in the close circuit abnormality determination means 1319 in the first period T1 and the open circuit abnormality determination means 1439 in the third period T3. Further, the control circuit unit 120B identifies and stores the abnormality generating factor that is any one of the positive line ground fault abnormality or the negative line supply fault abnormality of the load wiring, and the load short circuit abnormality, and identifies and stores, when the power supply switching element X, the conduction switching element Y, and the flywheel switching element Z are provided, the presence or absence of the short circuit abnormality or the disconnection abnormality thereof, and identifies and stores the presence or absence of the disconnection abnormality of the load wiring, based on the combination of the calculation result and the values of the voltage ratios G in the first period T1 and the third period T3.

As described above, in relation to the invention disclosed in claim 13, the control circuit unit receives the inputs of the upstream current detection signal AN1 and the downstream current detection signal AN2. The control circuit unit identifies and stores the abnormality generating factors based on the combination of the values of the voltage ratios G in the first period T1 and the third period T3. Accordingly, similar to the first embodiment, it is possible to distinguish between the supply fault abnormality of the positive side wiring and the short circuit abnormality of the upstream side switching element, or between the ground fault abnormality of the negative side wiring and the short circuit abnormality of the downstream side switching element, according to the presence or absence of the current detection signals, to thereby identify and store the abnormality generating factors in detail. If the control circuit unit receives at least one input of the upstream and downstream current detection signals, the control circuit unit monitors the load current to perform a negative feedback control, or calculates the load resistance at the current temperature from the values of the power source voltage and the load current to control the average driving voltage to obtain a target load current.

Further, in relation to the invention disclosed in claim 17, the control circuit unit 120B includes the double-abnormality determination means 604b for detecting, when an internal double-abnormality in which both of the power supply switching element X and the flywheel switching element Z have the short circuit abnormality occurs, or when an internal and external double-abnormality of a mixture of the positive line ground fault abnormality of the load wiring and the short circuit abnormality of the upstream side switching element 150, a mixture of the negative line supply fault abnormality of the load wiring and the short circuit abnormality of the downstream side switching element 140, a mixture of the short circuit abnormality of the downstream side communication switching element 160B and the positive line supply fault abnormality of the load wiring, or a mixture of the short circuit abnormality of the upstream side switching element 150 and the negative line ground fault abnormality of the load wiring occurs, the internal and external double-abnormality of the mixture. The double-abnormality determination means 604b determines that the double-abnormality occurs as the upstream overcurrent detection signal OC1 or the downstream overcurrent detection signal OC2, or the synthetic overcurrent detection signal is input in the third period T3 when both of the power supply command signal DR0 and conduction command signal DR1 are not operated. Further, when a power source relay for cutting off the load current, if the double-abnormality is detected, is provided outside, the abnormality processing means 611a transmits a command signal for de-generating the power source relay, and performs at least storage of abnormality information or abnormality notification.

As described above, in relation to the invention disclosed in claim 17, the control circuit unit includes the double-abnormality determination means, which detects a state where the overcurrent flows due to the double-abnormality to which at least the power supply control apparatus is related to. Accordingly, similar to the first embodiment, when a power source cutoff function is provided at an upper stage of the power supply control apparatus, if the double-abnormality occurs, the double-abnormality determination means can immediately notify the result to cut off the power source. Thus, it is possible to prevent the occurrence of overheating and burning of the electric load or abnormal discharging of the external power source. Further, when the power source cutoff function is not provided and only a fuse is provided, it is possible to separate the load power source system from the power source system for the control circuit unit in the power supply control apparatus so that power is supplied through a different fuse, and thus, it is possible to enhance the work efficiency of maintenance and inspection based on the abnormality generation storage information according to the factors.

Third Embodiment (1) Detailed Description of Configuration

Figure 15:
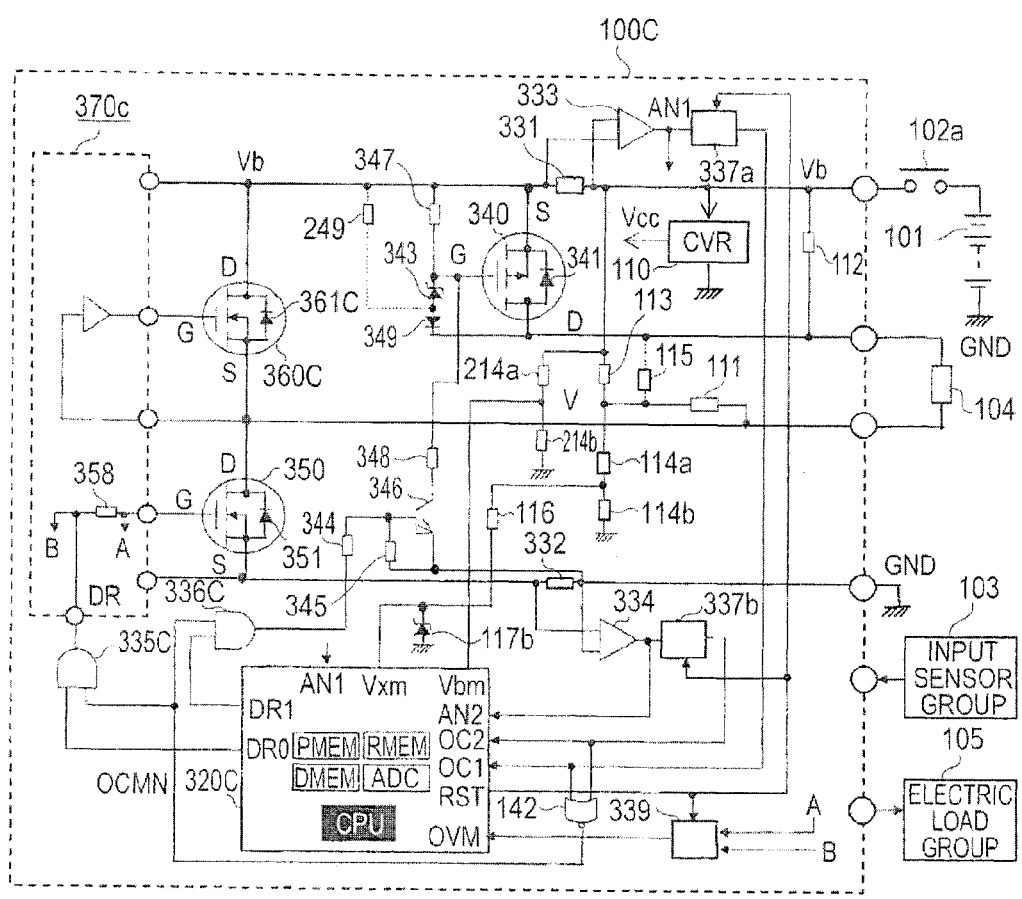
FIG. 15 is an overall circuit diagram of a power supply control apparatus of an electric load according to a third embodiment of the invention.

FIG. 15 is an overall circuit diagram of a power supply control apparatus of an electric load according to a third embodiment of the invention. Hereinafter, different points of the configuration of the power supply control apparatus of the electric load according to the third embodiment shown in FIG. 15 compared with the configuration of the power supply control apparatus of the electric load according to the first embodiment shown in FIG. 1 will be described in detail. In the respective figures, the same reference signs represent the same or equivalent portions. A first main different point compared with the first embodiment shown FIG. 1 is in that an upstream side conduction switching element 340 is used instead of the downstream side conduction switching element 140, a downstream side power supply switching element 350 is used instead of the upstream side power supply switching element 150, and an upstream side flywheel switching element 360C is used instead of the downstream side flywheel switching element 160A, and thus, the types of the switching elements are changed from the P-channel type to the N-channel type, and from the N-channel type to the P-channel type. A second main different point is in that the flywheel switching element is changed from the time difference switching method in FIG. 1 to an interlock method in FIG. 9. A third main different point is in that an upstream overcurrent determination storage circuit 337a and a downstream overcurrent determination storage circuit 337b corresponding to the upstream overcurrent determination storage circuit 137a and the downstream overcurrent determination storage circuit 137b in FIG. 9 are used, instead of the synthetic overcurrent determination storage circuit 137 in FIG. 1.

In FIG. 15, a power supply control apparatus 100C is supplied with the power source voltage Vb from the external power source 101 through the power source switch 102a, is operated in response to an operation state of an input sensor group 103, and includes the control circuit unit 320C that drive-controls the electric load group 105 that includes an electric load 104 as a main component. In the third embodiment, the power supply control apparatus 100C includes a load control circuit unit that is supplied with the power source voltage Vb through the power source switch 102a, and a constant voltage power source 110 that is supplied with power through the same power source switch 102a to generate a control voltage Vcc that is a predetermined stabilizing voltage, and is directly supplied with power from the external power source 101 to generate a backup voltage Vup (not shown) that is a predetermined stabilizing voltage. The control circuit unit 320C operated by the control voltage Vcc includes a program memory PMEM that cooperates with a microprocessor CPU, a volatile RAM memory RMEM, a nonvolatile data memory DMEM, and a multi-channel AD converter ADC, in which storage content of the RAM memory RMEM is blackout-held by the backup voltage Vup (not shown) even though the power source switch 102a is open-circuited.

The downstream side flywheel switching element 350 that is serially connected at a downstream position of the electric load 104 is an N-channel field effect transistor, which may be referred to as a downstream side switching element 350 or a power supply switching element 350. Here, the downstream side refers to a position on a side closer to a negative electrode wiring of the external power source 101 than to the electric load 104. The power supply switching element refers to a switching element that is intermittently controlled by a power supply command signal DR0 generated by the control circuit unit 320C and can control an average power supply voltage with respect to the electric load 104. On the other hand, in FIG. 9 that illustrates the second embodiment, the upstream side power supply switching element 150 is used, and thus, the upstream side and downstream side power supply switching elements 150 and 350 may be generally referred to as a power supply switching element X.

An upstream side conduction switching element 340 that is serially connected at an upstream position of the electric load 104 is a P-channel field effect transistor, which may be referred to as an upstream side switching element 340 or a conduction switching element 340. Here, the upstream side refers to a position on a side closer to a positive electrode wiring of the external power source 101 than to the electric load 104. The conduction switching element refers to a switching element that is controlled by a conduction command signal DR1 generated by the control circuit unit 320C, is open-circuited when the power supply to the electric load 104 is stopped, and is constantly close-circuited when the power supply switching element is close-circuited and in a period when the intermittent control is performed. On the other hand, in FIG. 9 that illustrates the second embodiment, the downstream side conduction switching element 140 is used, and thus, the upstream side and downstream side conduction switching elements 140 and 340 may be generally referred to as a conduction switching element Y.

At an upstream position of the downstream side power supply switching element 350, the upstream side flywheel switching element 360C connected in parallel with the series circuit of the electric load 104 and the upstream side conduction switching element 340 uses an N-channel field effect transistor having the same type as that of the downstream side power supply switching element 350. The above-described downstream side flywheel switching element 160B in FIG. 9 has the same structure as that of the upstream side power supply switching element 150, but uses a P-channel field effect transistor. The downstream side and upstream side flywheel switching elements may be generally referred to as a flywheel switching element Z.

At a further upstream position of the upstream side conduction switching element 340 and the upstream side flywheel switching element 360C, an upstream current detecting resistance 331 is provided. A voltage between both ends of the upstream current detecting resistance 331 is amplified by an upstream current detecting circuit 333 that is a differential amplifier circuit, and then, is input to the multi-channel AD converter ADC of the control circuit unit 320C as an upstream current detection signal AN1 and is input to a upstream overcurrent determination storage circuit 337a. A downstream current detecting resistance 332 is provided at a downstream position of the downstream side power supply switching element 350. A voltage between both ends of the downstream current detecting resistance 332 is amplified by a downstream current detecting circuit 334 that is a differential amplifier circuit, and then, is input to the multi-channel AD converter ADC of the control circuit unit 320C as a downstream current detection signal AN2 and is input to the downstream overcurrent determination storage circuit 337b.

The upstream overcurrent determination storage circuit 337a and the downstream overcurrent determination storage circuit 337b individually compare a value of a comparison reference voltage generated by a reference voltage generation circuit (not shown) with a value of the upstream current detection signal AN1 or a value of the downstream current detection signal AN2. If the value of any one current detection signal exceeds a predetermined threshold current, the upstream overcurrent determination storage circuit 337a and the downstream overcurrent determination storage circuit 337b generate an upstream overcurrent detection signal OC1 or a downstream overcurrent detection signal OC2, and inputs the upstream overcurrent detection signal OC1 or the downstream overcurrent detection signal OC2 to the control circuit unit 320C. The control circuit unit 320C stores the overcurrent abnormality occurrence to stop the generation of the power supply command signal DR0 and the conduction command signal DR1, generates a reset pulse RST to reset the upstream and downstream overcurrent determination storage circuits 337a and 337b. The downstream current detecting resistance 332 and the downstream current detection signal 334 may be provided in the downstream power supply switching element 350, and the upstream flywheel switching element 360C and the upstream conduction switching element 340 may be provided therein with the upstream current detecting resistance 331 and the upstream current detecting circuit 333 at each upstream position thereof, to individually input the value of each upstream current detecting circuit AN1 to the control circuit unit 320C or the upstream overcurrent determination storage circuit 337a. Further, the gate circuit 142 is configured by a NOR circuit that generates an inverted logic output OCMN with respect to an OR output of the upstream overcurrent detection signal OC1 and the downstream overcurrent detection signal OC2.

The upstream side conduction switching element 340 includes a series circuit of a gate resistance 347 connected between a source terminal and a gate terminal, a driving resistance 348 connected between a gate terminal G and a ground terminal GND, and a driving transistor 346. Here, when an output logic level of a gate element 336C is "H", a gate voltage is applied between a gate terminal G and a source terminal S as the driving transistor 346 is conducted, and a load current flows from an upstream source terminal S to a downstream source terminal D. A parasitic diode 341 is connected between the drain terminal D and the source terminal S. When the output logic level of the gate element 336C is "H", the driving transistor 346 is conducted and driven through a base resistance 344. When the output logic level of the gate element 336C is "L", the driving transistor 346 is not reliably conducted by an open circuit stabilizing resistance 345 connected between a base terminal and an emitter terminal.

When the output logic level of the gate element 336C is "L", the conduction between the source terminal S and the drain terminal D of the upstream side conduction switching element 340 is cut off. However, when the electric load 104 is an inductive load such as an electromagnetic coil having an inductance component, a serge voltage is generated according to the open circuit state of the upstream side conduction switching element 340, and a serge current flows in the gate resistance 347 through a diode 349 that is serially connected between the gate terminal G and the drain terminal D, and a first constant voltage diode 343. As a result, the upstream side conduction switching element 340 is close-circuited again, and thus, the serge voltage is decreased. Then, when the upstream side conduction switching element 340 is open-circuited again, the voltage between the source terminal S and the drain terminal D of the upstream side conduction switching element 340 is negative-feedback-controlled to become a predetermined constant voltage corresponding to the operation voltage of the first constant voltage diode 343, and then, the current flowing in the electric load 104 is rapidly attenuated to become zero. Here, an inverted auxiliary resistance 249 may be connected between a connecting point of the serial diode 349 and the first constant voltage diode 343 and the source terminal S. When the inverted auxiliary resistance 249 is connected between the connecting point of the diode 349 and the first constant voltage diode 343 and the source terminal S, the inverted auxiliary resistance 249 causes a forward minute current to flow in the serial diode 349 from the start of generation of an inductive serge voltage, and prevents an inverted operation delay of the serial diode 349 generated when the serge voltage reaches the operation voltage of the first constant voltage diode 343 and generation of overshoot due to the inverted operation delay, to thereby prevent excessive withstanding voltage between the drain and the source of the downstream conduction switching element 340.

An upstream side flywheel switching element 360C that is connected in parallel with a series circuit of the electric load 104 and the downstream side conduction switching element 340 at an upstream position of the downstream side power supply switching element 350 uses an N-channel field effect transistor having the same structure as that of the downstream side power supply switching element 350. Here, a flywheel control circuit 370C performs a conduction switching control of the downstream side power supply switching element 350 and the upstream side flywheel switching element 360C, which will be described in detail later in FIG. 16. A gate element 335C generates, when an AND output of the power supply command signal DR0 generated by the control circuit unit 320C and the inverted logic output OCMN is the logic level "H", a power supply driving signal DR to conduct and drive the downstream side power supply switching element 350 through the commutation switching circuit 370C shown in FIG. 16, and to open-circuit the upstream side flywheel switching element 360C. The gate element 336C conducts and drives the upstream side conduction switching element 340 through the driving transistor 346 when the AND output of the conduction command signal DR1 generated by the control circuit unit 320C and the inverted logic output OCMN is the logic level "H".

The voltage monitoring circuit 180 is configured in a similar way to the case of the first embodiment, but the load voltage monitoring signal Vxm input to the multi-channel AD converter ADC in the control circuit unit 320C through the input resistance 116 from the first voltage-dividing resistances 114a and 114b is voltage-limited by a constant voltage diode 117b, instead of the clamp diode 117a in FIG. 1. Further, the overvoltage determination storage circuit 339 detects for storage an abnormality voltage generated between both ends A and B of the driving resistance 358 connected between the gate terminal G of the downstream side power supply switching element 350 and the flywheel control circuit 370C, generates the overvoltage detection signal OVM, and inputs the generated overvoltage detection signal OVM to the control circuit unit 320C. The control circuit unit 320C stores the occurrence of the abnormality, stops the generation of the power supply command signal DR0 and the conduction command signal DR1, and then, generates the reset pulse RST to reset the overvoltage determination storage circuit 139.

Figure 16:
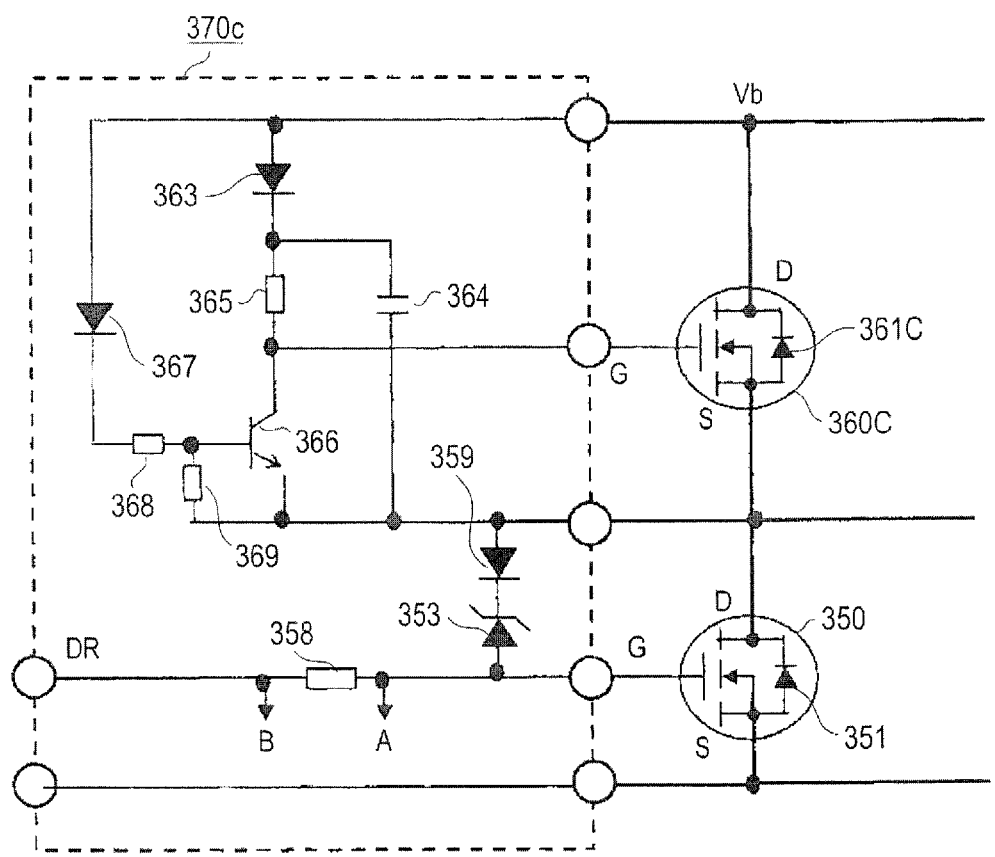
FIG. 16 is a circuit diagram illustrating details of a part of the supply control apparatus of the electric load according to the third embodiment of the invention.

FIG. 16 is a circuit diagram illustrating details of a part of the supply control apparatus of the electric load according to the third embodiment of the invention. In FIG. 16, the downstream side power supply switching element 350 is an N-channel field effect transistor that is serially connected to a downstream side of the electric load 104. Here, a signal voltage due to the switching command signal DR is supplied between the gate terminal G and the source terminal S through the driving resistance 358. When the logic level of the switching command signal DR is "H", the conduction between the drain terminal D and the source terminal S of the downstream side power supply switching element 350 is formed forward to supply power to the electric load 104 from the direct current power source 101 through the power source switch 102a. Further, when the logic level of the switching command signal DR is "L", the conduction between the drain terminal D and the source terminal S of the downstream side power supply switching element 350 is cut off, and the load current flowing in the electric load 104 is commutated to the upstream side flywheel switching element 360C to be described later.

The upstream side flywheel switching element 360C is an N-channel field effect transistor that is connected in parallel with the series circuit of the electric load 104 and the upstream side conduction switching element 340. Here, the upstream side flywheel switching element 360C is configured so that the load current can be commutated through a parasitic diode 361C when the downstream side power supply switching element 350 is open-circuited, but in reality, since the upstream side flywheel switching element 360C is reversely conducted from the source terminal S toward the drain terminal D and a voltage drop due to the reverse conduction is small, the commutated current is not continued in the parasitic diode 361C. A charging diode 363 that forms a gate driving circuit for the upstream side flywheel switching element 360C charges a capacitor 364 in the period when the downstream side power supply switching element 350 is close-circuited. A cut-off transistor 366 connected between the gate terminal G and the source terminal S of the upstream side flywheel switching element 360C is conducted and driven through a cut-off diode 367 and a base resistance 368, and consequently, the upstream side flywheel switching element 360C is not conducted forward (in a direction opposite to the conduction direction of the parasitic diode 361C).

An open circuit stabilizing resistance 369 is connected between the base terminal and the emitter terminal of the cut-off transistor 366 that is an NPN junction transistor. Further, the cut-off diode 367 is provided to prevent a reverse voltage from being applied between the emitter terminal and the base terminal of the cut-off transistor 366 when the downstream side power supply switching element 350 is open-circuited. If the downstream side power supply switching element 350 is open-circuited, an emitter potential of the cut-off transistor 366 is increased to a power source voltage Vb or more, and thus, the cut-off transistor 366 is not conducted, and the charging voltage of the capacitor 364 is applied between the gate terminal G and the source terminal S of the upstream side flywheel switching element 360C through the driving resistance 365. Thus, the upstream side flywheel switching element 360C is reversely conducted from the source terminal S toward the drain terminal D. Consequently, even though the electric load 104 is an inductive load such as an electromagnetic coil having an inductance component, when the upstream side conduction switching element 340 is close-circuited, the load current flowing in the electric load 104 is commutated to the commutation circuit including the upstream side conduction switching element 340 and the upstream side flywheel switching element 360C, and then is gradually attenuated, and thus, the inductive serge voltage is not generated in the downstream side power supply switching element 350.

If the open circuit state of the downstream side power supply switching element 350 is continued, the charged electric charges of the capacitor 364 are eliminated, but since it is sufficient if the capacitor 364 can maintain the gate voltage for the upstream side flywheel switching element 360C during the period until the load current of the electric load 104 is commutated to be attenuated and eliminated, a circuit configuration capable of using a capacitor of a small capacity is obtained. However, when the downstream side power supply switching element 350 is open-circuited, if the upstream side flywheel switching element 360C is in the disconnection abnormality state, the serge voltage occurs according to the open circuit state of the downstream side power supply switching element 350 or the upstream side conduction switching element 340, the serge current flows in the driving resistance 358 through the diode 359 and the second constant voltage diode 353 that are serially connected between the drain terminal D and the gate terminal G of the downstream side power supply switching element 350.

Consequently, if the downstream side power supply switching element 350 is closed-circuited again, the serge voltage between the drain terminal D and the source terminal S of the downstream side power supply switching element 350 is decreased to open-circuit the downstream side power supply switching element 350 again, and thus, the voltage between the drain terminal D and the source terminal S of the downstream side power supply switching element 350 is negative-feedback-controlled to become a predetermined constant voltage corresponding to the operation voltage of the second constant voltage diode 353, and then, the current flowing in the electric load 104 is rapidly attenuated to become zero. When the upstream side flywheel switching element 360C is in the disconnection abnormality state, the overvoltage determination storage circuit 339 detects for storage the serge voltage generated in the driving resistance 358 of the downstream side power supply switching element 350, and inputs an overvoltage detection signal OVM to the control circuit unit 320C. The control circuit unit 320C stores the abnormality occurrence, stops the generation of the power supply command signal DR0 and the conduction command signal DR1, and then, generates the reset pulse RST to reset the overvoltage determination storage circuit 339.

(2) Detailed Description of Operation

Next, an operation of the power supply control apparatus of the electric load according to the third embodiment of the invention configured from FIGS. 15 and 16 will be described in detail with reference to different points from the case of the first embodiment in FIGS. 1 and 9. First, in FIGS. 15 and 16, if the power source switch 102a is close-circuited and the control circuit unit 320C starts the operation, the microprocessor CPU drive-controls the electric load group 105 in response to the operation state of the input sensor group 103 and the content of the program memory PMEM, and generates the power supply command signal DR0 and the conduction command signal DR1 with respect to the electric load 104 that is one of plural electric loads in the electric load group 105. Command timings and operations of the respective units are shown in a time chart of FIG. 11 for illustrating the operation.

Figure 17:
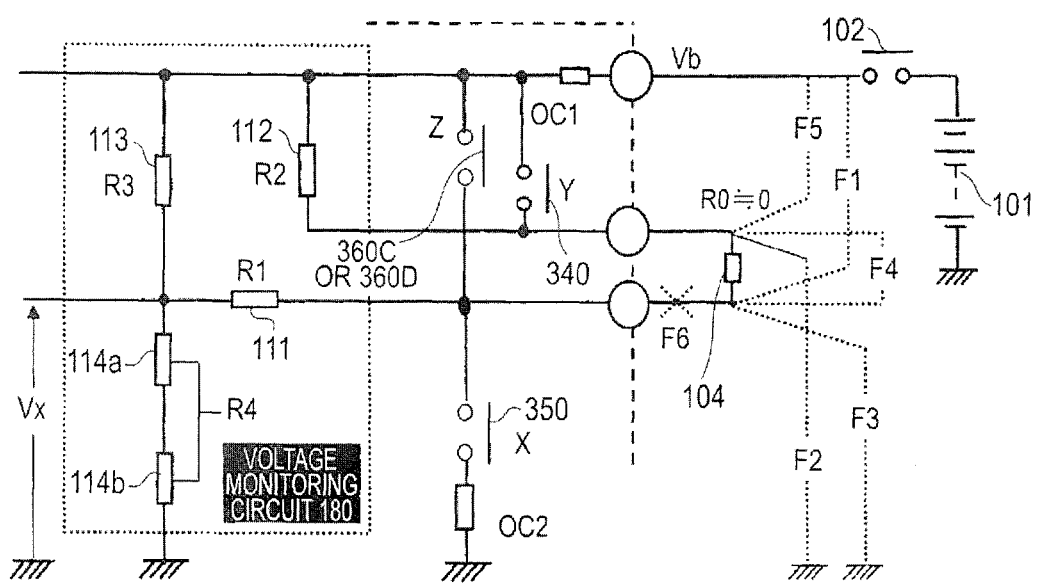
FIG. 17 is a circuit diagram illustrating details of a voltage monitoring circuit of the supply control apparatus of the electric load according to the third embodiment of the invention.

FIG. 17 is a circuit diagram illustrating details of a voltage monitoring circuit of the supply control apparatus of the electric load according to the third embodiment of the invention. In FIG. 17, a contact X corresponds to a schematic diagram in which the upstream side power supply switching element 350 is approximated to a contact circuit, a contact Y corresponds to a schematic diagram in which the downstream side conduction switching element 340 is approximated to a contact circuit, and a contact Z corresponds to a schematic diagram in which the downstream side flywheel switching element 360C is approximated to a contact circuit, but in the case of a fourth embodiment shown in FIG. 21 to be described later, the contact Z corresponds to a schematic diagram in which an upstream side flywheel switching element 360D is approximated to a contact circuit. Further, reference sign OC1 corresponds to a schematic diagram of the upstream current detecting resistance 331, and reference sign OC2 corresponds to a schematic diagram of the downstream current detecting resistance 332, in which a resistance value of each current detecting resistance is a minute resistance value of an ignorable level compared with the resistance value R0 of the electric load 104. Further, the first resistance 111 of the first resistance value R1, the second resistance 112 of the second resistance value R2, the third resistance 113 of the third resistance value R3, and the fourth resistances 114a and 114b of the fourth resistance value R4, which are provided with the voltage monitoring circuit 180, are the same as described in FIG. 3, and the resistance value R0 of the electric load 104 satisfies the relation of "R1, R2, R3, R4>>R0≅0".

Reference sign F1 represents a path of a negative line supply fault where a negative side wiring of the electric load 104 is connected to a positive electrode wiring of the external power source 101, and reference sign F2 represents a path of a positive line ground fault where a positive side wiring of the electric load 104 is connected to a negative electrode wiring of the external power source 101. Reference sign F3 represents a path of a negative line ground fault where a negative side wiring of the electric load 104 is connected to the negative electrode wiring of the external power source 101, and reference sign F4 represents a path of a load short circuit that indicates short circuits of the positive side wiring and the negative side wiring of the electric load 104, or collectively indicates internal short circuits of the electric load. Reference sign F5 represents a path of a positive line ground short circuit where the positive side wiring of the electric load 104 is connected to the positive electrode wiring of the external power source 101, and reference sign F6 represents an example of a portion of load disconnection that indicates disconnection of the positive side wiring or negative side wiring of the electric load 104, or collectively indicates internal disconnection of the electric load 104. Here, an outline of roles of the upstream current detecting resistance 331 and the downstream current detecting resistance 332 will be described as follows. For example, as an upstream abnormality, when the upstream contact shows the short circuit abnormality and when the positive line supply fault F5 occurs, only the second resistance 112 is short-circuited, and thus, the variable divided voltage Vx is not changed, which cannot be identified as it is.

However, in the case of the short circuit abnormality of the upstream contact, the measurement of the load current using the upstream current detecting resistance 131 can be performed, and the value matches with the measured value of the load current using the downstream current detecting resistance 132, whereas in the case of the positive line supply fault F5, the measurement of the load current using the upstream current detecting resistance 131 is not performed, and the value is smaller than the measured value of the load current using the downstream current detecting resistance 132. Thus, both of the cases can be differently identified. Further, as a downstream abnormality, the relation of the short circuit abnormality of the downstream contact and the negative line ground fault F3 is similar to the upstream abnormality, in which the identification can be performed by the magnitude relation of the measured values of the load currents on the upstream side and the downstream side. Further, in the case of the load short circuit F4, it is determined that the upstream overcurrent detection signal OC1 and the downstream overcurrent detection signal OC2 are generated as the measured values of the load currents on the upstream side and the downstream side are excessively large.

Next, referring to FIG. 18 that illustrates a list of identification determination corresponding to occurrence of various abnormalities in FIG. 15 and FIG. 16 will be described with reference to different points from the case of FIG. 5. Namely, FIG. 18 illustrates a list of identification determination corresponding to occurrence of various abnormalities in the power supply control apparatus of the electric load according to the third embodiment of the invention. The calculation example of the voltage ratio G in the voltage monitoring circuit 180 shown in FIG. 17 is as described above in FIG. 4. A first difference between FIG. 5 and FIG. 18 is in that in the case of FIG. 5, the upstream overcurrent detection signal LAN1 and the downstream overcurrent detection signal LAN2 are used for identifying which side of the upstream and downstream the overcurrent is generated on, when the synthetic overcurrent detection signal OCM is generated, but in the case of FIG. 18, since the upstream overcurrent detection signal OC1 and the downstream overcurrent detection signal OC2 are separately input to the control circuit unit 320C, it is not necessary to read and store the generated overcurrent, and thus, it is possible to forcibly cut off the power supply command signal DR0 and the conduction command signal DR1 using hardware through the gate electrodes 335C and 336C immediately after the overcurrent is generated. Accordingly, in the comparison of FIGS. 5 and 18, the generation of the upstream overcurrent detection signal LAN1 or the downstream overcurrent detection signal LAN2 may be replaced by the upstream overcurrent detection signal OC1 or the downstream overcurrent detection signal OC2.

A second difference between FIG. 5 and FIG. 18 is in that in the case of FIG. 5, the upstream side power supply switching element 150, the downstream side conduction switching element 140, the downstream side flywheel switching element 160A are used, but in the case of FIG. 18, the downstream side power supply switching element 350, the upstream side conduction switching element 340, and the upstream side flywheel switching element 360C are used. Thus, the value of the variable divided voltage Vx obtained by the voltage monitoring circuit 180 is a value that is reversed on the upstream side and the downstream side. Accordingly, for example, in FIG. 5, the X short circuit is the upstream element short circuit and the Y short circuit is the downstream element short circuit, but in FIG. 18, the X short circuit is replaced by the downstream element short circuit and the Y short circuit is replaced by the upstream element short circuit, and thus, the influence on the voltage detecting circuit is the same. A third differences between FIG. 5 and FIG. 18 is in that in the case of FIG. 5, the presence or absence of the positive line supply fault or the short circuit of the upstream power supply switching element X being in the parallel relation therewith is determined in the second period T2, but in the case of FIG. 18, the presence or absence of the negative line ground fault or the short circuit of the downstream side power supply switching element 350 being in the parallel relation therewith is determined in the first period T1.

The reason is as follows. In the case of the first embodiment, in the second period T2 when the downstream side flywheel switching element 160A is normally close-circuited, if it is detected that the overcurrent abnormality occurs as the short circuit abnormality or the positive line supply fault occurs in the upstream switching element that should be open-circuited, by forcibly open-circuiting the downstream side flywheel switching element 160A, the overcurrent abnormality can be released. On the other hand, in the case of the third embodiment, when the short circuit abnormality or the negative line ground fault occurs in the downstream switching element, the upstream side flywheel switching element 360C is automatically open-circuited, and thus, the overcurrent abnormality does not occur. Here, if the short circuit abnormality occurs in the upstream side flywheel switching element 360C, the overcurrent abnormality occurs, which causes a double-abnormality mode of the short circuit abnormality or the negative line ground fault of the downstream switching element and the short circuit abnormality of the upstream switching element. Such short circuit abnormalities cannot be released by any switching element in any case of the first embodiment and the third embodiment.

A fourth difference between FIG. 5 and FIG. 18 is in that in the case of FIG. 18, a section of an upstream and downstream short circuit abnormality is added at the lowest end, but in the case of FIG. 5, this is not shown. Here, in the case of FIG. 5 or 12, similar to FIG. 18, the section of the upstream and downstream short circuit abnormality may be added. It is determined that the upstream and downstream short circuit abnormality that is not the overcurrent abnormality occurs when the power supply command signal DR0 and the conduction command signal DR1 are released and the upstream switching element and the downstream switching element are in the open circuit command state, and when one or both of the upstream current detection signal AN1 and the downstream current detection signal AN2 detect a predetermined load current. That is, it can be determined that the upstream and downstream short circuit abnormality occurs when an upstream abnormality due to the short circuit abnormality of the upstream switching element or the positive line supply fault abnormality and a downstream abnormality due to the short circuit abnormality of the downstream switching element or the negative line ground fault abnormality occur at the same time, and when the power supply control apparatus 100C is related to this state. In other words, even though the positive line supply fault abnormality and the negative line ground fault abnormality occur at the same time, a predetermine load current flows in the electric load 104, but in this state, since the upstream current detection signal AN1 or the downstream current detection signal AN2 does not perform the current detection, it is not possible to detect the upstream and downstream short circuit abnormality.

Figure 19:
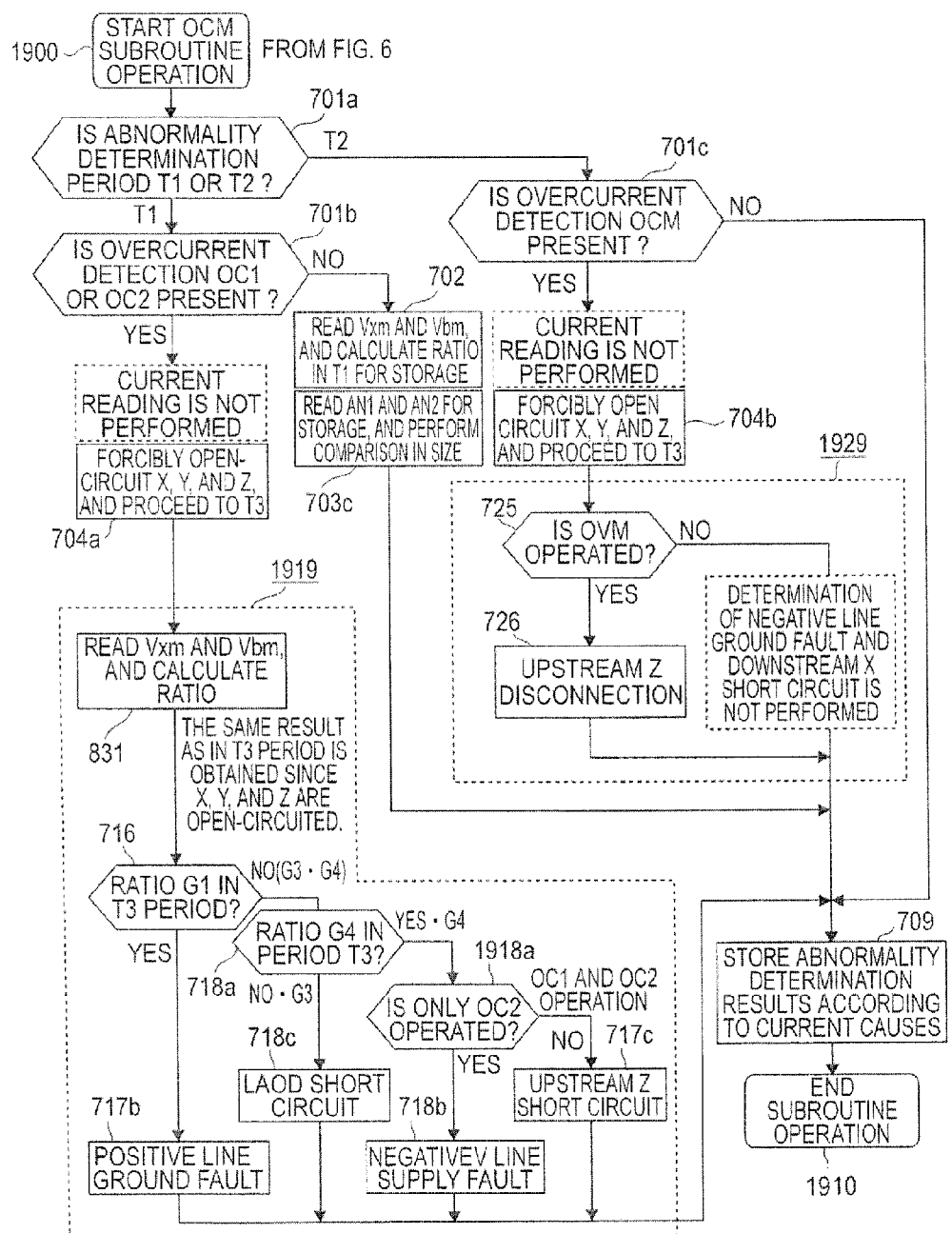
FIG. 19 is a flowchart illustrating an operation of an over-current monitoring subroutine of the power supply control apparatus of the electric load according to the third embodiment of the invention.
Figure 20:
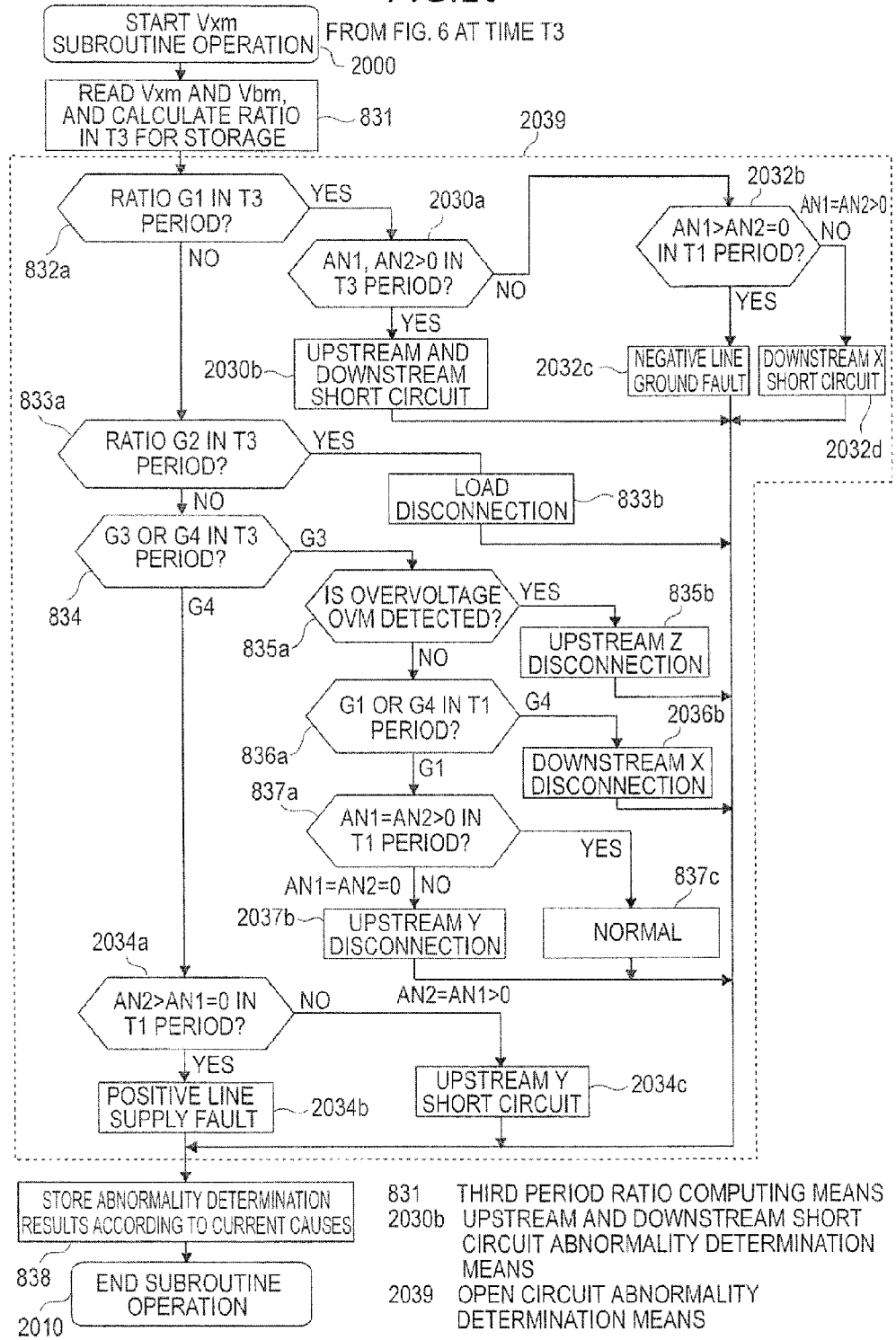
FIG. 20 is a flowchart illustrating an operation of a voltage monitoring subroutine of the power supply control apparatus of the electric load according to the third embodiment of the invention.

FIG. 19 is a flowchart illustrating an operation of an overcurrent monitoring subroutine of the power supply control apparatus of the electric load according to the third embodiment of the invention, which shows details of step block 604a in FIG. 6. FIG. 20 is a flowchart illustrating an operation of a voltage monitoring subroutine of the power supply control apparatus of the electric load according to the third embodiment of the invention, which shows details of step block 604c in FIG. 6. Hereinafter, different points from FIG. 7 and FIG. 8 will be mainly described. The same reference signs in FIGS. 7 and 8 and FIGS. 19 and 20 represent the same or equivalent portions, and the description of the same or equivalent portions will not be repeated. Further, steps 703a and 703b, and steps 727a, 727b and 727c in FIG. 7 are deleted in FIG. 19, and steps 2032b, 2032c, and 2032d are added in FIG. 20, compared with FIG. 8. In FIG. 19, step 1900 corresponds to a start step of a subroutine program that starts the operation when the determination in step 603 in FIG. 6 is NO. Corresponding to the close circuit abnormality determination means 719 in FIG. 7, in close circuit abnormality determination means 1919 shown in FIG. 19, step 1918a instead of step 717a is applied and a determination route is also changed. This is because the upstream overcurrent detection signal OC1 or the downstream overcurrent detection signal OC2 is applied, instead of the upstream overcurrent detection signal LAN1 or the downstream overcurrent detection signal LAN2, and in addition, whereas the positive line ground fault and the downstream side Z short circuit are in the parallel relation in FIG. 7, but the negative line supply fault and the upstream side Z short circuit are in the parallel relation in FIG. 19.

Corresponding to the disconnection abnormality determination means 729 in FIG. 7, in disconnection abnormality determination means 1929 shown in FIG. 19, steps 727a, 727b, and 727c in FIG. 7 are excluded, and instead, steps 2032b, 2032c, and 2032d in FIG. 20 to be described later are provided. Subsequent to a subroutine operation terminating step 1910, the procedure returns to step 602a in FIG. 6. In FIG. 20, step 2000 is a start step of a subroutine program that starts the operation when the determination in step 604b in FIG. 6 is NO. Corresponding to the open circuit abnormality determination means 839 in FIG. 8, in open circuit abnormality determination means 2039 in FIG. 20, in step 2030a executed when the determination in step 832a is YES, it is determined whether at least one of the upstream current detection storage signal AN1 and the downstream current detection storage signal AN2 detects a predetermined load current in the third period T3. If it is determined that the short circuit overcurrent does not flow (YES in step 2030a), the procedure proceeds to step 2030b, and if it is determined that the load current does not flow (NO in step 2030a), the procedure proceeds to step 2032b.

In step 2030b, the upstream and downstream short circuit abnormality occurrence is stored, and then, the procedure proceeds to step 838. Step 2032b is applied to a case where the size determination of the upstream current detection storage signal AN1 and the downstream current detection storage signal AN2 is performed in step 703c in FIG. 19. If "AN1>AN2=0" in the first period T1 (YES in step 703c), the procedure proceeds to step 2032c, and if "AN1=AN2>0" (NO in step 703c), the procedure proceeds to step 2032d. In step 2032c, the negative line ground fault abnormality is stored, and in step 2032d, the short circuit of the downstream side power supply switching element 350 is stored. Then, the procedure proceeds to step 838.

When the size determination of the upstream current detection storage signal AN1 and the downstream current detection storage signal AN2 is not performed in step 703c in FIG. 19, the determination of G1 is performed in step 832a, and thus, the negative line ground fault abnormality or the short circuit abnormality of the downstream side power supply switching element 350 is stored, and then, the procedure proceeds to step 838. Further, the downstream side abnormality due to the negative line ground fault and the downstream side Y short circuit determined in steps 832b, 832c, and 832d in FIG. 8 is replaced by the upstream side abnormality due to the positive line supply fault and the upstream side Y short circuit in steps 2034a, 2034b, and 2034c in FIG. 20. Further, step 2036b in FIG. 20 represents the downstream side X disconnection, and step 836b in FIG. 8 corresponding to step 2036b represents the downstream side Y disconnection, both of which similarly represent the downstream side disconnection. Similarly, step 2037b in FIG. 20 represents the upstream side Y disconnection, and step 837b in FIG. 8 corresponding to step 2037b represents the upstream side X disconnection, both of which similarly represent the upstream side disconnection. Subsequent to the subroutine operation terminating step 2010, the procedure proceeds to step 605a in FIG. 6.

(3) Main Point and Characteristic of the Third Embodiment

In relation to the invention disclosed in claim 1 of the present application, there is provided the power supply control apparatus 100C in which the upstream side switching element 340 and the downstream side switching element 350 are serially connected at the upstream position and the downstream position of the electric load 104 supplied with the load current from the external power source 101, and the conduction state of the upstream side switching element 340 and the downstream side switching element 350 is controlled by the control circuit unit 320C using the microprocessor as a main component, and even though one switching element of the upstream side switching element and the downstream side switching element is abnormally short-circuited, the power supply is stopped by the other switching element. Here, the power supply control apparatus 100C includes the upstream overcurrent determination storage circuit 337a that generates the upstream overcurrent detection signal OC1 as the load current flowing in the upstream side switching element 340 exceeds a predetermined value, and the downstream overcurrent downstream storage circuit 337b that generates the downstream overcurrent detection signal OC2 as the load current flowing in the downstream side switching element 350 exceeds the predetermined value. The power supply control apparatus 100C further includes the voltage monitoring circuit 180 that includes the third resistance 113 and the fourth resistances 114a and 114b that divide the power source voltage Vb of the external power source 101, the first resistance 111 that is connected to the connecting portion of the third resistance and the fourth resistance at one end thereof, and the second resistance 112 that connects the other end of the first resistance 111 to the positive wiring of the power source voltage Vb through the electric load 104, in which the other end of the first resistance 111 is connected to the downstream side of the electric load 104. The voltage monitoring circuit 180 generates the variable divided voltage Vx at both ends of the fourth resistances 114a and 114b in response to the open or close circuit state of the upstream side switching element 350 and the open or close circuit state of the upstream side switching element 340.

The control circuit unit 320C measures and monitors the value of the power source voltage detection signal Vbm that is the voltage being in proportion to the power source voltage Vb and the load voltage detection signal Vxm that is the voltage being in proportion to the variable divided voltage Vx to calculate the value of voltage ratio G "G=Vxm/Vbm", and reads and monitors the upstream and downstream overcurrent detection signals OC1 and OC2. The control circuit unit 320C further includes the abnormality determination means 604a and 604c for generating the power supply command signal DR0 for one of the upstream side switching element 340 and the downstream side switching element 350 and the conduction command signal DR1 for the other one thereof, and for detecting the abnormality state of the load wiring for the electric load 104 during operation, based on the combination of the value of the voltage ratio G corresponding to the generation state of the power supply command signal DR0 and the conduction command signal DR1, and the generation state of the upstream and downstream overcurrent detection signal OC1 and OC2, and the abnormality processing means 611a for stopping the generation of the power supply command signal DR0 and the conduction command signal DR1 when the abnormality determination means determines the abnormality state, and for identifying and storing the plural types of abnormality occurrence information. The abnormality state of the load wiring includes plural abnormality states of a state where there is a doubt about the positive line supply fault abnormality in which the upstream positive wiring of the electric load 104 is connected to the positive electrode wiring of the external power source 101, or the positive line ground fault abnormality in which the upstream positive wiring of the electric load 104 is connected to the negative electrode wiring of the external power source 101, a state where there is a doubt about the negative line supply fault abnormality in which the downstream negative wiring of the electric load 104 is connected to the positive electrode wiring of the external power source, or the negative line ground fault abnormality in which the downstream negative wiring of the electric load 104 is connected to the negative electrode wiring of the external power source, and a state where there is a doubt about the load short circuit abnormality or the load disconnection abnormality in which the electric load 104 is short-circuited or disconnected.

In relation to the invention disclosed in claim 2, the downstream side switching element 350 is the power supply element X in which the power supply duty that is the ratio of the on time and the on-off cycle is controlled by the power supply command signal DR0, and the other upstream side switching element 340 that forms the pair with the downstream side switching element 350 is the conduction switching element Y that is continuously conducted or continuously cut off by the conduction command signal DR1. The first constant voltage diode 343 that forms the cutoff voltage limit circuit is connected to the conduction switching element Y, and the upstream side flywheel switching element 360C that is the flywheel switching element Z is connected in parallel with the series circuit of the electric load 104 and the conduction switching element Y. Further, the flywheel switching element Z is open-circuited when the power supply switching element X is close-circuited, and is close-circuited when the power supply switching element X is open-circuited.

As described above, in relation to the invention disclosed in claim 2, one of the upstream switching element and the downstream switching elements is the power supply switching element X in which the power supply duty is controlled, and the other switching element thereof is the conduction switching element Y in which the continuous conduction or continuous cutoff is performed. When the electric load is an inductive load, the cutoff voltage limit circuit is provided in the conduction switching element Y, and the flywheel switching element Z is connected in parallel with the series circuit of the electric load and the conduction switching element Y. Accordingly, similar to the first and second embodiments, when the positive line supply fault abnormality or the short circuit abnormality of the upstream side switching element occurs, without depending on an external cutoff function such as a collective power source relay, it is possible to perform self cutoff of the load current by the downstream side switching element, and when the negative line ground fault abnormality or the short circuit abnormality of the downstream side switching element occurs, it is possible to perform self cutoff of the load current by the upstream side switching element. Further, in the normal operation, it is possible to divide the functions so that the power supply state is controlled by one switching element and the response delay of the current cutoff due to the inductance component included in the electric load is suppressed by the other switching element. Further, the flywheel switching element can suppress a voltage drop of the commutation circuit compared with a commutation diode, and can suppress power consumption generated in the commutation circuit and heat generation of the circuit element.

In relation to the invention disclosed in claim 4, the pair of the upstream side switching element 340 and the downstream side switching element 350 is the P-channel field effect transistor and the N-channel field effect transistor, and the flywheel switching element 360C is the N-channel field effect transistor that is the same type as that of the power supply switching element 350 that is the downstream side switching element. The power supply switching element 350 and the flywheel switching element 360C are switch-controlled through the flywheel control circuit 370C that includes the interlock circuit for inhibiting a simultaneous close circuit. The flywheel control circuit 370C includes the cutoff transistor 366 that causes the short circuit between the gate terminal G and the source terminal S of the flywheel switching element 360C when the power supply switching element 350 is close-circuited to set the flywheel switching element 360C to a non-conduction state, the capacitor 364 that is charged through the charging diode 363, and the driving resistance 365 that open-circuits the cutoff transistor 366 when the power supply switching element 350 is open-circuited and applies the charged voltage of the capacitor 364 between the gate terminal G and the source terminal S of the flywheel switching element 360C. When the power supply switching element 350 is open-circuited, the flywheel switching element 360C is conducted and driven in the same direction as the conduction direction of the parasitic diode 361C generated between the source terminal S and the drain terminal D.

As described above, in relation to the invention disclosed in claim 4, the power supply switching element X and the flywheel switching element Z are controlled by the flywheel control circuit. When the power supply switching element is close-circuited, the flywheel switching element is open-circuited to charge the capacitor, and when the power supply switching element is open-circuited, the flywheel switching element is close-circuited by the charged electric charges of the capacitor. Further, the flywheel switching element is connected to have the polarity so that the open circuit conduction direction of the flywheel switching element is the same direction as the conduction direction of the parasitic diode in the flywheel switching element. Accordingly, in the case of the embodiment in which the power supply switching element X is the downstream side switching element, when the flywheel switching element Z is close-circuited and the negative line ground fault abnormality of the electric load occurs in the period when the power supply switching element X is open-circuited, the commutation circuit element is open-circuited by the cutoff transistor that is the interlock circuit, and the flywheel switching element is not conducted in the reverse direction to the conduction direction of the parasitic diode provided therein, and thus, it is possible to prevent the power source short circuit state from occurring due to the simultaneous occurrence the short circuit of the power supply switching element or the short circuit of the external wiring instead thereof, and the conduction of the flywheel switching element.

Further, the power source for close-circuiting and driving the flywheel switching element in the commutation period uses the capacitor charged when the power supply switching element is open-circuited. The capacitor is used in a light load only for applying the gate voltage to the field effect transistor in the short period when the current of the inductive load is attenuated, and thus, it is possible to form a small and cheap flywheel control circuit using a capacitor of a small capacity. Further, compared with a case where a general diode or a general parasitic diode is used as the commutation diode, the voltage drop of the flywheel switching element in the commutation period is remarkably reduced, and thus, it is possible to remarkably reduce a temperature increase due to heat generation of the flywheel switching element, and to provide a small and cheap power supply control apparatus.

Next, in relation to the invention disclosed in claim 10, the abnormality determination means includes the first abnormality determination means 604*a* and the second abnormality determination means 604*c*. The first abnormality determination means 604*a* includes the close circuit abnormality determination means 1919 or the first period ratio computing means 702 in the first period T1 when the power supply command signal DR0 is given to at least one of the upstream side switching element 340 and the downstream side switching element 350, the conduction command signal DR1 is given to the other thereof, and both of the upstream side switching element 340 and the downstream side switching element 350 are close-circuited and driven, and additionally includes the intermittence abnormality determination means 1929 in the second period T2 when the power supply switching element X to which the power supply command signal DR0 is given intermittently drives the electric load 104, when there is provided the flywheel switching element 360C that is connected in parallel with the electric load 104. In the first period T1, the power supply command signal DR0 and the conduction command signal DR1 continue a close circuit command at least until the abnormality determination using the close circuit determination means 1919 is completed. Here, if the upstream or the downstream overcurrent detection signal OC1 or OC2 is detected, both of the power supply command signal DR0 and the conduction command signal DR1 are changed to an open circuit command, and the period directly proceeds to the third period T3. Further, in the first period T1, if the upstream or downstream overcurrent detection signal OC1 or OC2 is not detected, the voltage ratio G in the first period T1 is calculated for storage by the first period ratio computing means 702.

The second abnormality determination means 604*c* includes the third period ratio computing means 831 in the third period T3 when both of the power supply command signal DR0 and the conduction command signal DR1 are stopped and both of the upstream side switching element and the downstream side switching element are open-circuited, and the open circuit abnormality determination means 2039. In the third period T3, the power supply command signal DR0 and the conduction command signal DR1 continue an open circuit command at least until the abnormality determination using the open circuit abnormality determination means 2039 is completed. Here, the voltage ratio G in the third period T3 is calculated for storage by the third period ratio computing means 831. The close circuit abnormality determination means 1919 determines a generating factor of the overcurrent abnormality in which the upstream or downstream overcurrent detection signal OC1 or OC2 is detected, by the value of the voltage ratio G calculated by the third period ratio computing means 831. The open circuit abnormality determination means 2039 subdivides, for determination, the generating factors of abnormalities other than the overcurrent abnormality that includes the short circuit abnormality of the upstream side switching element 340, the downstream side switching element 350 or the upstream side flywheel switching element 360C based on the combination of the value of the voltage ratio G calculated by the first period ratio computing means 702 and the value of the voltage ratio G calculated by the third period ratio computing means 831.

As described above, in relation to claim 10 of the invention, if the overcurrent abnormality occurs in the first period when the power supply switching element and the conduction switching element are close-circuited and driven, the period directly proceeds to the third period when the power supply switching element and the conduction switching element are open-circuited, the voltage ratio is calculated by the third period ratio computing means, and the voltage ratios in the first period and the third period are calculated by the first period ratio computing means and the third period computing means with respect to abnormalities other than the overcurrent abnormality. Accordingly, similarly to first and second embodiments, the generating factor of the overcurrent abnormality is subdivided for determination by the voltage ratio using the third period ratio computing means, and the generating factors of the abnormalities other than the overcurrent abnormality are subdivided for determination based on the combination of the voltage ratio using the first period ratio computing means and the voltage ratio using the third period ratio computing means.

Further, in relation to the invention disclosed in claim 12, when the load current is excessively large, the upstream overcurrent determination storage circuit 337*a* and the downstream overcurrent determination storage circuit 337*b* generate the upstream overcurrent detection signal OC1 and the downstream overcurrent detection signal OC2, interrupt-input the generated upstream overcurrent detection signal OC1 and downstream overcurrent detection signal OC2 to the control circuit unit 320C, cut off the power supply command signal DR0 and the conduction command signal DR1 through the gate elements 335C and 336C, and forcibly open-circuit at least the power supply switching element 350 and the conduction switching element 340. The control circuit unit 320C recognizes the upstream overcurrent detection signal OC1 and the downstream overcurrent detection signal OC2 to stop the power supply command signal DR0 and the conduction command signal DR1, and identifies whether both of the upstream overcurrent detection signal OC1 and the downstream overcurrent detection signal OC2 are generated, or any one thereof is generated. The control circuit unit 320C identifies and stores the overcurrent abnormality generating factor that is at least one of the positive line ground fault abnormality or the negative line supply fault abnormality of the load wiring, and the load short circuit with reference to the voltage ratio G in the third period T3, identifies and stores the presence or absence of the short circuit abnormality of the power supply switching element X, and identifies and stores the presence or absence of the short circuit abnormality of the flywheel switching element Z when the flywheel switching element Z is provided.

As described above, in relation to the invention disclosed in claim 12, in the first period when the power supply switching element and the conduction switching element are close-circuited and driven or in the second period when the power supply switching element is close-circuited and the conduction switching element and the flywheel switching element are close-circuited and driven, when the overcurrent flows in at least one of the upstream side switching element and the downstream side switching element, the upstream overcurrent detection signal OC1 or the downstream overcurrent detection signal OC2 is generated to cut off and stop the generation of the power supply command signal DR0 and the conduction command signal DR1, and then, the period proceeds to the third period. The control circuit unit identifies and stores the overcurrent abnormality generating factor with reference to the voltage ratios G and H in the third period T3. Accordingly, similar to the second embodiment, even though the load current is cut off according to the detection of the overcurrent, the control circuit unit recognizes the cutoff of the load current, to continue the upstream overcurrent detection signal OC1 and the downstream overcurrent detection signal OC2 as long as the overcurrent determination storage circuit is not reset, and to reliably cut off the overcurrent by the plural interrupt-input signals, thereby making it possible to identify and store the detailed abnormality generating factor. Further, since the upstream side switching element and the downstream side switching element are directly cut off according to the occurrence of the overcurrent abnormality, heat generation of the switching element is suppressed. Even though the power source short circuit state temporarily occurs, it is possible to continue the control operation of the control circuit unit by the power source capacitor provided in the output circuit of the constant voltage power source. Further, by connecting a back discharge prevention diode to the charging circuit of the power source capacitor, it is possible to achieve a design in which the constant voltage power source and the load driving power source are provided as the same system power source.

Further, in relation to the invention disclosed in claim 13, the control circuit unit 320C receives the inputs of the upstream current detection signal AN1 corresponding to the load current flowing in the upstream side switching element 340 and the downstream current detection signal AN2 corresponding to the load current flowing in the downstream side switching element 350. The control circuit unit 320C calculates whether the values of both of the upstream current detection signal AN1 and the downstream current detection signal AN2 are equal to each other, or any one thereof is larger, with reference to the value of the upstream current detection signal AN1 and the value of the downstream current detection signal AN2 in the close circuit abnormality determination means 1919 in the first period T1 and the open circuit abnormality determination means 2039 in the third period T3. Further, the control circuit unit 320C identifies and stores the abnormality generating factor that is any one of the positive line ground fault abnormality or the negative line supply fault abnormality of the load wiring, and the load short circuit abnormality, and identifies and stores, when the power supply switching element X, the conduction switching element Y, and the flywheel switching element Z are provided, the presence or absence of the short circuit abnormality or the disconnection abnormality thereof, and identifies and stores the presence or absence of the disconnection abnormality of the load wiring, based on the combination of the calculation result and the values of the voltage ratios G in the first period T1 and the third period T3.

As described above, in relation to the invention disclosed in claim 13, the control circuit unit receives the inputs of the upstream current detection signal AN1 and the downstream current detection signal AN2. The control circuit unit identifies and stores the abnormality generating factors based on the combination of the values of the voltage ratios G in the first period T1 and the third period T3. Accordingly, similar to the first and second embodiments, it is possible to distinguish between the supply fault abnormality of the positive wiring and the short circuit abnormality of the upstream side switching element, or between the ground fault abnormality of the negative wiring and the short circuit abnormality of the downstream side switching element, according to the presence or absence of the current detection signals, to thereby identify and store the abnormality generating factors in detail. If the control circuit unit receives at least one input of the upstream and downstream current detection signals, the control circuit unit monitors the load current to perform a negative feedback control, or calculates the load resistance at the current temperature from the values of the power source voltage and the load current to control the average driving voltage to obtain a target load current.

Further, in relation to the invention disclosed in claim 16, the second abnormality determination means 604c includes first upstream and downstream short circuit abnormality determination means 2030b. The first upstream and downstream short circuit abnormality determination means 2030b detects the presence or absence of the load current measured on the upstream side or the downstream side of the electric load 104, in the third period T3 when both of the power supply command DR0 and the conduction command DR1 are stopped, and determines that an upstream and downstream short circuit abnormality occurs when the value of the detected load current is not an overvoltage that exceeds a predetermined threshold current. When a power source relay, if the upstream and downstream short circuit abnormality is detected, for cutting off the load current is provided outside, the abnormality processing means 611a transmits a command signal for de-energizing the power source relay, and performs at least storage of abnormality information or abnormality notification.

As described above, in relation to the invention disclosed in claim 16, the control circuit unit includes the upstream and downstream short circuit abnormality determination means, and can perform the abnormality notification, the abnormality information storage, and can generate a cutoff command for the external power source relay when the abnormality state occurs as the short circuit abnormality occurs on the upstream side and the downstream side of the electric load and the load current that is smaller than or equal to the predetermined value flows. Accordingly, in a state where both of the power supply command and the conduction command are stopped, the load current idly flows, and thus, it is possible to prevent overheating and burning of the electric load or abnormal discharging of the external power source. Further, when the occurrence of the upstream and downstream short circuit abnormality is detected by monitoring the load current, it is not possible to detect that the positive line supply fault abnormality of the load wiring and the negative line ground fault abnormality occur at the same time, but when at least the power supply control apparatus is related and the short circuit abnormality of the upstream side switching element or the downstream side switching element is one factor of the upstream and downstream short circuit abnormality generating factor, it is impossible to perform the detection by the power supply control apparatus.

In relation to the invention disclosed in claim 17, the control circuit unit 320C includes the double-abnormality determination means 604b for detecting, when an internal double-abnormality in which both of the power supply switching element X and the flywheel switching element Z have the short circuit abnormality occurs, or when an internal and external double-abnormality of a mixture of the positive line ground fault abnormality of the load wiring and the short circuit abnormality of the upstream side switching element 340, a mixture of the negative line supply fault abnormality of the load wiring and the short circuit abnormality of the downstream side switching element 350, a mixture of the short circuit abnormality of the upstream side communication switching element 360C and the negative line ground fault of the load wiring occurs, the double-abnormality. The double-abnormality determination means 604b determines that the double-abnormality occurs as the upstream overcurrent detection signal OC1 or the downstream overcurrent detection signal OC2 is input in the third period T3 when both of the power supply command signal DR0 and conduction command signal DR1 are not operated. When the power source relay for cutting off the load current, if the double-abnormality is detected, is provided outside, the abnormality processing means 611a transmits a command signal for de-generating the power source relay, and performs at least storage of abnormality information or abnormality notification.

As described above, in relation to the invention disclosed in claim 17, the control circuit unit includes the double-abnormality determination means, which detects a state where the overcurrent flows due to the double-abnormality to which at least the power supply control apparatus is related. Accordingly, similar to the first and second embodiments, when a power source cutoff function is provided at an upper stage of the power supply control apparatus, if the double-abnormality occurs, the double-abnormality determination means can notify the result to cut off the power source. Thus, it is possible to prevent the occurrence of overheating and burning of the electric load or abnormal discharging of the external power source. Further, when the power source cutoff function is not provided and only a fuse is provided, it is possible to separate the load power source system from the power source system for the control circuit unit in the power supply control apparatus so that power is supplied through a different fuse, and thus, it is possible to enhance the work efficiency of maintenance and inspection based on the abnormality generation storage information according to the factors.

Fourth Embodiment (1) Detailed Description of Configuration

Figure 21:
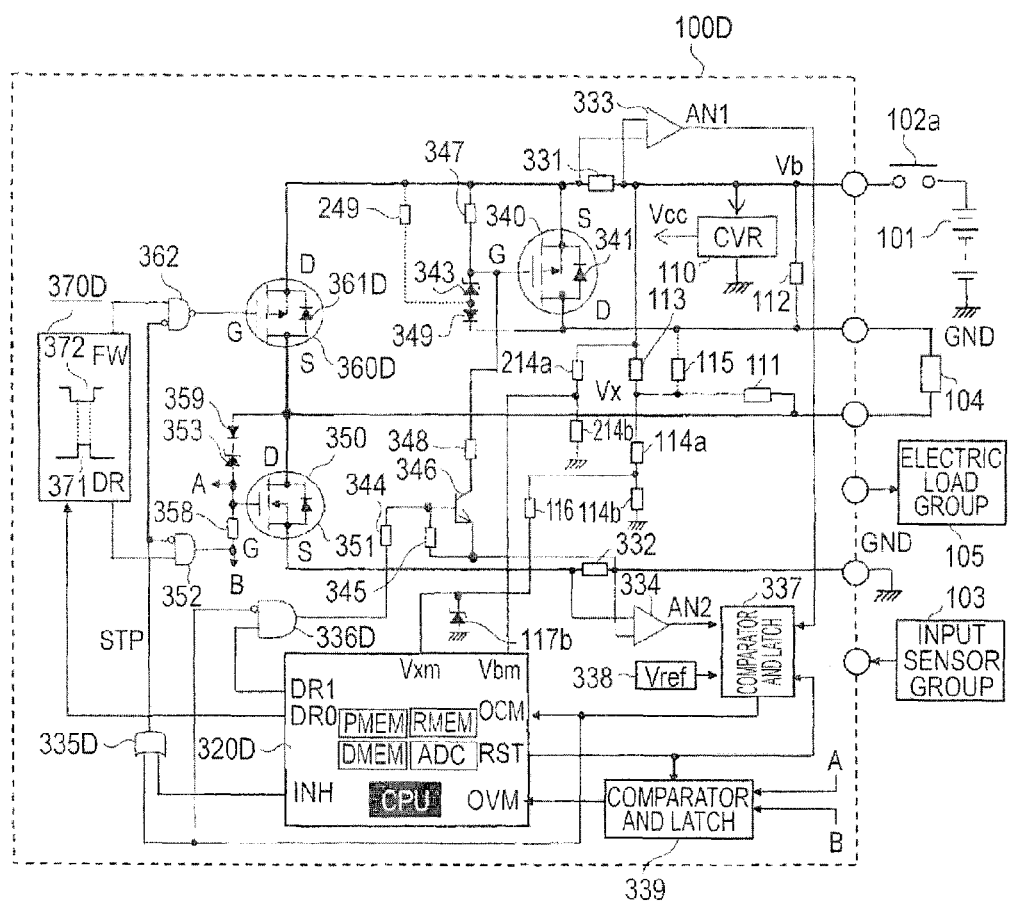
FIG. 21 is an overall circuit diagram of a power supply control apparatus of an electric load according to a fourth embodiment of the invention.

FIG. 21 is an overall circuit diagram of a power supply control apparatus of an electric load according to a fourth embodiment of the invention. Hereinafter, the power supply control apparatus of the electric load according to the fourth embodiment of the invention will be described with reference to FIG. 21. Different points of the configuration of the power supply control apparatus of the electric load according to the fourth embodiment shown in FIG. 21 compared with the configuration of the power supply control apparatus of the electric load according to the first embodiment shown in FIG. 1 will be described in detail. In the respective figures, the same reference signs represent the same or equivalent portions. Main different points compared with the case of the first embodiment shown in FIG. 1 are in that an upstream side conduction switching element 340 is used instead of the downstream side conduction switching element 140, a downstream side power supply switching element 350 is used instead of the upstream side power supply switching element 150, and the upstream side flywheel switching element 360D is used instead of the downstream side flywheel switching element 160A, and thus, the types of the switching elements are changed from the P-channel type to the N-channel type, and from the N-channel type to the P-channel type.

A first main different point from the case in FIG. 15 is that the flywheel switching element in FIG. 15 is returned from the interlock method to the time difference switching method in FIG. 1. A second main different point from the case in FIG. 15 is that an upstream overcurrent determination storage circuit 337a and a downstream overcurrent determination storage circuit 337b in FIG. 15 are returned to the synthetic overcurrent determination storage circuit 337 corresponding to the synthetic overcurrent determination storage circuit 137 in FIG. 1. Further, a common different point between the fourth embodiment and the first to third embodiments is that it is assumed that the upstream and downstream current detection signals AN1 and AN2 are not input to the control circuit unit 320D and alternative means in a compatible range is proposed in the fourth embodiment. Accordingly, although a part of the abnormality generating factors are remained without being subdivided, it is possible to determine that an abnormality due to an abnormality generating factor that is assumed in advance does not occur, and thus, it is possible to specify a normal state.

In FIG. 21, a power supply control apparatus 100D is supplied with the power source voltage Vb from the external power source 101 through the power source switch 102a, is operated in response to an operation state of the input sensor group 103, and includes the control circuit unit 320D that drive-controls the electric load group 105 that includes the electric load 104 as a main component. In the fourth embodiment, the power supply control apparatus 100D includes a load control circuit unit that is supplied with the power source voltage Vb through the power source switch 102a, and the constant voltage power source 110 that is supplied with power through the same power source switch 102a to generate the control voltage Vcc that is a predetermined stabilizing voltage, and is directly supplied with power from the external power source 101 to generate a backup voltage Vup (not shown) that is a predetermined stabilizing voltage. The control circuit unit 320D operated by the control voltage Vcc includes a program memory PMEM that cooperates with a microprocessor CPU, a volatile RAM memory RMEM, a nonvolatile data memory DMEM, and a multi-channel AD converter ADC, in which storage content of the RAM memory RMEM is blackout-held by the backup voltage Vup (not shown) even though the power source switch 102a is open-circuited.

The downstream side flywheel switching element 350 that is serially connected at the downstream position of the electric load 104 is an N-channel field effect transistor, which may be referred to as the downstream side switching element 350 or the power supply switching element 350. The upstream side conduction switching element 340 that is serially connected at the upstream position of the electric load 104 is a P-channel field effect transistor, which may be referred to as the upstream side switching element 340 or the conduction switching element 340. At the upstream position of the downstream side power supply switching element 350, the upstream side flywheel switching element 360D connected in parallel with the series circuit of the electric load 104 and the upstream side conduction switching element 340 uses the P-channel field effect transistor having the reversed type as that of the downstream side power supply switching element 350.

At a further upstream position of a parallel connecting point of the upstream side conduction switching element 340 and the upstream side flywheel switching element 360D, the upstream current detecting resistance 331 is provided. A voltage between both ends of the upstream current detecting resistance 331 is amplified by the upstream current detecting circuit 333 that is a differential amplifier circuit, and then, is input to the synthetic overcurrent determination storage circuit 337. The downstream current detecting resistance 332 is provided at the downstream position of the downstream side power supply switching element 350. A voltage between both ends of the downstream current detecting resistance 332 is amplified by the downstream current detecting circuit 334 that is a differential amplifier circuit, and then, is input to the synthetic overcurrent determination storage circuit 337. The synthetic overcurrent determination storage circuit 337 individually compares the value of the comparison reference voltage Vref generated by the reference voltage generation circuit 338 with the value of the upstream current detection signal AN1 or the value of the downstream current detection signal AN2. If the value of the current detection signal exceeds a predetermined threshold current, the synthetic overcurrent determination storage circuit 337 generates the synthetic overcurrent detection signal OCM and inputs the generated synthetic overcurrent detection signal OCM to the control circuit unit 320D. The control circuit unit 320D stores the overcurrent abnormality occurrence, stops the generation of the power supply command signal DR0 and the conduction command signal DR1, and generates the reset pulse RST to reset the synthetic overcurrent detection storage circuit 337.

The upstream side conduction switching element 340 that is conducted and driven through the driving transistor 346 and the driving resistance 348 when an output logic level of a gate element 336D is "H" has a configuration as described in FIG. 15. When the control circuit unit 320D generates the conduction command signal DR1 (logic level "H") and the synthetic overcurrent determination storage circuit 337 does not generate the synthetic overcurrent detection signal OCM (logic level "L"), the output logic level of the gate element 336D becomes "H". When the control circuit unit 320D generates the power supply command signal DR0 (logic level "H"), a flywheel control circuit 370D first open-circuits the upstream side flywheel switching element 360D first setting a commutation command signal FW indicated as a waveform 372 to the logic level "L", and then, close-circuits the downstream side power supply switching element 350 by setting the power supply driving command signal DR indicated as a waveform 371 to the logic level "H". When the control circuit unit 320D stops the power supply command signal DR0 (logic level "L"), the flywheel control circuit 370D first open-circuits the downstream side power supply switching element 350 by setting the power supply driving signal DR to the logic level "L", and then, close-circuits the upstream side flywheel switching element 360D by setting the commutation command signal FW to the logic level "H". Thus, it is possible to generate the commutation command signal FW and the power supply driving signal DR at the timing when the upstream side flywheel switching element 360D and the downstream side power supply switching element 350 are not close-circuited at the same time.

A gate element 335D generates an overall open circuit command signal STP in which the logic level is "H" when the power supply switching element 350 and the flywheel switching element 360D are open-circuited by an OR output of the synthetic overcurrent detection signal OCM and the output inhibition signal INH generated by the control circuit unit 320D. The gate circuit 352 conducts and drives the downstream side power supply switching element 350 through the driving resistance 358 by being set to the output logic level of "H" when the logic level of the power supply driving signal DR is "H" and the logic level of the overall open circuit command signal STP is "L". The gate circuit 362 conducts and drives the upstream side flywheel switching element 360D by being set to the output logic level of "L" when the logic level of the commutation command signal FW is "H" and the logic level of the overall open circuit command signal STP is "L".

A series circuit of the diode 359 and the second constant voltage diode 353 is connected between the drain terminal D and the gate G of the downstream side power supply switching element 350, in which if the upstream side flywheel switching element 360D is disconnected when the downstream side power supply switching element 350 is open-circuited, a serge voltage flows in the driving resistance 358 by an inductive serge voltage generated by the electric load 104 to close-circuit the downstream side power supply switching element 350 again. Here, a voltage AB generated between both ends of the driving resistance 358 is input to the overvoltage determination storage circuit 339. The overvoltage determination storage circuit 339 generates the overvoltage detection signal OVM and inputs the generated overvoltage detection signal OVM to the control circuit unit 320D. The control circuit unit 320D stores the occurrence of the abnormality, stops the generation of the power supply command signal DR0 and the conduction command signal DR1, and then, generates the reset pulse RST to reset the overvoltage determination storage circuit 339.

The voltage monitoring circuit 180 is configured in a similar way to the case of the first embodiment, but the load voltage monitoring signal Vxm input to the multi-channel AD converter ADC in the control circuit unit 120B from the first voltage-dividing resistances 114a and 114b through the input resistance 116 is voltage-limited by the constant voltage diode 117b, instead of the clamp diode 117a in FIG. 1.

(2) Detailed Description of Operation

Next, an operation of the power supply control apparatus of the electric load in FIG. 21 according to the fourth embodiment of the invention will be described in detail with reference to different points from the cases in FIG. 1 and FIG. 15. First, in FIG. 21, if the power source switch 102a is close-circuited and the control circuit unit 320D starts the operation, the microprocessor CPU drive-controls the electric load group 105 in response to the operation state of the input sensor group 103 and the content of the program memory PMEM, and generates the power supply command signal DR0 and the conduction command signal DR1 with respect to the electric load 104 that is one of plural electric loads in the electric load group 105. Command timings and operations of the respective units are shown in a time chart of FIG. 2 for illustrating the operation, and the description thereof will not be repeated. Further, a detailed circuit diagram of the voltage monitoring circuit in the fourth embodiment is the same as in FIG. 17, and the description thereof will not be repeated.

Next, different points from FIG. 5 will be described in detail with reference to FIG. 22 that is a diagram illustrating a list of identification determination corresponding to occurrence of various abnormalities in FIG. 21. The calculation example of the voltage ratio G in the voltage monitoring circuit 180 shown in FIG. 17 is described above in FIG. 4. A first difference between FIG. 5 and FIG. 22 is that in the case of FIG. 5, the upstream overcurrent detection signal LAN1 and the downstream overcurrent detection signal LAN2 are used for identifying which side of the upstream or downstream the overcurrent is generated on, when the synthetic overcurrent detection signal OCM is generated, but in the case of FIG. 22, the upstream overcurrent detection signal AN1 and the downstream overcurrent detection signal AN2 are not input to the control circuit unit 320D.

A second difference between FIG. 5 and FIG. 22 is that in the case of FIG. 5, the upstream side power supply switching element 150, the downstream side conduction switching element 140, the downstream side flywheel switching element 160A are used, but in the case of FIG. 22, the downstream side power supply switching element 350, the upstream side conduction switching element 340, and the upstream side flywheel switching element 360D are used. Thus, the value of the variable divided voltage Vx obtained by the voltage monitoring circuit 180 is a value that is reversed on the upstream side and the downstream side. Accordingly, for example, in FIG. 5, the X short circuit is the upstream element short circuit and the Y short circuit is the downstream element short circuit, but in FIG. 22, the X short circuit is replaced by the downstream element short circuit and the Y short circuit is replaced by the upstream element short circuit, and thus, the influence on the voltage detecting circuit is the same. A third difference between FIG. 5 and FIG. 22 is that in the case of FIG. 22, the fourth period T4 subsequent to the third period T3 is provided, and in the fourth period, in a state where the downstream side switching element is open-circuited, a temporary period when only the upstream side switching element is tentatively close-circuited is provided.

Further, as a determination item of the overcurrent abnormality in the second period T2, the short circuit of the upstream side power supply switching element X connected to the upstream position of the downstream side flywheel switching element Z or the positive line supply fault is shown in the case of FIG. 5, but the short circuit of the downstream side power supply switching element X connected to the downstream position of the upstream side flywheel switching element Z or the negative line ground fault is shown in the case of FIG. 22. Consequently, in the third period T3 in FIG. 5, the determination of the positive line supply fault and the upstream X short circuit is not performed and the determination of the negative line ground fault and the downstream Y short circuit is performed, whereas in the third period T3 in FIG. 22, the determination of the negative line ground fault and the downstream X short circuit is not performed and the determination of the positive line supply fault and the upstream Y short circuit is performed.

Figure 23:
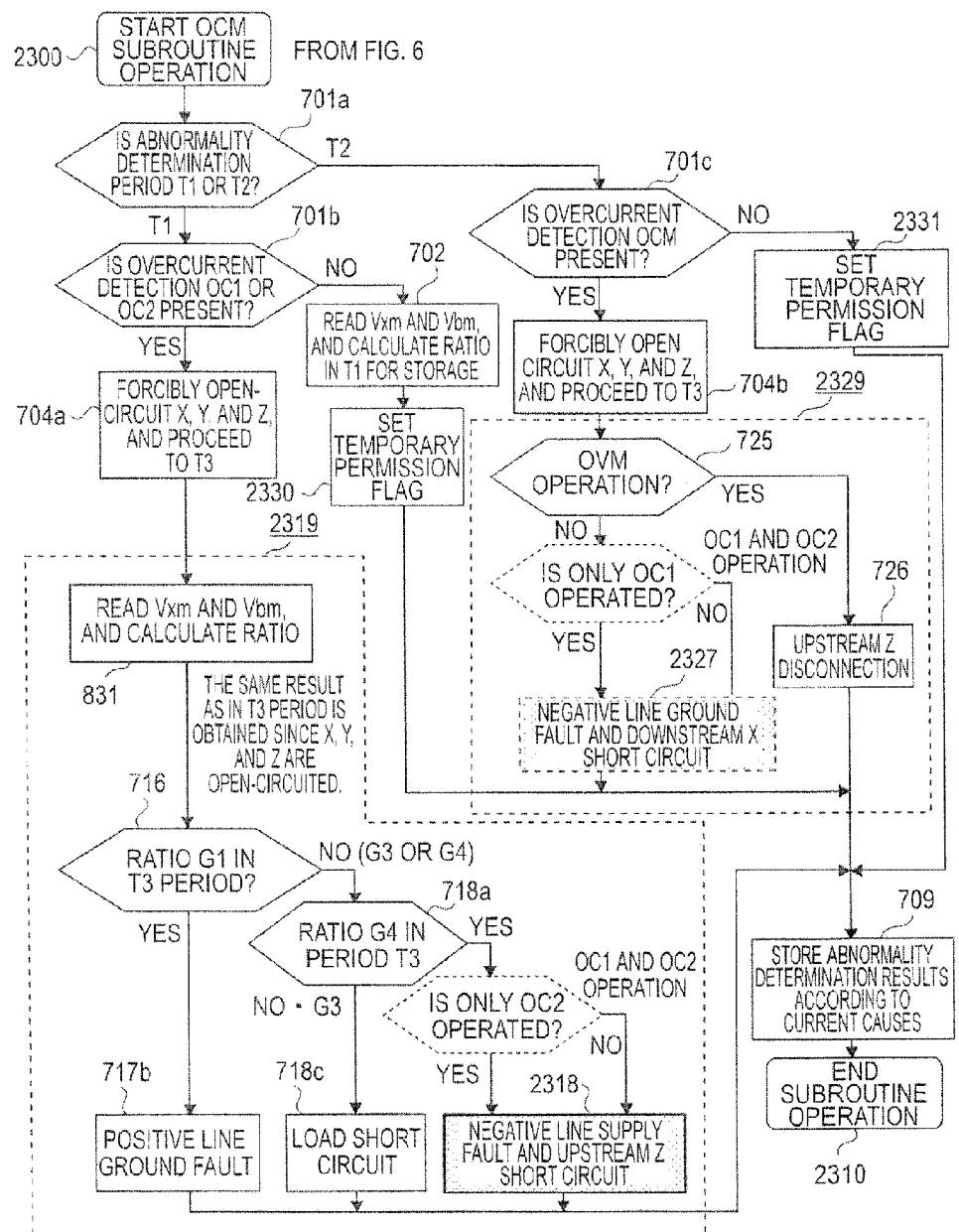
FIG. 23 is a flowchart illustrating an operation of an over-current monitoring subroutine of the power supply control apparatus of the electric load according to the fourth embodiment of the invention.
Figure 24:
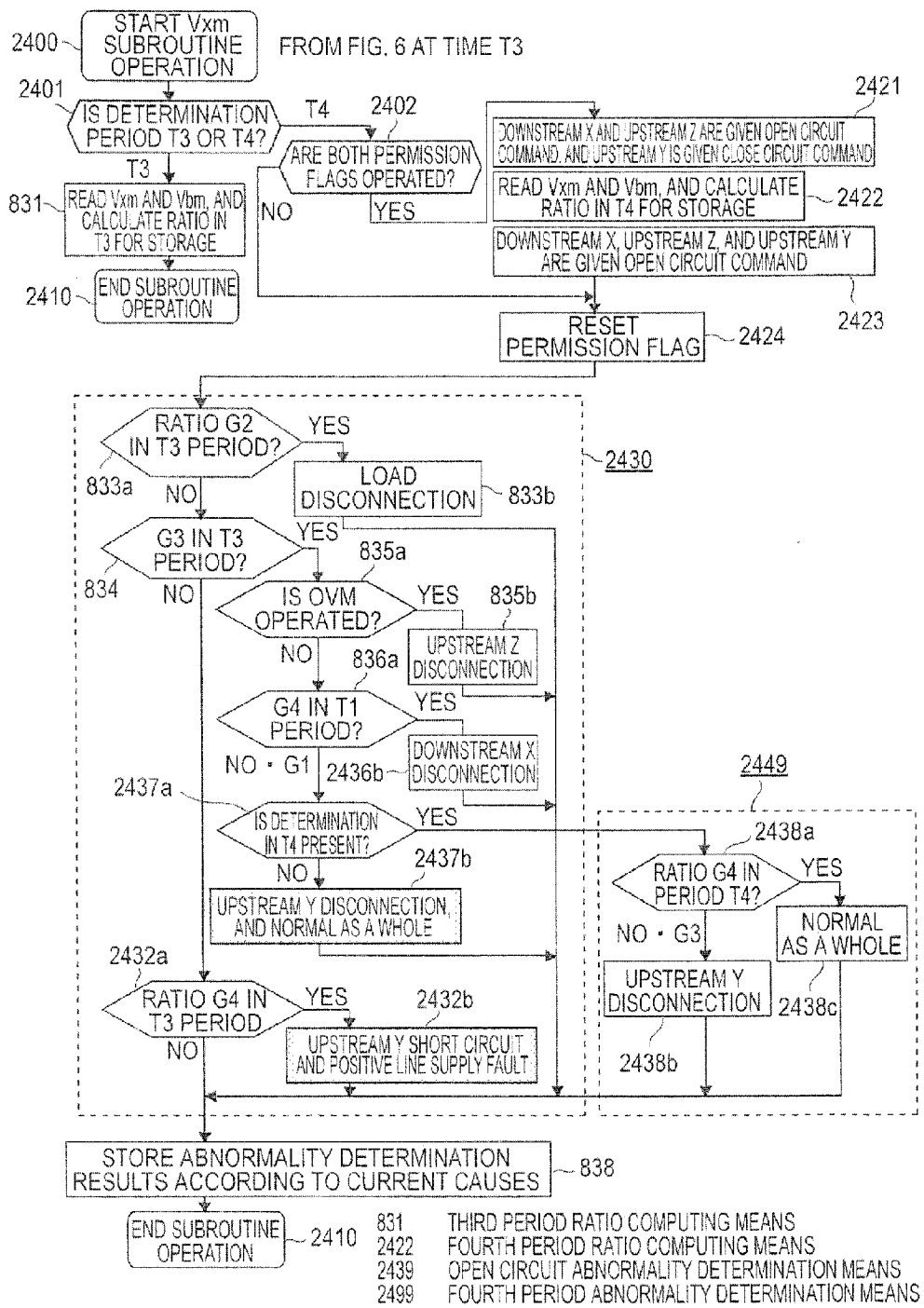
FIG. 24 is a flowchart illustrating an operation of a voltage monitoring subroutine of the power supply control apparatus of the electric load according to the fourth embodiment of the invention.

Next, a case of FIG. 23 illustrating details of step block 604a in FIG. 6 and FIG. 24 illustrating details of step block 604c will be described with reference to different points from the case of FIGS. 7 and 8. Namely, FIG. 23 is a flowchart illustrating an operation of an overcurrent monitoring subroutine of the power supply control apparatus of the electric load according to the fourth embodiment of the invention. FIG. 24 is a flowchart illustrating an operation of a voltage monitoring subroutine of the power supply control apparatus of the electric load according to the fourth embodiment of the invention. The same reference signs in FIGS. 7 and 8 and FIGS. 23 and 24 represent the same or equivalent portions, and the description of the same or equivalent portions will not be repeated. In FIG. 23, step 2300 corresponds to a start step of a subroutine program that starts the operation when the determination in step 603 in FIG. 6 is NO. In step 2330 executed when the determination in step 701b is NO and the overcurrent abnormality does not occur in the first period T1, and in step 2331 executed when the determination in step 701c is NO and the overcurrent abnormality does not occur in the second period T2, a flag for allowing the period to proceed to the fourth period T4 to be described later in FIG. 24 is set, and then, the procedure proceeds to step 709.

Corresponding to the close circuit abnormality determination means 719 in FIG. 7, in close circuit abnormality determination means 2319 shown in FIG. 23, a determination step corresponding to step 717a is deleted, and the determination route is also changed. This is because the upstream overcurrent detection signal LAN1 or the downstream overcurrent detection signal LAN2, and the upstream overcurrent detection signal OC1 or the downstream overcurrent detection signal OC2 are not applied, and in addition, the positive line ground fault and the downstream size Z short circuit are in the parallel relation in FIG. 7, whereas the negative line ground fault and the upstream side Z short circuit are in the parallel relation in FIG. 23. Consequently, in FIG. 23, the negative line supply fault and the upstream side Z short circuit cannot be capable of being separately determined. Corresponding to the disconnection abnormality determination means 729 in FIG. 7, in intermittence abnormality determination means 2329 shown in FIG. 23, step 727a in FIG. 7 is deleted, and merging detection of the negative line ground fault or the downstream X short circuit in step 2327 is performed, instead of individual detection of the positive line supply fault or the upstream X short circuit. Subsequent to a subroutine operation terminating step 2310, the procedure returns to step 602a in FIG. 6.

In FIG. 24, step 2400 is a start step of a subroutine program that starts the operation when the determination in step 604b in FIG. 6 is NO. In the subsequent step 2401, it is determined whether the determination period is the third period T3 or the fourth period T4. If it is determined that the determination period is the third period T3, the procedure proceeds to step 831, and if it is determined that the determination period is the fourth period T4, the procedure proceeds to step 2402. In step 831, the voltage ratio G in the third period T3 is calculated and stored, and then, the procedure proceeds to the subroutine operation terminating step 2410. Subsequent to the subroutine operation terminating step 2010, the procedure returns to step 605a in FIG. 6. In step 2402, it is determined whether a temporary permission flag is set in steps 2330 and 2331 in FIG. 23. If it is determined that the temporary permission flag is set in both of steps 2330 and 2331 (YES in step 2402), the procedure proceeds to step 2421, and if it is determined that the temporary permission flag is not set in both of steps 2330 and 2331, the procedure proceeds to step 2424. In step 2421, the downstream side power supply switching element 350 and the upstream side flywheel switching element 360D are open-circuited, and the upstream side conduction switching element 340 is close-circuited, and then, the procedure proceeds to step 2422.

In step 2422, the voltage ratio G in the fourth period T4 is calculated and stored, and then, the procedure proceeds to step 2423. In step 2423, the upstream side conduction switching element 340 that is close-circuited in step 2421 is open-circuited, and then, the procedure proceeds to step 2424. In step 2424, the temporary permission flag is reset in steps 2330 and 2331 in FIG. 23, and then, the procedure proceeds to step 833a. Corresponding to the open circuit abnormality determination means 839 in FIG. 8, in open circuit abnormality determination means 2439 in FIG. 24, the downstream side abnormality due to the negative line ground fault and the downstream side Y short circuit determined in steps 832a to 832d in FIG. 8 is replaced by the upstream side abnormality due to the merging determination of the positive line supply fault and the upstream side Y short circuit in steps 2432a and 2432b in FIG. 24. Further, step 2436b in FIG. 24 represents the downstream side X disconnection state, and step 836b in FIG. 8 corresponding thereto represents the downstream side Y disconnection state, both of which similarly represent the downstream side disconnection. Further, current determination step 837a where the determination of the upstream X disconnection or the normal state is performed in FIG. 8 is changed to step 2437a relating to the presence or absence of the fourth period T4 in FIG. 24, in which the determination target is the upstream Y disconnection or the normal state.

In step 2437a, if the determination in step 2402 is YES, and when the voltage ratio G in the fourth period T4 is calculated and stored in step 2422, determination of YES is performed, and then, the procedure proceeds to step 2438a. In step 2437a, if the determination in step 2402 is NO, and when the voltage ratio G in the fourth period T4 is not calculated and stored in step 2422, determination of NO is performed, and then, the procedure proceeds to step 2437b. In step 2437b, a state where it is not determined whether the upstream side conduction switching element 340 is disconnected or is in an overall normal state is stored, and then, the procedure proceeds to step 838. In step 2438a, it is determined whether the determination result of the voltage ratio G calculated and stored in step 2422 is the third level G3 or the fourth level G4. If the determination result is the fourth level G4 (YES in step 2438a), the procedure proceeds to step 2438c, and if the determination result is the third level G3 (NO in step 2438a), the procedure proceeds to step 2438b. In step 2438b, the disconnection abnormality of the upstream side conduction switching element 340 is stored, and in step 2438c, the overall normal state as a result of the determination of the overall abnormalities that are set in advance is stored, and then, the procedure proceeds to step 838. Step block 2449 that includes step 2438a, step 2438b and step 2438c forms fourth period abnormality determination means.

(3) Description of Configuration of Modification Example

Figure 25:
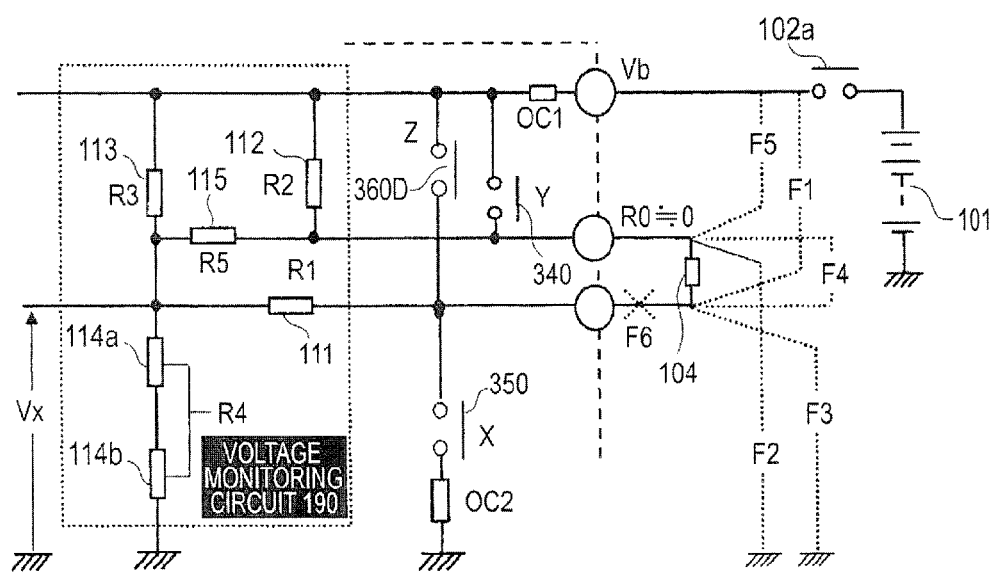
FIG. 25 is a circuit diagram illustrating details of a modification example of the voltage monitoring circuit of the power supply control apparatus of the electric load according to the fourth embodiment of the invention.

FIG. 25 is a circuit diagram illustrating details of a modification example of the supply control apparatus of the electric load according to the fourth embodiment of the invention, which is a detailed circuit diagram of the voltage monitoring circuit 190 according to the modification example of the supply control apparatus of the electric load according to the fourth embodiment of the invention, configured as in FIG. 21. FIG. 26 is a diagram illustrating a calculation example of a voltage ratio H of the voltage monitoring circuit shown in FIG. 25. Hereinafter, different points from the voltage monitoring circuit 180 shown in FIG. 17 will be described with reference to FIGS. 25 and 26. In FIG. 25, a contact X corresponds to a schematic diagram in which the downstream side power supply switching element 350 is approximated to a contact circuit, a contact Y corresponds to a schematic diagram in which the upstream side conduction switching element 340 is approximated to a contact circuit, and a contact Z corresponds to a schematic diagram in which the upstream side flywheel switching element 360D is approximated to a contact circuit. Further, reference sign OC1 corresponds to a schematic diagram of the upstream current detecting resistance 331, and reference sign OC2 corresponds to a schematic diagram of the downstream current detecting resistance 332, in which a resistance value of each current detecting resistance is a minute resistance value of an ignorable level compared with the resistance value R0 of the electric load 104. Further, the first resistance 111 of the first resistance value R1, the second resistance 112 of the second resistance value R2, the third resistance 113 of the third resistance value R3, and the fourth resistances 114a and 114b of the fourth resistance value R4 that form the voltage monitoring circuit 190 are the same as described in FIG. 3, and the resistance value R0 of the electric load 104 satisfies the relation of "R1, R2, R3, R4>>R0≅0".

A fifth resistance 115 added to the voltage monitoring circuit 190 is connected to the connecting portion of the third resistance 113 and the fourth resistances 114a and 114b at one end thereof, and is connected to the upstream terminal of the electric load 104 at the other end thereof. Accordingly, in the normal state of the load wiring and the electric load 104, it is possible to identify whether the upstream contact Y is close-circuited in a state where the downstream contact X is close-circuited. Namely, as shown in the calculation example of the voltage level G in FIG. 4, the downstream close circuit and the upstream close circuit have the first level G1, but the determination level with respect to the downstream close circuit and the upstream open circuit is not present. However, as shown in FIG. 26 to be described later, according to the voltage monitoring circuit 190, the determination is performed by a first level H1 and a second level H2. The abnormality modes of the load wiring from reference sign F1 to reference sign F6 are the same as in the case of FIG. 17.

Next, a calculation example of the voltage ratio H in FIG. 25 will be described with reference to FIG. 26. In FIG. 25, when the resistance value R1 of the first resistance 111, the resistance value R2 of the second resistance 112, the serial synthetic resistance R4 of the fourth resistances 114a and 114b, and the resistance value R of the fifth resistance 115 are all set to 100 kΩ, and the resistance value R3 of the third resistance 113 is set to 220 kΩ, the value of the voltage ratio "H=Vx/Vb" is calculated as follows. FIG. 26A shows a case of a first level where the upstream contact is open-circuited and the downstream contact is close-circuited, in which a voltage ratio of "H1=0.13" is obtained. FIG. 26B shows a case of a second level where the upstream contact and the downstream contact are all close-circuited and the load is disconnected or normal, in which a voltage ratio of "H2=0.42" is obtained. FIG. 26C shows a case of a third level where the upstream contact and the downstream contact are all open-circuited and the load disconnection is present, in which a voltage ratio of "H3=0.49" is obtained. FIG. 26D shows a case of a fourth level where the upstream contact and the downstream contact are all open-circuited, in which a voltage ratio of "H4=0.53" is obtained. FIG. 26E shows a case of a fifth level where the upstream contact is close-circuited and the downstream contact is open-circuited, in which a voltage ratio of "H5=0.71" is obtained.

(4) Detailed Description of Operation of Modification Example

Next, an operation of the power supply control apparatus of the electric load according to the fourth embodiment of the invention in FIGS. 21 and 25 will be described in detail with reference to different points from the case in FIGS. 1 and 15. First, in FIG. 21, if the power source switch 102a is close-circuited and the control circuit unit 320D starts the operation, the microprocessor CPU drive-controls the electric load group 105 in response to the operation state of the input sensor group 103 and the content of the program memory PMEM, and generates the power supply command signal DR0 and the conduction command signal DR1 with respect to the electric load 104 that is one of plural electric loads in the electric load group 105. Command timings and operations of the respective units are shown in a time chart of FIG. 2 for illustrating the operation. Here, the description will not be repeated. Further, a detailed circuit diagram of the voltage monitoring circuit in the fourth embodiment is the same as in FIG. 25, and the description thereof will not be repeated.

Next, in a modification example based on the combination of FIG. 21 and FIG. 25, different points from the case of FIG. 5 will be described with reference to FIG. 27 that illustrates a list of identification determination corresponding to occurrence of various abnormalities. Namely, FIG. 27 is a diagram illustrating a list of identification determination corresponding to occurrence of various abnormalities of the voltage monitoring circuit shown in FIG. 25. In FIG. 27, a first difference between FIG. 5 and FIG. 27 is that in the case of FIG. 5, the voltage ratio G using the voltage monitoring circuit 180 is used, but in the case of FIG. 27, the voltage ratio H using the voltage monitoring circuit 190 is used. A second difference between FIG. 5 and FIG. 27 is that in the case of FIG. 5, the upstream overcurrent detection signal LAN1 and the downstream overcurrent detection signal LAN2 are used for identifying which side of the upstream or downstream the overcurrent is generated on, when the synthetic overcurrent detection signal OCM is generated, but in the case of FIG. 27, the upstream overcurrent detection signal AN1 and the downstream overcurrent detection signal AN2 are not input to the control circuit unit 320D.

A third difference between FIG. 5 and FIG. 27 is in that in the case of FIG. 5, the upstream side power supply switching element 150, the downstream side conduction switching element 140, the downstream side flywheel switching element 160A are used, but in the case of FIG. 27, the downstream side power supply switching element 350, the upstream side conduction switching element 340, and the upstream side flywheel switching element 360D are used. Thus, the value of the variable divided voltage Vx obtained by the voltage monitoring circuit 190 is a value that is reversed on the upstream side and the downstream side. Accordingly, for example, in FIG. 5, the X short circuit is the upstream element short circuit and the Y short circuit is the downstream element short circuit, but in FIG. 27, the X short circuit is replaced by the downstream element short circuit and the Y short circuit is replaced by the upstream element short circuit, and thus, the influence on the voltage detecting circuit is the same. A fourth difference between FIG. 5 and FIG. 27 is in that in the case of FIG. 27, the upstream and downstream short circuit abnormality section is added in the lowest section, but in the case of FIG. 5, the addition is not present.

A difference between FIG. 22 and FIG. 27 is in that in the case of FIG. 22, the fourth period T4 subsequent to the third period T3 is provided to detect the open circuit state of the upstream side switching element, but in the case of FIG. 27, and the voltage monitoring circuit 190 having five determination levels is applied instead of using the fourth period T4. Further, as a determination item of the overcurrent abnormality in the second period T2, the short circuit of the upstream side power supply switching element X connected to the upstream position of the downstream side flywheel switching element Z or the positive line supply fault is shown in the case of FIG. 5, but the short circuit of the downstream side power supply switching element X connected to the downstream position of the upstream side flywheel switching element Z or the negative line ground fault is shown in the case of FIG. 27. Consequently, in the third period T3 in FIG. 5, the determination of the positive line supply fault and the upstream X short circuit is not performed and the determination of the negative line ground fault and the downstream Y short circuit is performed, whereas in the third period T3 in FIG. 27, the determination of the negative line ground fault and the downstream X short circuit is not performed and the determination of the positive line supply fault and the upstream Y short circuit is performed.

Figure 28:
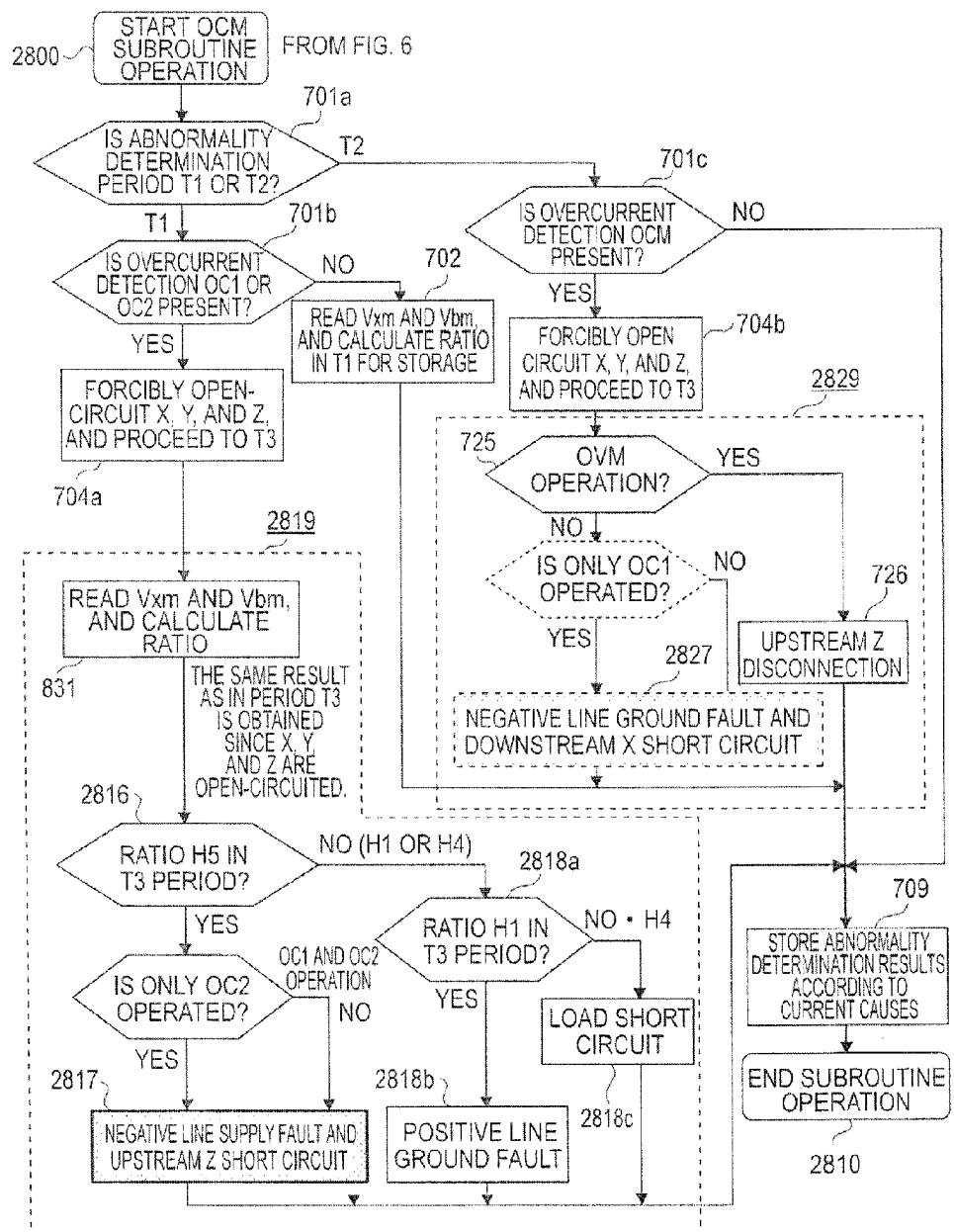
FIG. 28 is a flowchart illustrating an operation of an over-current monitoring subroutine of the voltage monitoring circuit shown in FIG. 25.
Figure 29:
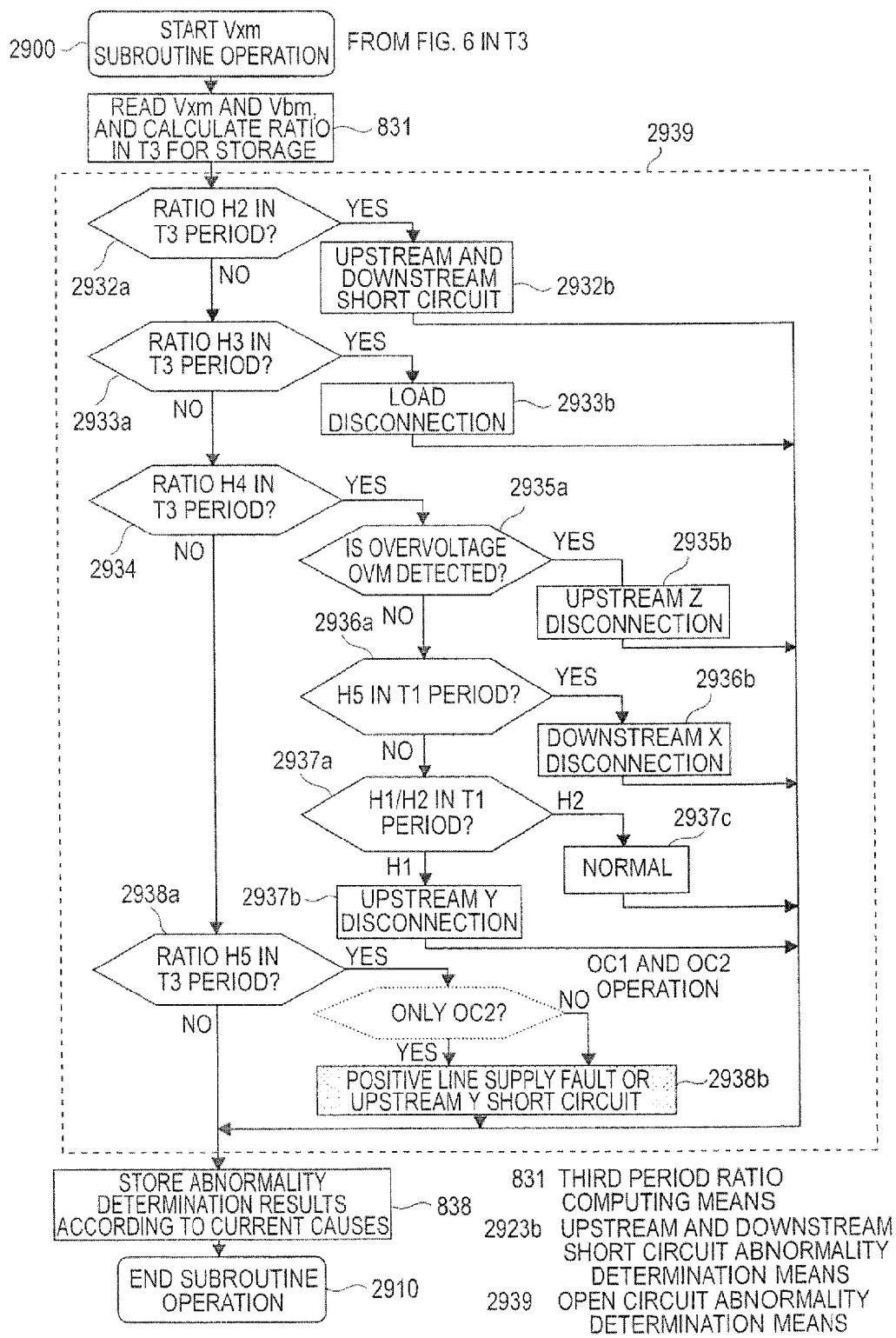
FIG. 29 is a flowchart illustrating an operation of a voltage monitoring subroutine of the voltage monitoring circuit shown in FIG. 25.

FIG. 28 is a flowchart illustrating an operation of an overcurrent monitoring subroutine of the voltage monitoring circuit shown in FIG. 25, which shows details of step block 604a in FIG. 6. FIG. 29 is a flowchart illustrating an operation of a voltage monitoring subroutine of the voltage monitoring circuit shown in FIG. 25, which shows details of step block 604c in FIG. 6. Hereinafter, different points from FIG. 7 and FIG. 8 will be mainly described. The same reference signs in FIGS. 7 and 8 and FIGS. 28 and 29 represent the same or equivalent portions, and the description of the same or equivalent portions will not be repeated. In FIG. 28, step 2800 corresponds to a start step of a subroutine program that starts the operation when the determination in step 603 in FIG. 6 is NO. Corresponding to the close circuit abnormality determination means 719 in FIG. 7, in close circuit abnormality determination means 2819 shown in FIG. 28, the voltage ratio H in the third period T3 is calculated and stored by step 831. If the voltage ratio H is the fifth level H5 in step 2816, the procedure proceeds to step 2817. If the voltage ratio H is the first level H1 or the fourth level H4, the procedure proceeds to step 2818b or step 2818c through determination step 2818a. In step 2817, the occurrence of any abnormality of the negative line supply fault or the short circuit abnormality of the upstream side flywheel switching element 360D is stored, and then, the procedure proceeds to step 709.

In step 2817, since it is not obvious whether the occurrence of the overcurrent abnormality determined in step 701b is on the upstream side of the electric load 104 or on the downstream side thereof, it is not possible to determine and store the abnormality content. The positive line ground fault abnormality occurrence is stored in step 2818b, the load short circuit abnormality occurrence is stored in step 2818c, and then, the procedure proceeds to step 709. Corresponding to the intermittence abnormality determination means 729 in FIG. 7, in intermittence abnormality determination means 2829 shown in FIG. 28, step 727a in FIG. 7 is deleted, and merging detection of the negative line ground fault or the downstream X short circuit in step 2827 is performed, instead of individual detection of the positive line supply fault or the upstream X short circuit. Subsequent to a subroutine operation terminating step 2810, the procedure returns to step 602a in FIG. 6.

In FIG. 29, step 2900 is a start step of a subroutine program that starts the operation when the determination in step 604b in FIG. 6 is NO. Corresponding to open circuit abnormality determination means 839 in FIG. 8, in open circuit abnormality determination means 2939 in FIG. 29, the downstream side abnormality due to the negative line ground fault and the downstream side Y short circuit determined in step 832a to step 832d in FIG. 8 is replaced by the upstream side abnormality due to the merging determination of the positive line supply fault and the upstream side Y short circuit in step 2938b through the determination of whether the voltage ratio H in the third period T3 is H5 in step 2938a in FIG. 29. Further, as additional steps, in step 2932a in FIG. 29, it is determined whether the voltage ratio H in the third period T3 is H2, and in step 2932b, additionally, the occurrence of upstream and downstream short circuit abnormality is stored. The upstream and downstream short circuit abnormality refers to a state where the overcurrent abnormality does not occur but the short circuit abnormality occurs on the upstream side and the downstream side of the electric load 104 when both of the power supply command signal DR0 and the conduction command signal DR1 are released so that both of the upstream switching element and the downstream switching element are in the open circuit command state.

Further, corresponding to steps 833a and 833b in FIG. 8, in step 2933a in FIG. 29, it is determined whether the voltage ratio H in the third period T3 is H3. If the voltage ratio H is H3, the occurrence of the load disconnection abnormality is stored in step 2933b. Steps 834 to 837c when the voltage ratio in the third period T3 in FIG. 8 is G3 are replaced by steps 2934 to 2937c when the voltage ratio in the third period T3 is H4 in FIG. 29. Here, when the overvoltage detection signal OVM is generated in step 2935a in FIG. 29, the disconnection abnormality occurrence of the upstream side flywheel switching element is stored in step 2935b in FIG. 29, but insteps 835a and step 835b in FIG. 8 corresponding thereto, the disconnection abnormality occurrence of the downstream side flywheel switching element is stored. Further, when the voltage ratio in the first period T1 is H5 in step 2936a in FIG.

29, the downstream side X disconnection is stored in step 2936b, but in step 836a and step 836b in FIG. 8 corresponding thereto, the downstream side Y disconnection is stored, both of which similarly represent the downstream side disconnection. Further, in current determination step 837a in FIG. 8, the determination of the upstream X disconnection or the normal state is performed, but in step 2937a in FIG. 29, it is determined whether the voltage ratio H in the first period T1 is H1 or H2, and the determination target is the upstream Y disconnection or the normal state in steps 2937b and 2937c.

FIG. 30 is a diagram illustrating a list of a double-abnormality common to the respective embodiments of the invention. FIG. 30A shows the content of the double-abnormality described in FIGS. 5, 12, and 18 and disclosed in the list of abnormality determinations in FIGS. 22 and 27. The double-abnormality is detected as the synthetic overcurrent detection signal OCM or the upstream and downstream overcurrent detection signals OC1 and OC2 are generated in the third period T3 in which the open circuit command is given to all the switching elements, which is the overcurrent abnormality state that cannot be released by the power supply control apparatus. Here, according to whether both of the upstream and downstream current detection storage signals LAN1 and LAN2 are provided as in the first embodiment, or both of the upstream and downstream overcurrent detection signals OC1 and OC2 are provided as in the second and third embodiments, the overcurrent abnormality may be divided into a first mode where the overcurrent abnormality occurs on both of the upstream side and the downstream side, a third mode and a fourth mode where the overcurrent abnormality is detected only on the upstream side, and a second mode and a fifth mode where the overcurrent abnormality is detected only on the downstream side, to perform the abnormality determination.

However, as described in the fourth embodiment, when only the synthetic overcurrent detection signal OCM is simply used, it is not possible to identify and determine the modes 1 to 5, and it is only detected that the double-abnormality simply occurs. The first mode corresponds to the double-abnormality occurring only inside the power supply control apparatus, but the second mode to the fifth mode correspond to the double-abnormality occurring inside the power supply control apparatus and on the load wiring side. Further, the double-abnormality that is not related to the power supply apparatus and occurs on only the load wiring side cannot be detected by the power supply control apparatus. FIG. 30B shows as a list of the content of the upstream and downstream short circuit abnormality disclosed in the abnormality determination list in FIGS. 18 and 27. The upstream and downstream short circuit abnormality is detected, in the third period T3 when the open circuit command is given to all the switching elements, when the overcurrent detection due to the synthetic overcurrent detection signal OCM or the upstream and downstream overcurrent detection signals OC1 and OC2 is not performed but the predetermined load current flows in the electric load or the upstream side and the downstream side of the electric load are close-circuited. In this case, similarly, the overcurrent abnormality state cannot be released by the power supply control apparatus.

The detection of the upstream and downstream short circuit abnormality can be applied to all the embodiments by detecting the load current on the upstream side and the downstream side or by applying the voltage monitoring circuit 190 instead of the voltage monitoring circuit 180, in which it is possible to identify the occurrence of an internal abnormality shown in a sixth mode and an internal and external abnormality shown in a seventh mode. Here, an eighth mode may be applied to a case where the voltage monitoring circuit 190 is used, but in this case, it is determined that the upstream and downstream short circuit abnormality occurs even in the load disconnection state.

(5) Description of Other Embodiments

Figure 31:
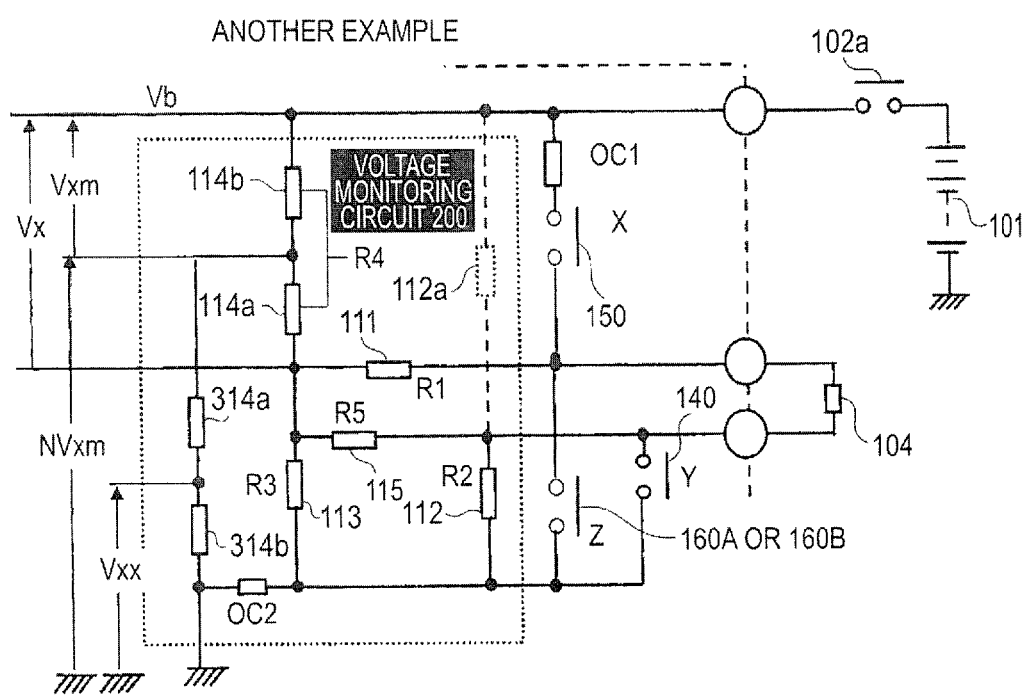
FIG. 31 is a circuit diagram illustrating details of a modification example of the voltage monitoring circuit in the power supply control apparatus of the electric load according to the first and second embodiments of the invention.
Figure 32:
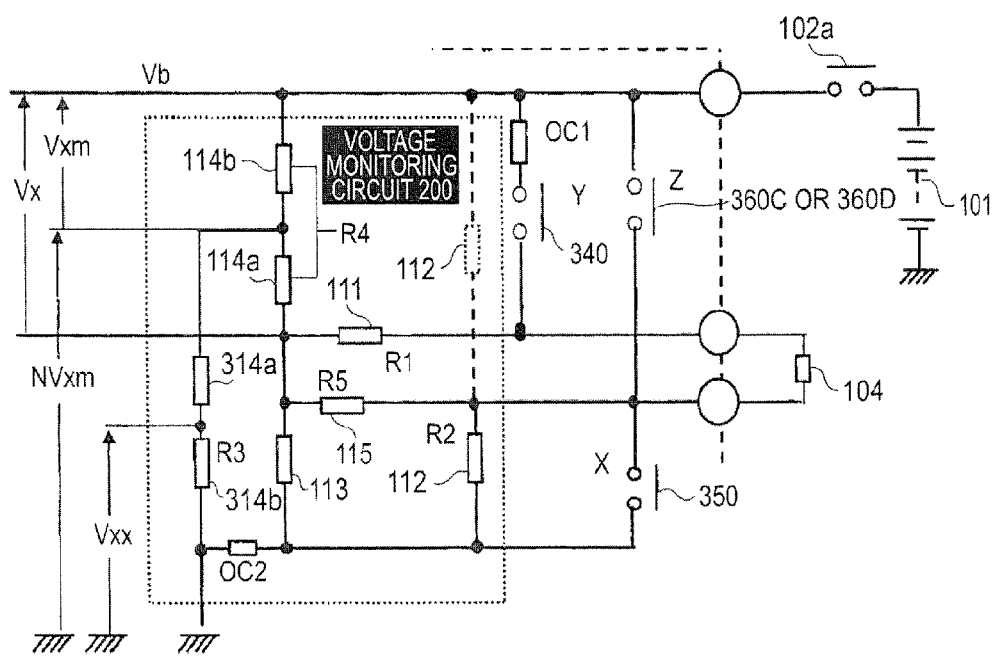
FIG. 32 is a circuit diagram illustrating details of a modification example of the voltage monitoring circuit in the power supply control apparatus of the electric load according to the third and fourth embodiments of the invention.

FIG. 31 is a circuit diagram illustrating details of a modification example of the voltage monitoring circuit in the power supply control apparatus of the electric load according to the first and second embodiments of the invention, and FIG. 32 is a circuit diagram illustrating details of a modification example of the voltage monitoring circuit in the power supply control apparatus of the electric load according to the third and fourth embodiments of the invention. In the following description, different points from the configuration of the voltage monitoring circuit shown in FIG. 25 will be described in detail with reference to FIGS. 31 and 32 for illustrating a detailed circuit diagram of a voltage monitoring circuit 200 capable of being used instead of the voltage monitoring circuit 180 shown in FIGS. 3 and 17 or the voltage monitoring circuit 190 shown in FIG. 25. FIG. 31 illustrates a connection example in a case where the power supply switching element X is connected on the upstream side, but FIG. 32 illustrates a connection example in a case where the power supply switching element X is connected on the downstream side. Further, the voltage monitoring circuit 190 is obtained by adding the fifth resistance 115 to the voltage monitoring circuit 180. The fifth resistance 115 is also added to the voltage monitoring circuit 200. In the voltage monitoring circuit 190 that is a comparison target, as described in FIG. 25, the fifth resistance 115 is connected in parallel with the third resistance 113 on the upstream side when the upstream side switching element is close-circuited, the first resistance 111 is connected in parallel with the fourth resistances 114a and 114b on the downstream side when the downstream side switching element is close-circuited, and the second resistance 112 is connected in parallel with the upstream side switching element, in which the load voltage detection signal Vxm is a voltage generated on both ends of the downstream resistance 114b among the fourth resistances 114a and 114b.

On the other hand, in FIGS. 31 and 32, the third resistance 113 and the fourth resistances 114a and 114b are connected to be inverted on the upstream side and the downstream side, the fifth resistance 115 is connected in parallel with the third resistance 113 on the downstream side when the downstream side switching element is close-circuited, the first resistance 111 is connected in parallel with the fourth resistances 114a and 114b on the upstream side when the upstream side switching element is close-circuited, and the second resistance 112 is connected in parallel with the downstream side switching element, in which the load voltage detection signal Vxm is a voltage generated on both ends of the upstream resistance 114b among the fourth resistances 114a and 114b. Here, the voltage input to the multi-channel AD converter ADC of the control circuit unit is a differential voltage NVxm obtained by subtracting the load voltage detection signal Vxm from the power source voltage Vb. Thus, if Vxm is calculated by subtracting the differential voltage NVxm from the power source voltage Vb, the microprocessor can obtain the voltage ratio "H=Vxm/Vbm", and can calculate the voltage ratios H1 to H5 in a similar way to the case of the voltage monitoring circuit 190. Here, in order to measure the differential voltage NVxm, it is necessary to measure a reduced voltage Vxx using third voltage-dividing resistances 314a and 314b in which the voltage division ratio is set to G0, and to calculate the differential voltage as "NVxm=Vxx/G0".

Here, the function of the second resistance 112 in FIGS. 31 and 32 will be described. When all the switching elements X, Y, and Z are open-circuited, if the electric load 104 is not disconnected, the first resistance 111 and the fifth resistance 115 are connected in parallel to each other, which is pull-down-connected to the negative line of the power source by the second resistance 112. However, if the electric load 104 is disconnected, the other end of the first resistance 111 is released, and thus, the variable divided voltage Vx is changed to a different value, to thereby perform the disconnection detection. Similarly, in a case where the connecting position of the second resistance 112 is changed to a position indicated by a dotted line to form a second resistance 112a, if the electric load 104 is not disconnected, the first resistance 111 and the fifth resistance 115 are connected in parallel to each other, which is pull-up-connected to the positive line of the power source by the second resistance 112a. However, if the electric load 104 is disconnected, the other end of the first resistance 111 is released, and thus, the variable divided voltage Vx is changed to a different value, to thereby perform the disconnection detection. Accordingly, in a case where the first resistance 111 is used as a reference, the first resistance 111, the electric load 104, and the second resistance 112 may be serially connected to be connected to the positive line or the negative line of the power source.

In the above description, one ends of the first resistance 111 and the fifth resistance 115 are connected to the connecting point of the third resistance 113 and the fourth resistances 114a and 114b, but a sixth resistance may be serially connected between the third resistance 113 and the fourth resistances 114a and 114b, in which one end of the first resistance 111 may be connected on the upstream or downstream side of the sixth resistance, and one end of the fifth resistance 115 may be connected on the downstream or the upstream side of the sixth resistance. In this way, the connecting point of the third resistance 113 and the fourth resistances 114a and 114b, to which the one ends of the first resistance 111 and the fifth resistance 115 are connected can be divided into plural connecting points by the sixth resistance. Thus, it is not necessary to provide the common connecting point.

In the above description, the P-channel field effect transistor is used as the upstream side switching element, but instead, when a boosting circuit that generates a gate voltage is used together, the N-channel field effect transistor may be used, which is well known in the related art. Further, the example in which the power supply switching element X performs the duty control in the second period T2 is described, but the second period T2 may be set to a period when the open and close control is arbitrarily performed in response to the operation state of the input sensor, in which the power supply command and the conduction command may be generated together at least in the first period T1, the power supply command may be open and close operated but the conduction command is continuously generated in the second period T2, and both of the power supply command and the conduction command may be released in the third period T3. Further, which one of the power supply switching element and the conduction switching element is connected on the upstream side or the downstream of the electric load is arbitrary as described in the first and second embodiments and the third and fourth embodiments.

Further, in the above-described arbitrary configurations, the overcurrent detection signal may be dividedly detected on the upstream side and the downstream side, or alternatively, may be detected in the merged state. Further, whether to input the current detection signal to the control circuit unit may be applied by an arbitrary combination according to the configuration of the voltage detecting circuit or whether to perform the state detection in the fourth period T4. Further, it is not necessary to completely distinctly determine all the abnormality occurrence modes. That is, with respect to the occurrence of the overcurrent abnormality to which at least the power supply control apparatus is related, if the overcurrent abnormality is the double-abnormality, the load current may be cut off by the power supply control apparatus, and in addition, the plural abnormality occurrence states of the doubt about the positive line supply fault abnormality or the positive line ground fault abnormality of the load wiring, the doubt about the negative line supply fault abnormality or the negative line ground fault abnormality thereof, or the doubt about the load short circuit abnormality or the load disconnection abnormality may be identified and detected.

(6) Main Point and Characteristic of the Fourth Embodiment

In relation to the invention disclosed in claim 1, there is provided the power supply control apparatus 100D in which the upstream side switching element 340 and the downstream side switching element 350 are serially connected at the upstream position and the downstream position of the electric load 104 supplied with the load current from the external power source 101, and the conduction state of the upstream side switching element 340 and the downstream side switching element 350 is controlled by the control circuit unit 320D using the microprocessor as a main component, and even though one switching element of the upstream side switching element and the downstream side switching element is abnormally short-circuited, the power supply is stopped by the other switching element. Here, the power supply control apparatus 100D includes the synthetic overcurrent determination storage circuit 337 that generates the synthetic overcurrent detection signal OCM when any one of the upstream overcurrent for the upstream side switching element 340 or the downstream overcurrent for the downstream side switching element 350. The power supply control apparatus 100D further includes the voltage monitoring circuit 180, 190, or 200 that includes the third resistance 113 and the fourth resistances 114a and 114b that divide the power source voltage Vb of the external power source 101, and the second resistance 112 that connects at least one of the first resistance 111 that is connected to the connecting portion of the third resistance and the fourth resistances at one end thereof and the fifth resistance 115, and the other end of at least one of the first resistance 111 and the fifth resistance 115 to the positive line or the negative line of the power source voltage Vb through the electric load 104, in which the other end of the first resistance 111 is connected on one of the upstream side and the downstream side of the electric load 104, and the other end of the fifth resistance 115 is connected on the other one of the upstream side and the downstream side of the electric load 104. The voltage monitoring circuits 180, 190, and 200 generate the variable divided voltage Vx at both ends of the fourth resistances 114a and 114b in response to the open or close circuit state of the upstream side switching element 340 and the open or close circuit state of the downstream side switching element 350.

The control circuit unit 320D measures and monitors the value of the power source voltage detection signal Vbm that is the voltage being in proportion to the power source voltage Vb and the load voltage detection signal Vxm that is the voltage being in proportion to the variable divided voltage Vx to calculate the values of voltage ratios G and H "G, H=Vxm/Vbm", and reads and monitors the synthetic overcurrent detection signal OCM. The control circuit unit 320D further includes the abnormality determination means 604a and 604c for generating the power supply command signal DR0 for one of the upstream side switching element 340 and the downstream side switching element 350 and the conduction command signal DR1 for the other one thereof, and for detecting the abnormality state of the load wiring for the electric load 104 during operation, based on the combination of the values of the voltage ratios G and H corresponding to the generation state of the power supply command signal DR0 and the conduction command signal DR1, and the generation state of the synthetic overcurrent detection signal OCM, and the abnormality processing means 611a for stopping the generation of the power supply command signal DR0 and the conduction command signal DR1 when the abnormality determination means determines the abnormality state, and for identifying and storing the plural types of abnormality occurrence information. The abnormality state of the load wiring includes plural abnormality states of a state where there is a doubt about the positive line supply fault abnormality in which the upstream positive side wiring of the electric load 104 is connected to the positive electrode wiring of the external power source 101, or the positive line ground fault abnormality in which the upstream positive wiring of the electric load 104 is connected to the negative electrode wiring of the external power source 101, a state where there is a doubt about the negative line supply fault abnormality in which the downstream negative wiring of the electric load 104 is connected to the positive electrode wiring of the external power source 101, or the negative line ground fault abnormality in which the downstream negative wiring of the electric load 104 is connected to the negative electrode wiring of the external power source 101, and a state where there is a doubt about the load short circuit abnormality or the load disconnection abnormality in which the electric load 104 is short-circuited or disconnected.

In relation to the invention disclosed in claim 2, the downstream side switching element 350 is the power supply element X in which the power supply duty that is the ratio of the on time and the on-off cycle is controlled by the power supply command signal DR0, and the other upstream side switching element 340 that forms the pair with the downstream side switching element 350 is the conduction switching element Y that is continuously conducted or continuously cut off by the conduction command signal DR1. The first constant voltage diode 343 that forms the cutoff voltage limit circuit is connected to the conduction switching element Y, and the upstream side flywheel switching element 360D that is the flywheel switching element Z is connected in parallel with the series circuit of the electric load 104 and the conduction switching element Y. Further, the flywheel switching element Z is open-circuited when the power supply switching element X is close-circuited, and is close-circuited when the power supply switching element X is open-circuited.

As described above, in relation to the invention disclosed in claim 2, one of the upstream switching element and the downstream switching elements is the power supply switching element X in which the power supply duty is controlled, and the other switching element thereof is the conduction switching element Y in which the continuous conduction or continuous cutoff is performed. When the electric load is an inductive load, the cutoff voltage limit circuit is provided in the conduction switching element Y, and the flywheel switching element Z is connected in parallel with the series circuit of the electric load and the conduction switching element Y. Accordingly, similar to the cases of the first to third embodiments, when the positive line supply fault abnormality or the short circuit abnormality of the upstream side switching element occurs, without depending on an external cutoff function such as a collective power source relay, it is possible to perform self cutoff of the load current by the downstream side switching element, and when the negative line ground fault abnormality or the short circuit abnormality of the downstream side switching element occurs, it is possible to perform self cutoff of the load current by the upstream side switching element. Further, in the normal operation, it is possible to divide the functions so that the power supply state is controlled by one switching element and the response delay of the current cutoff due to the inductance component included in the electric load is suppressed by the other switching element. Further, the flywheel switching element can suppress a voltage drop of the commutation circuit compared with a commutation diode, and can suppress power consumption generated in the commutation circuit and heat generation of the circuit element.

In relation to the invention disclosed in claim 3, the pair of the upstream side switching element 340 and the downstream side switching element 350 is the P-channel field effect transistor and the N-channel field effect transistor, and the flywheel switching element 360D is the P-channel field effect transistor that is the reverse type as that of the power supply switching element 350. The power supply switching element 350 and the flywheel switching element 360D are switch-controlled through the flywheel control circuit 370D that performs the delay close circuit for inhibiting a simultaneous close circuit. The flywheel control circuit 370D is operated in response to the power supply command signal DR0 generated by the control circuit unit 320D. If the power supply command signal DR0 is generated, the flywheel control circuit 370D first open-circuits the flywheel switching element 360D, and then, close-circuits the power supply switching element 350 after a predetermined open circuit response time, and if the power supply command signal DR0 is released, the flywheel control circuit 370D first open-circuits the power supply switching element 350, and then, close-circuits the flywheel switching element 360D after a predetermined open circuit response time. The flywheel switching element 360D is conducted and driven in the same direction as the conduction direction of the parasitic diode 361D generated between the drain terminal D and the source terminal S, and the control circuit unit 320D generates an output inhibition signal INH when the generation of the power supply command signal DR0 and the conduction command signal DR1 is stopped by the abnormality processing means 611a to forcibly open-circuit at least the flywheel switching element 360D.

As described above, in relation to the invention disclosed in claim 3, the power supply switching element X and the flywheel switching element Z are controlled by the flywheel control circuit so as not to be close-circuited at the same time, and is configured so that the flywheel switching element Z is close-circuited when the power supply switching element X is open-circuited. However, even when the power supply switching element X is open-circuited, if the control circuit unit generates the output inhibition signal, the flywheel switching element Z can be forcibly open-circuited. Accordingly, in the case of the embodiment in which the power supply switching element X is the downstream side switching element, when the negative line ground fault abnormality of the electric load occurs in a period when the flywheel switching element Z is close-circuited and the power supply switching element X is open-circuited, the power supply short circuit state can be released by the output inhibition signal. Further, compared with a case where a general diode or a general parasitic diode is used as a commutation diode, the voltage drop of the flywheel switching element in the commutation period is remarkably reduced, and thus, it is possible to remarkably reduce a temperature increase due to heat generation of the flywheel switching element, and to provide a small and cheap power supply control apparatus.

In relation to the invention disclosed in claim 7, the control circuit unit 320D is operated by the control voltage Vcc that is the stabilizing voltage generated by the constant voltage power source 110, and includes the multi-channel AD converter ADC. The power source voltage detection signal Vbm input to the multi-channel AD converter ADC is a voltage obtained by voltage-dividing the power source voltage Vb by second the voltage-dividing resistances 214a and 214b. When the resistance value of the upstream side voltage-dividing resistance 214a is represented as R214a, the resistance value of the downstream side voltage-dividing resistance 214b is represented as R214b, and the voltage ratio G0 is represented as "G0=R214a/(R214a+R214b)", Vbm is represented as "Vbm=G0×Vb". The third resistance 113 that forms the voltage monitoring circuits 180 and 190 is connected on the upstream side of the fourth resistances 114a and 114b. The fourth resistances are the first voltage-dividing resistances 114a and 114b that include the upstream resistance 114a and the downstream resistance 114b. The load voltage detection signal Vxm input to the multi-channel AD converter ADC is a voltage obtained by voltage-dividing the variable divided voltage Vx by the first voltage-dividing resistances 114a and 114b that are the fourth resistances. The voltage division ratio thereof is set to be equal to the voltage division ratio G0, which has the relation of "Vxm=G0×Vx". Here, the voltage division ratio G0 is "G0≤Vcc/Vbmax" that is equal to or less than the ratio of the control voltage Vcc to the maximum value Vbmax of the power source voltage Vb of the external power source 101.

As described above, in relation to the invention disclosed in claim 7, the power source voltage detection signal Vbm input to the control circuit is a voltage obtained by voltage-dividing the power source voltage Vb by the second voltage-dividing resistances of the voltage ratio G0, and the load voltage detection signal Vxm is a voltage obtained by voltage-dividing the variable divided voltage Vx by the first voltage-dividing resistances of the voltage division ration G0. Accordingly, similar to the first to third embodiments, the values of the voltage ratios G and H computed and calculated by the control circuit unit are represented as "G, H=Vxm/Vbm=(G0×Vx)/(G0×Vb)=Vx/Vb". The control circuit unit can equivalently calculate the value of the necessary voltage ratio "Vx/Vb" by computing the value of "Vxm/Vbm". Thus, even though there is a variation of the power source voltage Vb, it is possible to calculate the voltage ratios G and H according to the power supply state for the electric load. The divided voltage due to the first voltage-dividing resistances 114a and 114b is input as the load voltage detection signal Vxm for the control circuit unit 320D through the input resistance 116, and the input signal is connected to the output circuit of the constant voltage power source 110 through the clamp diode 117a, or is connected to the clamp circuit through the constant voltage diode 117b. Thus, the high voltage generated when the conduction switching element Y is open-circuited flows in the voltage monitoring circuits 180, 190 and 200 through the first resistance 111, thereby making it possible to suppress the overvoltage from being input to the control circuit unit.

In relation to the invention disclosed in claim 8, the first resistance 111 is connected in parallel with the fourth resistances 114a and 114b when the downstream side switching element 350 is close-circuited, and is serially connected to the second resistance 112 through the electric load 104 when the downstream side switching element 350 is open-circuited, in which the serially connected series circuit is connected in parallel with the third resistance 113, and the second resistance 112 is connected in parallel with the upstream side switching element 340.

As described above, in relation to the invention disclosed in claim 8, the first resistance in the voltage monitoring circuit is connected in parallel with the fourth resistances when the downstream side switching element is close-circuited, the second resistance connected in parallel with the upstream side switching element is serially connected to the first resistance through the electric load, and the series circuit is connected in parallel with the third resistance when the downstream side switching element is open-circuited. Accordingly, similar to the first to third embodiments, the second resistance is not connected in parallel with the third resistance in the disconnection state of the electric load, and thus, it is possible to detect the disconnection state of the electric load by monitoring the variable divided voltage Vx.

In relation to the invention disclosed in claim 9, the modified voltage monitoring circuit 190 for obtaining the subdivided voltage ratio H further includes the fifth resistance 115 connected between the connecting portion of the third resistance 113 and the fourth resistances 114a and 114b, and the upstream terminal of the electric load 104 in the basic voltage monitoring circuit 180, in which the fifth resistance 115 is connected in parallel with the third resistance 113 when the upstream side switching element 340 is close-circuited.

As described above, in relation to the invention disclosed in claim 9, the fifth resistance is added in the voltage monitoring circuit, and when the upstream side switching element is close-circuited, the fifth resistance is connected in parallel with the third resistance. Accordingly, even when the downstream side switching element is close-circuited, the variable divided voltage Vx is changed, and thus, it is possible to determine whether the upstream side switching element is correctly close-circuited. If the voltage monitoring circuit having the fifth resistance is used, it is possible to generate a temporary state where the upstream side switching element is close-circuited in a state where the downstream side switching element is open-circuited, and thus, it is possible to specifically identify the abnormality generating factors without performing a complicated control, for example, for intentionally generating an open and close state that is not normally present.

In relation to the invention disclosed in claim 10, the abnormality determination means includes the first abnormality determination means 604a and the second abnormality determination means 604c. The first abnormality determination means 604a includes the close circuit abnormality determination means 2319 or 2819, or the first period ratio computing means 702 in the first period T1 when the power supply command signal DR0 is given to at least one of the upstream side switching element 340 and the downstream side switching element 350, the conduction command signal DR1 is given to the other thereof, and both of the upstream side switching element 340 and the downstream side switching element 350 are close-circuited and driven, and additionally includes the intermittence abnormality determination means 2329 or 2829 in the second period T2 when the power supply switching element X to which the power supply command signal DR0 is given intermittently drives the electric load 104, when there is provided the flywheel switching element 360D that is connected in parallel with the electric load 104. In the first period T1, the power supply command signal DR0 and the conduction command signal DR1 continue a close circuit command at least until the abnormality determination using the close circuit abnormality determination means 2319 or 2819 is completed. Here, if the synthetic overcurrent detection signal OCM is detected, both of the power supply command signal DR0 and the conduction command signal DR1 are changed to an open circuit command, and the period directly proceeds to the third period T3. Further, in the first period T1, if the synthetic overcurrent detection signal OCM is not detected, the voltage ratios G and H in the first period T1 are calculated for storage by the first period ratio computing means 702.

The second abnormality determination means 604c includes the third period ratio computing means 831, and the open circuit abnormality determination means 2439 or 2939 in the third period T3 when both of the power supply command signal DR0 and the conduction command signal DR1 are stopped and both of the upstream side switching element and the downstream side switching element are given an open circuit command. In the third period, the power supply command signal DR0 and the conduction command signal DR1 continue the open circuit command at least until the abnormality determination using the open circuit abnormality determination means 2439 or 2939 is completed, and the voltage ratios G and H in the third period T3 are calculated for storage by the third period ratio computing means 831. The close circuit abnormality determination means 2319 or 2819 determines the generating factor of the overcurrent abnormality in which the synthetic overcurrent detection signal OCM is detected, based on the values of the voltage ratios G and H calculated by the third period ratio computing means 831. The open circuit abnormality determination means 2439 or 2839 subdivides, for determination, the generating factors of abnormalities other than the overcurrent abnormality that includes the short circuit abnormality of the upstream side switching element 340, the downstream side switching element 350 or the upstream side flywheel switching element 360D based on the combination of the values of the voltage ratios G and H calculated by the first period ratio computing means 702 and the values of the voltage ratios G and H calculated by the third period ratio computing means 831.

As described above, in relation to the invention disclosed in claim 10, if the overcurrent abnormality occurs in the first period when the power supply switching element and the conduction switching element are close-circuited and driven, the period directly proceeds to the third period when the power supply switching element and the conduction switching element are open-circuited, the voltage ratio is calculated by the third period ratio computing means, and the voltage ratios in the first period and the third period are calculated by the first period ratio computing means and the third period computing means with respect to abnormalities other than the overcurrent abnormality. Accordingly, similar to the first to third embodiments, the generating factor of the overcurrent abnormality is subdivided for determination by the voltage ratio using the third period ratio computing means, and the generating factors of the abnormalities other than the overcurrent abnormality can be subdivided for determination based on the combination of the voltage ratio using the first period ratio computing means and the voltage ratio using the third period ratio computing means.

In relation to the invention disclosed in claim 11, when the load current is excessively large, the synthetic overcurrent determination storage circuit 337 generates the synthetic overcurrent detection signal OCM, interrupt-inputs the generated the synthetic overcurrent detection signal OCM to the control circuit unit 320D, and cuts off the power supply command signal DR0 and the conduction command signal DR1 through gate elements 335D and 336D. The control circuit unit 320D recognizes the synthetic overcurrent detection signal OCM to stop the generation of the power supply command signal DR0 and the conduction command signal DR1. The control circuit unit 360D identifies and stores the overcurrent abnormality generating factor that is at least one of the positive line ground fault or the negative line supply fault of the load wiring, and the load short circuit, with reference to the voltage ratios G and H in the third period T3.

As described above, in relation to the invention disclosed in claim 11, in the first period when the power supply switching element and the conduction switching element are close-circuited and driven or in the second period when the power supply switching element is open-circuited but the conduction switching element and the flywheel switching element are close-circuited and driven, when the overcurrent flows in at least one of the upstream side switching element and the downstream side switching element, the synthetic overcurrent detection signal OCM is generated to cut off or stop the generation of the power supply command signal DR0 and the conduction command signal DR1, and then, the period proceeds to the third period. The control circuit unit identifies and stores the overcurrent abnormality generating factor with reference to the voltage ratios G and H in the third period T3. Accordingly, similar to the first embodiment, even though the load current is cut off according to the detection of the overcurrent, the control circuit unit recognizes the cutoff of the load current, to continue the synthetic overcurrent detection signal OCM as long as the synthetic overcurrent determination storage circuit is not reset, and to reliably cut off the overcurrent by a small number of interrupt-input signals, thereby making it possible to identify and store the abnormality generating factor of a minimum degree.

In relation to the invention disclosed in claim 14, if the overcurrent abnormality does not occur in the first period T1 and the period proceeds to the second period T2, the intermittence abnormality determination means 2329 or 2829 for the case where the flywheel switching element 360D connected in parallel with the electric load 104 is provided is operated. Here, the control circuit unit 320D monitors an operation state of the synthetic overcurrent determination storage circuit 337 in a state where the power supply command signal DR0 is stopped and the conduction command signal DR1 is generated. If the synthetic overcurrent detection signal OCM is recognized, the control circuit unit 320D releases the power supply command signal DR0 and the conduction command signal DR1, and then, the period directly proceeds to the third period T3.

As described above, in relation to the invention disclosed in claim 14, the control circuit unit monitors the occurrence of the overcurrent abnormality even in the second period when the power supply switching element performs the intermittent operation, and releases the power supply command signal DR0 and the conduction command signal DR1 according to the occurrence of the overcurrent abnormality, and then, the period directly proceeds to the third period T3. Accordingly, similar to the first embodiment, if the overcurrent abnormality is not detected in the first period and is detected in the second period, the short circuit abnormality of the flywheel switching element or the short circuit abnormality of the power supply switching element is specified, and thus, it is possible to perform further determination with reference to the voltage ratios G and H in the third period.

Further, in relation to the invention disclosed in claim 15, the control circuit unit 320D includes the fourth period abnormality determination means 2449 that is operated in the fourth period T4 subsequent to the third period T3 as a part of the second abnormality determination means 604c. The fourth period abnormality determination means 2449 close-circuits and drives the upstream side switching element 340 in a state where the downstream side switching element 350 is open-circuited, and gives a selective connection state that is not obtained in the first period ratio computing means 702 and the third period ratio computing means 831 to the voltage monitoring circuit 180, changes the value of the voltage ratio G, and determines the presence or absence of the disconnection abnormality of the upstream side switching element 340.

As described above, in relation to the invention disclosed in claim 15, the control circuit unit includes the fourth period abnormality determination means. The fourth period abnormality determination means close-circuits the upstream side switching element in a state where the downstream side switching element is open-circuited, and changes the selective connection state of the voltage monitoring circuit, and identifies and determines the presence or absence of the disconnection abnormality of the upstream side switching element that cannot be identified in the first and third periods. Accordingly, it is possible to identify and determine the abnormality generating factor in detail without making the voltage monitoring circuit complicated, and to provide a cheap voltage monitoring circuit by a small resistance circuit network with low accuracy.

In relation to the invention disclosed in claim 16, the second abnormality determination means 604c includes the second upstream and downstream short circuit abnormality determination means 2923b. The second upstream and downstream short circuit abnormality determination means 2923b determines that the upstream and downstream short circuit abnormality occurs by detecting that the upstream abnormality that is the short circuit abnormality of the upstream side switching element or the positive line supply fault abnormality of the load wiring, and the downstream abnormality that is the short circuit abnormality of the downstream side switching element or the negative line ground fault abnormality of the load wiring occur at the same time by the voltage monitoring circuit 190, in the third period T3 when the power supply command DR0 and the conduction command DR1 are stopped. The voltage monitoring circuit 190 is applied as a voltage monitoring circuit that includes the first resistance 111 and the fifth resistance 115 for identifying and determining that the upstream side switching element and the downstream side switching element are close-circuited at the same time, and can obtain the subdivided voltage ratio H. When the power source relay for cutting off the load current, if the upstream and downstream short circuit abnormality is detected, is provided outside, the abnormality processing means 611a transmits a command signal for de-generating the power source relay, and performs at least storage of abnormality information or abnormality notification.

As described above, in relation to the invention disclosed in claim 16, the control circuit unit includes the upstream and downstream short circuit abnormality determination means, which can perform the abnormality notification and the abnormality information storage, and can generate the cutoff command for the external power source relay when the abnormality state occurs in which the load current that is smaller than or equal to the predetermined value flows due to the occurrence of the short circuit abnormality on the upstream side and the downstream side of the electric load. Accordingly, similar to the third embodiment, in a state where both of the power supply command and the conduction command are stopped, the load current idly flows, and thus, it is possible to prevent overheating and burning of the electric load or abnormal discharging of the external power source. Further, when the occurrence of the upstream and downstream short circuit abnormality is detected by monitoring the load current, it is not possible to detect that the positive line supply fault abnormality of the load wiring and the negative line ground fault abnormality occur at the same time, but when at least the power supply control apparatus is related and the short circuit abnormality of the upstream side switching element or the downstream side switching element is one factor of the occurrence of the upstream and downstream short circuit abnormality, it is impossible to perform the detection by the power supply control apparatus. On the other hand, when the occurrence of the upstream and downstream short circuit abnormality is detected by the voltage monitoring circuit, it is possible to detect the occurrence of the upstream and downstream short circuit abnormality including the simultaneous occurrence of the positive line supply fault abnormality of the load wiring and the negative line ground fault abnormality without discrimination of the factors.

In relation to the invention disclosed in claim 17, the control circuit unit 320D includes the double-abnormality determination means 604b for detecting, when an internal double-abnormality in which both of the power supply switching element X and the flywheel switching element Z have the short circuit abnormality occurs, or when an internal and external double-abnormality of a mixture of the positive line ground fault abnormality of the load wiring and the short circuit abnormality of the upstream side switching element 340, a mixture of the negative line supply fault abnormality of the load wiring and the short circuit abnormality of the downstream side switching element 350, a mixture of the short circuit abnormality of the upstream side communication switching element 360D and the negative line ground fault of the load wiring occurs. The double-abnormality determination means 604b determines that the double-abnormality occurs as the synthetic overcurrent detection signal OCM is input in the third period T3 when both of the power supply command signal DR0 and conduction command signal DR1 are not operated. When the power source relay for cutting off the load current, if the double-abnormality is detected, is provided outside, the abnormality processing means 611a transmits a command signal for de-generating the power source relay, and performs at least storage of abnormality information or abnormality notification.

As described above, in relation to the invention disclosed in claim 17, the control circuit unit includes the double-abnormality determination means, which detects a state where the overcurrent flows due to the double-abnormality to which at least the power supply control apparatus is related. Accordingly, similar to the first to third embodiments, when a power source cutoff function is provided at an upper stage of the power supply control apparatus, if the double-abnormality occurs, the double-abnormality determination means can notify the result to cut off the power source. Thus, it is possible to prevent the occurrence of overheating and burning of the electric load or abnormal discharging of the external power source. Further, when the power source cutoff function is not provided and only a fuse is provided, it is possible to separate the load power source system from the power source system for the control circuit unit in the power supply control apparatus so that power is supplied through a different fuse, and thus, it is possible to enhance the work efficiency of maintenance and inspection based on the abnormality generation storage information according to the factors.

Various modifications and alterations of this invention will be apparent to those skilled in the art without departing from the scope and spirit of this invention, and it should be understood that this is not limited to the illustrative embodiments set forth herein.

What is claimed is:

1. A power supply control apparatus of an electric load comprising:
- an upstream side switching element that is serially connected to the electric load on an upstream side of the electric load supplied with a load current by power supply from an external power source;
- a downstream side switching element that is serially connected to the electric load on a downstream side of the electric load; and
- a control circuit unit that uses a microprocessor as a main component and controls a conduction state of the upstream side switching element and the downstream side switching element, wherein
- when one switching element of the upstream side switching element and the downstream side switching element is abnormally short-circuited, the power supply is stopped by the other switching element,
- the power supply control apparatus includes
- an upstream overcurrent determination storage circuit that detects an upstream overcurrent as the load current flowing in the upstream side switching element exceeds a predetermined value to generate an upstream overcurrent detection signal and a downstream overcurrent determination storage circuit that detects a downstream overcurrent as the load current flowing in the downstream side switching element exceeds a predetermined value to generate a downstream overcurrent detection signal, or a synthetic overcurrent determination storage circuit that generates a synthetic overcurrent detection signal when any one of the upstream overcurrent flowing in the upstream side switching element and the downstream overcurrent flowing in the downstream side switching element, and
- a voltage monitoring circuit that generates a variable divided voltage in response to a switching state of the upstream side switching element and a switching state of the downstream side switching element,
- the voltage monitoring circuit includes
- a third resistance and a fourth resistance that divide a power source voltage of the external power source, at least one of a first resistance and a fifth resistance that is connected to a connecting portion of the third resistance and the fourth resistance at one end thereof, and a second resistance that connects the other end of the at least one of the first resistance and the fifth resistance to a positive wiring or a negative wiring of the power source voltage through the electric load,
- the other end of the first resistance is connected on one of the upstream side and the downstream side of the electric load,
- the other end of the fifth resistance is connected on the other of the upstream side and the downstream side of the electric load,
- the variable divided voltage is generated at both ends of the fourth resistance,
- the control circuit unit monitors a value of a power source voltage detection signal that is a voltage being in proportion to the power source voltage and a value of a load voltage detection signal that is a voltage being in proportion to the variable divided voltage, calculates a voltage ratio of the value of the power source voltage detection signal and the value of the load voltage detection signal, and monitors the upstream overcurrent detection signal and the downstream overcurrent detection signal, or the synthetic overcurrent detection signal,
- the control circuit unit further includes
- abnormality determination means for generating a power supply command signal for one of the upstream side switching element and the downstream side switching element and a conduction command signal for the other one thereof, and for determining an abnormality state of a load wiring for the electric load while the electric load is operated, and
- abnormality processing means for stopping the generation of the power supply command signal and the conduction command signal when the abnormality determination means determines the abnormality state, and for identifying and storing a plurality of types of abnormality occurrence information,
- the abnormality determination means determines the abnormality state of the load wiring based on a combination of a value of the voltage ratio corresponding to a generation state of the power supply command signal and the conduction command signal, and a generation state of the upstream overcurrent detection signal and the downstream overcurrent detection signal or the synthetic overcurrent detection signal, and
- the abnormality state of the load wiring includes at least one of
- a state where there is a doubt about a positive supply fault abnormality in which an upstream positive wiring of the electric load is connected to a positive electrode wiring of the external power source, or a positive line ground fault abnormality in which the upstream positive wiring of the electric load is connected to a negative electrode wiring of the external power source,
- a state where there is a doubt about a negative supply fault abnormality in which a downstream negative wiring of the electric load is connected to the positive electrode wiring of the external power source, or a negative line ground fault abnormality in which the downstream negative wiring of the electric load is connected to the negative electrode wiring of the external power source, and
- a state where there is a doubt about a load short circuit abnormality or a load disconnection abnormality in which the electric load is short-circuited or disconnected.

2. The power supply control apparatus of the electric load according to claim 1, wherein
- one upstream side switching element or downstream side switching element is a power source switching element in which a power supply duty that is a ratio of an on time and an on-off cycle is controlled by the power supply command signal, and the other downstream side switching element or upstream side switching element that forms a pair with the one upstream side switching element or downstream side switching element is a conduction switching element that is continuously conducted or continuously cut off by the conduction command signal,
- a first constant voltage diode that forms a cutoff voltage limit circuit is connected to the conduction switching element, and a downstream side flywheel switching element or an upstream side flywheel switching element that is a flywheel switching element is connected in parallel with a series circuit of the electric load and the conduction switching element, and
- the downstream side flywheel switching element or the upstream side flywheel switching element is open-circuited when the power supply switching element is close-circuited, and is close-circuited when the power supply switching element is open-circuited.

3. The power supply control apparatus of the electric load according to claim 2, wherein
the upstream side switching element is a P-channel field effect transistor, and the downstream side switching element is an N-channel field effect transistor,
the flywheel switching element is an N-channel or P-channel field effect transistor that is a reverse type to the power supply switching element that is the upstream side switching element or the downstream side switching element,
the power supply switching element and the flywheel switching element are switch-controlled through a flywheel control circuit that provides a delay close circuit for inhibiting a simultaneous close circuit,
the flywheel control circuit first open-circuits the flywheel switching element, and then, close-circuits the power supply switching element after a predetermined open circuit response time if the power supply command signal is generated by the control circuit unit, and first open-circuits the power supply switching element, and then, close-circuits the flywheel switching element after a predetermined open circuit response time if the power supply command signal is released,
the flywheel switching element is conducted and driven in the same direction as a conduction direction of a parasitic diode provided between a drain terminal and a source terminal, and
the control circuit unit generates an output inhibition signal to forcibly open-circuit at least the flywheel switching element when the generation of the power supply command signal and the conduction command signal is stopped by the abnormality processing means.

4. The power supply control apparatus of the electric load according to claim 2, wherein
the upstream side switching element is a P-channel field effect transistor, and the downstream side switching element is an N-channel field effect transistor,
the flywheel switching element is a P-channel or N-channel field effect transistor that is the same type as the power supply switching element that is the upstream side switching element and the downstream side switching element,
the power supply switching element and the flywheel switching element are switch-controlled through a flywheel control circuit that includes an interlock circuit for inhibiting a simultaneous close circuit,
the flywheel control circuit includes a cutoff transistor that causes a short circuit between a gate terminal and a source terminal of the flywheel switching element when the power supply switching element is close-circuited to set the flywheel switching element to a non-conduction state, a capacitor that is charged through a charging diode, and a driving resistance applies the charged voltage of the capacitor between a gate terminal and a source terminal of the flywheel switching element when the cutoff transistor is open-circuits that causes the power supply switching element is open-circuited, the flywheel switching element is conducted and driven in the same direction as a conduction direction of a parasitic diode provided between a source terminal and a drain terminal.

5. The power supply control apparatus of the electric load according to claim 2, wherein
an N-channel field effect transistor that forms the downstream side switching element that is the conduction switching element or a P-channel field effect transistor that forms the upstream side switching element that is the conduction switching element is close-circuited and driven by a driving voltage applied between a gate terminal and a source terminal or between a source terminal and a gate terminal and the first constant voltage diode is connected between a drain terminal and the gate terminal when the conduction command signal is given, in which when the conduction command signal is released, a serge current flows in the first constant voltage diode by an inductive serge voltage due to an inductance component of the electric load so that the field effect transistor is conducted and driven, to suppress the value of the inductive serge voltage to a predetermined voltage corresponding to an operating voltage of the first constant voltage diode, and
a diode that is conducted in a direction where the serge current flows in is serially connected to the first constant voltage diode, and an inverted auxiliary resistance is connected between a serial connecting point of the first constant voltage diode and the diode, and the source terminal.

6. The power supply control apparatus of the electric load according to claim 5, wherein
an P-channel field effect transistor that forms the upstream side switching element that is the power supply switching element or an N-channel field effect transistor that forms the downstream side switching element that is the power supply switching element is close-circuited and driven by a driving voltage applied between a source terminal and a gate terminal or between a gate terminal and a source terminal and a second constant voltage diode is connected between a drain terminal and the gate terminal when the power supply command signal is given, in which when the power supply command signal is released, and when the flywheel switching element is disconnected, a second serge current flows in the second constant voltage diode by an inductive serge voltage due to an inductance component of the electric load so that the field effect transistor is conducted and driven, to divide the value of the inductive serge voltage between the power supply switching element and the conduction switching element, and to suppress the value of the inductive serge voltage divided by the upstream side switching element that is the power supply switching element or the downstream side switching element that is the power supply switching element to a predetermined voltage corresponding to an operating voltage of the second constant voltage diode, and
the operating voltage of the second constant voltage diode is set to a value that is larger than a maximum voltage of the external power source and is smaller than the operating voltage of the first constant voltage diode, the flow of the second serge current in the second constant voltage diode is detected and stored by an overvoltage determination storage circuit, and the overvoltage determination storage circuit generates an overvoltage detection signal and inputs the overvoltage detection signal to the control circuit unit.

7. The power supply control apparatus of the electric load according to claim 1, wherein
the control circuit unit is operated by a control voltage that is a stabilizing voltage generated by a constant voltage power source, and includes a multi-channel AD converter,
the power source voltage detection signal Vbm input to the multi-channel AD converter is a voltage obtained by voltage-dividing the power source voltage by second voltage-dividing resistances, when a resistance value of an upstream side voltage-dividing resistance is represented as R214$a$, a resistance value of a downstream side voltage-dividing resistance is represented as R214$b$, and a voltage ratio G0 is represented as "G0=R214$b$/(R214$a$+R214$b$)", Vbm is represented as "Vbm=G0×Vb", the third resistance that forms the voltage monitoring circuit is connected to an upstream side of the fourth resistance, and the fourth resistance includes first voltage-dividing resistances formed by an upstream resistance and a downstream resistance, the load voltage detection signal Vxm input to the multi-channel AD converter is a voltage obtained by voltage-dividing the variable divided voltage Vx by the first voltage-dividing resistances that correspond to the fourth resistance, and a voltage ratio thereof is set to be equal to the voltage ratio G0, which is "Vxm=G0×Vx", and the voltage ratio G0 is "G0≤Vcc/Vbmax" that is equal to or less than the ratio of a maximum value Vbmax of the power source voltage Vb of the external power source and the control voltage Vcc.

8. The power supply control apparatus of the electric load according to claim 7, wherein the first resistance is connected in parallel with the fourth resistance when the downstream side switching element is close-circuited, and is serially connected to the second resistance through the electric load when the downstream side switching element is open-circuited, the serially connected series circuit is connected in parallel with the third resistance, and the second resistance is connected in parallel with the upstream side switching element.

9. The power supply control apparatus of the electric load according to claim 8, wherein the voltage monitoring circuit further includes the fifth resistance connected between the connecting portion of the third resistance and the fourth resistance, and an upstream terminal of the electric load, in which the fifth resistance is connected in parallel with the third resistance when the upstream side switching element is close-circuited.

10. The power supply control apparatus of the electric load according to claim 1, wherein the abnormality determination means includes first abnormality determination means and second abnormality determination means, the first abnormality determination means includes close circuit abnormality determination means or first period computing means in a first period when the power supply command signal is given to at least one of the upstream side switching element and the downstream side switching element, the conduction command signal is given to the other thereof, and both of the upstream side switching element and the downstream side switching element are close-circuited and driven, and additionally includes intermittence abnormality determination means in a second period when the power supply switching element that is the upstream side switching element or the downstream side switching element to which the power supply command signal is given intermittently drives the electric load, when there is provided the flywheel switching element that is the downstream side flywheel switching element or the upstream side flywheel switching element that is connected in parallel with the electric load, in which in the first period, the power supply command signal and the conduction command signal continue a close circuit command at least until the abnormality determination using the close circuit abnormality determination means is completed, and if the upstream overcurrent detection signal or the downstream overcurrent detection signal is detected or the synthetic overcurrent detection signal is detected, both of the power supply command signal and the conduction command signal are changed to an open circuit command, and the period directly proceeds to a third period, and in which in the first period, if the upstream overcurrent detection signal or the downstream overcurrent detection signal, or the synthetic overcurrent detection signal is not detected, the voltage ratio in the first period is calculated for storage by the first period ratio computing means, the second abnormality determination means includes third period ratio computing means and open circuit abnormality determination means in the third period when both of the power supply command signal and the conduction command signal are stopped and both of the upstream side switching element and the downstream side switching element are given an open circuit command, in which in the third period, the power supply command signal and the conduction command signal continue the open circuit command at least until the abnormality determination using the open circuit abnormality determination means is completed, and the voltage ratio in the third period is calculated for storage by the third period ratio computing means, in which the close circuit abnormality determination means determines a generating factor of the overcurrent abnormality in which the upstream overcurrent detection signal or the downstream overcurrent detection signal is detected, or the synthetic overcurrent detection signal is detected, by the value of the voltage ratio calculated by the third period ratio computing means, and in which the open circuit abnormality determination means divides, for determination, the generating factors of abnormalities other than the overcurrent abnormality that includes a short circuit abnormality of the upstream side switching element, the downstream side switching element or the flywheel switching element based on a combination of the value of the voltage ratio calculated by the first period ratio computing means and the value of the voltage ratio calculated by the third period ratio computing means.

11. The power supply control apparatus of the electric load according to claim 10, wherein when the load current is excessively large, the synthetic overcurrent determination storage circuit generates the synthetic overcurrent detection signal, interrupt-inputs the generated the synthetic overcurrent detection signal to the control circuit unit, and cuts off the power supply command signal and the conduction command signal through a gate element, the control circuit unit recognizes the synthetic overcurrent detection signal to stop the generation of the power supply command signal and the conduction command signal, or the synthetic overcurrent determination storage circuit does not perform the cutoff of the power supply command signal and the conduction command signal using the gate terminal, and the control circuit unit recognizes the synthetic overcurrent detection signal to detect and store the value of the load current flowing in the upstream side switching element or the downstream side switching element as the upstream overcurrent detection signal or the downstream overcurrent detection signal and stops the generation of the power supply command signal and the conduction command signal, and the control circuit unit identifies and stores the overcurrent abnormality generating factor that is at least one of the positive line ground fault or the negative line supply fault of the load wiring, and the load short circuit with reference to the voltage ratio in the third period, identifies and stores the presence or absence of the short circuit abnormality of the power supply switching element when the upstream overcurrent detection signal and the downstream overcurrent detection signal are input, and identifies and stores the presence or absence of the short circuit abnormality of the flywheel switching element when the flywheel switching element is provided.

12. The power supply control apparatus of the electric load according to claim 10, wherein the upstream overcurrent determination storage circuit and the downstream overcurrent determination storage circuit generate the upstream overcurrent detection signal and the downstream overcurrent detection signal when the load current is excessively large, interrupt-input the generated upstream overcurrent detection signal and downstream overcurrent detection signal to the control circuit unit, cut off the power supply command signal and the conduction command signal through a gate element, and forcibly open-circuit at least the power supply switching element, and the conduction switching element that is the downstream side switching element or the upstream side switching element, the control circuit unit recognizes the upstream overcurrent detection signal and the downstream overcurrent detection signal to stop the power supply command signal and the conduction command signal, and identifies whether both of the upstream overcurrent detection signal and the downstream overcurrent detection signal are generated, or any one thereof is generated, and the control circuit unit identifies and stores the overcurrent abnormality generating factor that is at least one of the positive line ground fault abnormality or the negative line supply fault abnormality of the load wiring, and the load short circuit abnormality with reference to the voltage ratio in the third period, identifies and stores the presence or absence of the short circuit abnormality of the power supply switching element, and identifies and stores the presence or absence of the short circuit abnormality of the flywheel switching element when the flywheel switching element is provided.

13. The power supply control apparatus of the electric load according to claim 11, wherein the control circuit unit receives inputs of an upstream current detection signal corresponding to the load current flowing in the upstream side switching element and a downstream current detection signal corresponding to the load current flowing in the downstream side switching element, in the close circuit abnormality determination means in the first period and the open circuit abnormality determination means in the third period, the control circuit unit calculates whether the values of both of the upstream current detection signal and the downstream current detection signal are equal or not to each other, identifies and stores the abnormality generating factor that is any one of the positive line supply fault abnormality or the negative line supply fault abnormality of the load wiring, and the load short circuit abnormality, identifies and stores, when the power supply switching element, the conduction switching element that is the downstream side switching element or the upstream side switching element, and the flywheel switching element are provided, the presence or absence of the short circuit abnormality or a disconnection abnormality thereof, and identifies and stores the presence or absence of the disconnection abnormality of the load wiring, based on a combination of the calculation result and the values of the voltage ratios in the first period and the third period.

14. The power supply control apparatus of the electric load according to claim 10, wherein if the overcurrent abnormality does not occur in the first period and the period proceeds to the second period, the intermittence abnormality determination means for the case where the flywheel switching element connected in parallel with the electric load is provided is operated, and the control circuit unit monitors an operation state of the upstream overcurrent determination storage circuit, the downstream overcurrent determination storage circuit or the synthetic overcurrent determination storage circuit in a state where the power supply command signal is stopped and the conduction command signal is generated, and releases the power supply command signal and the conduction command signal if the upstream overcurrent detection signal, the downstream overcurrent detection signal, or the synthetic overcurrent detection signal is recognized, and then, the period directly proceeds to the third period.

15. The power supply control apparatus of the electric load according to claim 10, wherein the control circuit unit includes fourth period abnormality determination means that is operated in a fourth period subsequent to the third period as a part of the second abnormality determination means, and the fourth period abnormality determination means close-circuits and drives the upstream side switching element in a state where the downstream side switching element is open-circuited, and gives a selective connection state that is not obtained in the first period ratio computing means and the third period ratio computing means to the voltage monitoring circuit, and changes the value of the voltage ratio to determine the presence or absence of a disconnection abnormality of the upstream side switching element.

16. The power supply control apparatus of the electric load according to claim 10, wherein the second abnormality determination means includes first upstream and downstream short circuit abnormality determination means or second upstream and downstream short circuit abnormality determination means, the first upstream and downstream short circuit abnormality determination means detects the presence of the load current measured on the upstream side or the downstream side of the electric load, in the third period when both of the power supply command and the conduction command are stopped, and determines that an upstream and downstream short circuit abnormality occurs when the value of the detected load current is not an overcurrent that exceeds a predetermined threshold current, and the second upstream and downstream short circuit abnormality determination means determines that the upstream and downstream short circuit abnormality occurs by detecting that an upstream abnormality that is the short circuit abnormality of the upstream side switching element or the positive line supply fault abnormality of the load wiring, and a downstream abnormality that is the short circuit abnormality of the downstream side switching element or the negative line ground fault abnormality of the load wiring simultaneously occur by the voltage monitoring circuit, in the third period when both of the power supply command and the conduction command are stopped, the voltage monitoring circuit is applied as a voltage monitoring circuit capable of obtaining a divided voltage ratio by being provided with the first resistance and the fifth resistance for identifying and determining that the upstream side switching element and the downstream side switching element are close-circuited at the same time, and when a power source relay, if the upstream and downstream short circuit abnormality is detected, for cutting off the load current is provided outside, the abnormality processing means transmits a command signal for de-energizing the power source relay, and performs at least storage of abnormality information or abnormality notification.

17. The power supply control apparatus of the electric load according to claim 10, wherein the control circuit unit includes double-abnormality determination means for detecting, when an internal double-abnormality in which both of the power supply switching element and the flywheel switching element have the short circuit abnormality occurs, or when an internal and external double-abnormality of a mixture of the positive line ground fault abnormality of the load wiring and the short circuit abnormality of the upstream side switching element, a mixture of the negative line supply fault abnormality of the load wiring and the short circuit abnormality of the downstream side switching element, a mixture of the short circuit abnormality of the downstream side switching element that is the flywheel switching element and the positive line supply fault abnormality of the load wiring, or a mixture of the short circuit abnormality of the upstream side switching element that is the flywheel switching element and the negative line ground fault abnormality of the load wiring occurs, the double-abnormality determination means determines that the double-abnormality occurs as the upstream overcurrent detection signal or the downstream overcurrent detection signal, or the synthetic overcurrent detection signal is input in the third period when both of the power supply command signal and conduction command signal are not operated, and when a power source relay for cutting off the load current, if the double-abnormality is detected, is provided outside, the abnormality processing means transmits a command signal for de-generating the power source relay, and performs at least storage of abnormality information or abnormality notification.

18. The power supply control apparatus of the electric load according to claim 12, wherein the control circuit unit receives inputs of an upstream current detection signal corresponding to the load current flowing in the upstream side switching element and a downstream current detection signal corresponding to the load current flowing in the downstream side switching element, in the close circuit abnormality determination means in the first period and the open circuit abnormality determination means in the third period, the control circuit unit calculates whether the values of both of the upstream current detection signal and the downstream current detection signal are equal to each other, or any one thereof is larger with reference to the value of the upstream current detection signal and the value of the downstream current detection signal, identifies and stores the abnormality generating factor that is any one of the positive line ground fault abnormality or the negative line supply fault abnormality of the load wiring, and the load short circuit abnormality, identifies and stores, when the power supply switching element, the conduction switching element that is the downstream side switching element or the upstream side switching element, and the flywheel switching element are provided, the presence or absence of the short circuit abnormality or a disconnection abnormality thereof, and identifies and stores the presence or absence of the disconnection abnormality of the load wiring, based on a combination of the calculation result and the values of the voltage ratios in the first period and the third period.

* * * * *